US012058705B2

(12) United States Patent
Li et al.

(10) Patent No.: US 12,058,705 B2
(45) Date of Patent: Aug. 6, 2024

(54) METHOD AND APPARATUS FOR SIDELINK CONTROL INFORMATION OF SIDELINK REFERENCE SIGNAL IN A WIRELESS COMMUNICATION SYSTEM

(71) Applicant: ASUS Technology Licensing Inc., Taipei (TW)

(72) Inventors: Ming-Che Li, Taipei (TW); Li-Chih Tseng, Taipei (TW); Li-Te Pan, Taipei (TW); Chun-Wei Huang, Taipei (TW)

(73) Assignee: ASUS Technology Licensing Inc., Taipel (TW)

( * ) Notice: Subject to any disclaimer, the term of this patent is extended or adjusted under 35 U.S.C. 154(b) by 0 days.

(21) Appl. No.: 18/397,063

(22) Filed: Dec. 27, 2023

(65) Prior Publication Data

US 2024/0224302 A1 Jul. 4, 2024

Related U.S. Application Data

(60) Provisional application No. 63/435,600, filed on Dec. 28, 2022.

(51) Int. Cl.
*H04W 72/40* (2023.01)
*H04L 5/00* (2006.01)
*H04W 72/25* (2023.01)
*H04W 72/563* (2023.01)
*H04W 92/18* (2009.01)

(52) U.S. Cl.
CPC ........... *H04W 72/40* (2023.01); *H04L 5/0051* (2013.01); *H04W 72/25* (2023.01); *H04W 72/563* (2023.01); *H04W 92/18* (2013.01)

(58) Field of Classification Search
CPC ... H04W 72/0446; H04W 4/40; H04W 72/40; H04W 72/25; H04W 72/563; H04W 92/18; H04L 5/0051
See application file for complete search history.

(56) References Cited

U.S. PATENT DOCUMENTS

| 11,452,115 | B2 * | 9/2022 | Khoryaev | ............. H04W 72/02 |
| 2017/0048922 | A1 * | 2/2017 | Lee | ........ H04W 76/38 |
| 2018/0255532 | A1 * | 9/2018 | Li | ......... H04W 88/04 |
| 2020/0029327 | A1 * | 1/2020 | Bharadwaj | ........... H04L 5/0044 |
| 2022/0150730 | A1 * | 5/2022 | Freda | ..................... H04L 1/188 |

(Continued)

*Primary Examiner* — Raj Jain
(74) *Attorney, Agent, or Firm* — Cooper Legal Group LLC

(57) ABSTRACT

In an example, a device receives a configuration of a sidelink resource pool for sidelink data transmission and sidelink reference signal transmission. The device determines to perform a sidelink reference signal transmission in a first Transmission Time Interval (TTI) of the sidelink resource pool, wherein the sidelink reference signal transmission is associated with a destination identity (ID) and a source ID, and the sidelink reference signal transmission has a highest priority among one or more pending sidelink reference signals and one or more sidelink logical channels with pending sidelink data. The device generates a first sidelink data packet based on a first sidelink logical channel with first pending sidelink data, wherein the first sidelink data packet is associated with the destination ID and the source ID. The device performs, in the first TTI, the sidelink reference signal transmission and a sidelink data transmission for transmitting the first sidelink data packet.

20 Claims, 11 Drawing Sheets

(56) References Cited

U.S. PATENT DOCUMENTS

2022/0337998 A1* 10/2022 Tian ................. H04W 72/0453
2023/0062805 A1    3/2023 Baek et al.
2023/0199802 A1*  6/2023 Ganesan ............... H04W 72/25
                                                                370/329

* cited by examiner

METHOD AND APPARATUS FOR SIDELINK CONTROL INFORMATION OF SIDELINK REFERENCE SIGNAL IN A WIRELESS COMMUNICATION SYSTEM

CROSS-REFERENCE TO RELATED APPLICATIONS

The present Application claims the benefit of U.S. Provisional Patent Application Ser. No. 63/435,600 filed on Dec. 28, 2022, the entire disclosure of which is incorporated herein in its entirety by reference.

FIELD

This disclosure generally relates to wireless communication networks, and more particularly, to a method and apparatus for sidelink control information of sidelink reference signal in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a first device, the first device receives a configuration of a sidelink resource pool for sidelink data transmission and sidelink reference signal transmission. The first device determines to perform a first sidelink reference signal transmission in a first Transmission Time Interval (TTI) of the sidelink resource pool, wherein the first sidelink reference signal transmission is associated with a first destination identity (ID) and a first source ID. The first sidelink reference signal transmission has a highest priority among one or more pending sidelink reference signals and one or more sidelink logical channels with pending sidelink data. The first device generates a first sidelink data packet based on a first sidelink logical channel with pending sidelink data, wherein the first sidelink data packet is associated with the first destination ID and the first source ID. The first device performs, in the first TTI, the first sidelink reference signal transmission and a first sidelink data transmission for transmitting the first sidelink data packet.

In an example from the perspective of a first device, the first device receives a configuration of a sidelink resource pool for sidelink data transmission and sidelink reference signal transmission. The first device generates, based on a first sidelink logical channel with first pending sidelink data, a first sidelink data packet for transmission in a first TTI of the sidelink resource pool, wherein the first sidelink data packet is associated with a first destination ID and a first source ID. The first sidelink logical channel has a highest priority among one or more pending sidelink reference signals and one or more sidelink logical channels with pending sidelink data. The first device determines to perform a first sidelink reference signal transmission in the first TTI, wherein the first sidelink reference signal transmission is associated with the first destination ID and the first source ID. The first device performs, in the first TTI, the first sidelink reference signal transmission and a first sidelink data transmission for transmitting the first sidelink data packet.

In an example from the perspective of a first device, the first device receives a configuration of a sidelink resource pool for sidelink data transmission and sidelink reference signal transmission. The first device determines to perform a first sidelink reference signal transmission in a first TTI of the sidelink resource pool, wherein the first sidelink reference signal transmission is associated with a first destination ID and a first source ID. The first device performs the first sidelink reference signal transmission in the first TTI without transmitting sidelink data from one or more sidelink logical channels in the first TTI.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: 3GPP TS 38.213 V17.3.0 (2022-09) 3GPP; TSG RAN; NR; Physical layer procedures for control (Release 17); 3GPP TS 38.214 V17.3.0 (2022-09) 3GPP; TSG RAN; NR; Physical layer procedures for data (Release 17); 3GPP TS 38.212 V17.3.0 (2022-09) 3GPP; TSG RAN; NR; Multiplexing and channel coding (Release 17); 3GPP TS 38.211 V17.3.0 (2022-09) 3GPP; TSG RAN; NR; Physical channels and modulation (Release 17); RP-213588, "Revised SID on Study on expanded and improved NR positioning", Intel; RAN1 Chair's Notes of 3GPP TSG RAN WG1 #109-e; RAN1 Chair's Notes of 3GPP TSG RAN WG1 #110; RAN1 Chair's Notes of 3GPP TSG RAN WG1 #110bis-e; R1-2211012 Discussion on potential solutions for sidelink positioning vivo; R1-2211203 Further discussion on potential solutions for SL positioning CATT, GOHIGH; R1-2211268 Discussion on potential solutions for SL positioning LG Electronics. The standards and documents listed above are hereby expressly incorporated by reference in their entirety.

Figure 1:
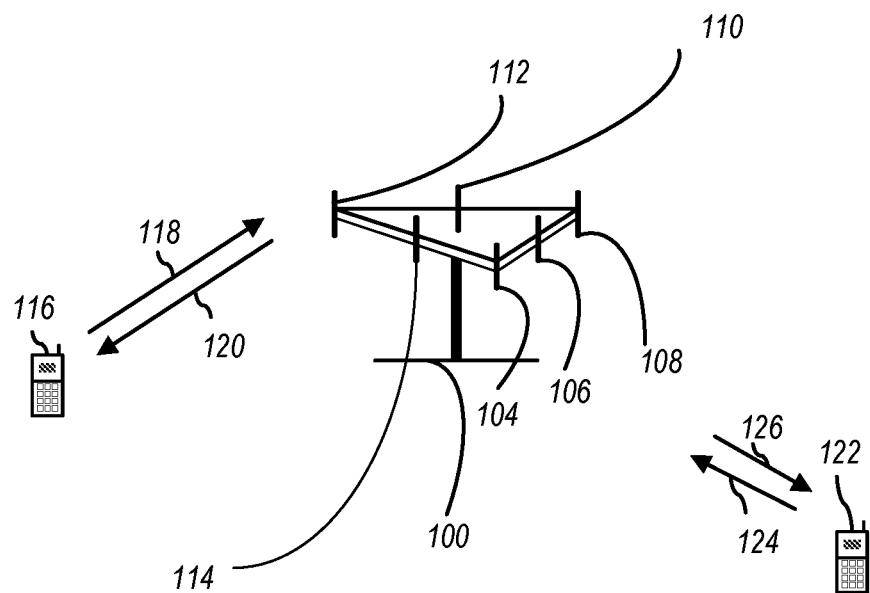
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
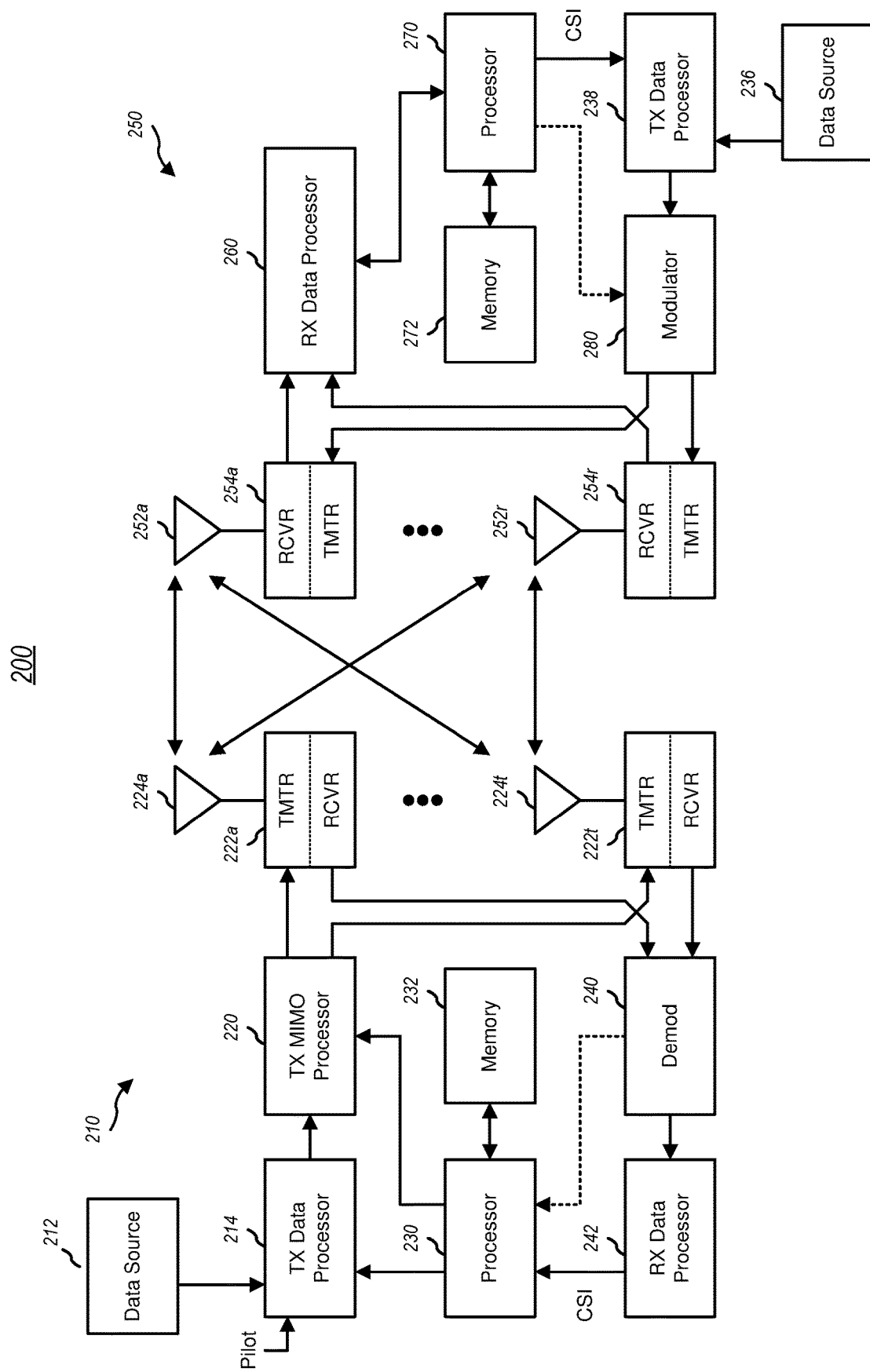
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
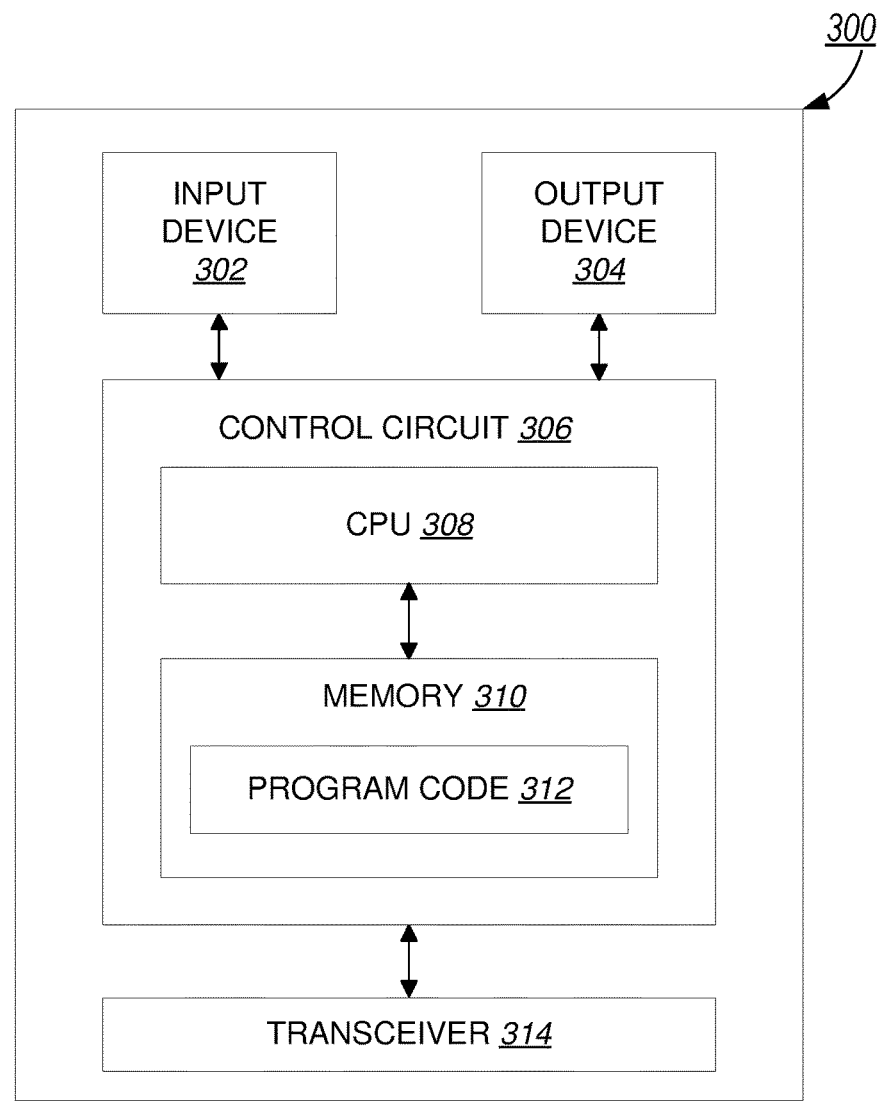
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
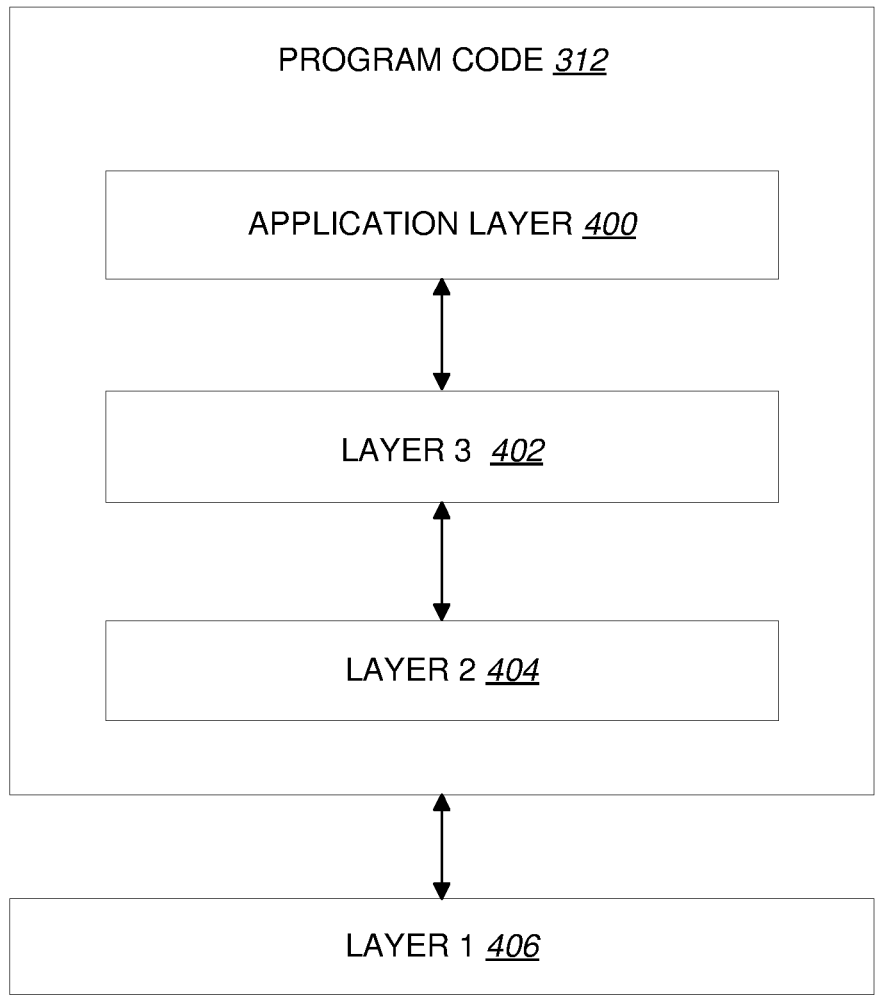
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

Sidelink (SL) related procedure for control is discussed in 3GPP TS 38.213 V17.3.0, one or more parts of which are quoted below:

16 UE Procedures for Sidelink

A UE is provided by SL-BWP-Config a BWP for SL transmissions (SL BWP) with numerology and resource grid determined as described in [4, TS 38.211]. For a resource pool within the SL BWP, the UE is provided by sl-NumSubchannel a number of sub-channels where each sub-channel includes a number of contiguous RBs provided by sl-SubchannelSize. The first RB of the first sub-channel in the SL BWP is indicated by sl-StartRB-Subchannel. Available slots for a resource pool are provided by sl-TimeResource and occur with a periodicity of 10240 ms. For an available slot without S-SS/PSBCH blocks, SL transmissions can start from a first symbol indicated by sl-StartSymbol and be within a number of consecutive symbols indicated by sl-LengthSymbols.

. . .

16.3 UE Procedure for Reporting and Obtaining Control Information in PSFCH

Control information provided by a PSFCH transmission includes HARQ-ACK information or conflict information.

16.3.0 UE Procedure for Transmitting PSFCH with Control Information

A UE can be indicated by an SCI format scheduling a PSSCH reception to transmit a PSFCH with HARQ-ACK information in response to the PSSCH reception. The UE provides HARQ-ACK information that includes ACK or NACK, or only NACK.

A UE can be provided, by sl-PSFCH-Period, a number of slots in a resource pool for a period of PSFCH transmission occasion resources. If the number is zero, PSFCH transmissions from the UE in the resource pool are disabled.

. . .

16.3.1 UE Procedure for Receiving PSFCH with Control Information

A UE that transmitted a PSSCH scheduled by a SCI format 2-A/2-B/2-C that indicates HARQ feedback enabled, attempts to receive associated PSFCHs with HARQ-ACK information according to PSFCH resources determined as described in clause 16.3.0. The UE determines an ACK or a NACK value for HARQ-ACK information provided in each PSFCH resource as described in [8-4, TS 38.101-4]. The UE does not determine both an ACK value and a NACK value at a same time for a PSFCH resource.

16.4 UE Procedure for Transmitting PSCCH

A UE can be provided a number of symbols in a resource pool, by sl-TimeResourcePSCCH, starting from a second symbol that is available for SL transmissions in a slot, and a number of PRBs in the resource pool, by sl-FreqResourcePSCCH, starting from the lowest PRB of the lowest sub-channel of the associated PSSCH, for a PSCCH transmission with a SCI format 1-A.

A UE that transmits a PSCCH with SCI format 1-A using sidelink resource allocation mode 2 [6, TS 38.214] sets
- "Resource reservation period" as an index in sl-ResourceReserve PeriodList corresponding to a reservation period provided by higher layers [11, TS 38.321], if the UE is provided sl-MultiReserveResource
- the values of the frequency resource assignment field and the time resource assignment field as described in [6, TS 38.214] to indicate N resources from a set $\{R_y\}$ of resources selected by higher layers as described in [11, TS 38.321] with N smallest slot indices $y_i$ for $0 \le i \le N-1$ such that $y_0 < y_1 < \ldots < y_{N-1} \le y_0 + 31$, where:
  $N = \min(N_{selected}, N_{max\_reserve})$, where $N_{selected}$ is a number of resources in the set $\{R_y\}$ with slot indices $y_j$, $0 \le j \le N_{selected}-1$, such that $y_0 < y_1 < \ldots < y_{N_{selected}-1} \le y_0 + 31$, and $N_{max\_reserve}$ is provided by sl-MaxNumPerReserve
- each resource, from the set of $\{R_y\}$ resources, corresponds to $L_{subCH}$ contiguous sub-channels and a slot in a set of slots $\{t'_y{}^{SL}\}$, where $L_{subCH}$ is the number of sub-channels available for PSSCH/PSCCH transmission in a slot
- $(t'_0{}^{SL}, t'_1{}^{SL}, t'_2{}^{SL}, \ldots)$ is a set of slots in a sidelink resource pool [6, TS 38.214]
- $y_0$ is an index of a slot where the PSCCH with SCI format 1-A is transmitted.

A UE that transmits a PSCCH with SCI format 1-A using sidelink resource allocation mode 1 [6, TS 38.214] sets
- the values of the frequency resource assignment field and the time resource assignment field for the SCI format 1-A transmitted in the m-th resource for PSCCH/

PSSCH transmission provided by a dynamic grant or by a SL configured grant, where m={1, ..., M} and M is the total number of resources for PSCCH/PSSCH transmission provided by a dynamic grant or the number of resources for PSCCH/PSSCH transmission in a period provided by a SL configured grant type 1 or SL configured grant type 2, as follows:

the frequency resource assignment field and time resource assignment field indicate the m-th to M-th resources as described in [6, TS 38.214].

For decoding of a SCI format 1-A, a UE may assume that a number of bits provided by sl-NumReservedBits can have any value as described in [4, TS 38.212].

SL related procedure for data is discussed in 3GPP TS 38.214 V17.3.0, one or more parts of which are quoted below:

8 Physical Sidelink Shared Channel Related Procedures

A UE can be configured by higher layers with one or more sidelink resource pools. A sidelink resource pool can be for transmission of PSSCH, as described in Clause 8.1, or for reception of PSSCH, as described in Clause 8.3 and can be associated with either sidelink resource allocation mode 1 or sidelink resource allocation mode 2.

In the frequency domain, a sidelink resource pool consists of sl-NumSubchannel contiguous sub-channels. A sub-channel consists of sl-SubchannelSize contiguous PRBs, where sl-NumSubchannel and sl-SubchannelSize are higher layer parameters.

The set of slots that may belong to a sidelink resource pool is denoted by $(t_0^{SL}, t_1^{SL}, \ldots, t_{T_{max}-1}^{SL})$ where $0 \le t_i^{SL} < 10240 \times 2^\mu$, $0 \le i < T_{max}$ the slot index is relative to slot #0 of the radio frame corresponding to SFN 0 of the serving cell or DFN 0,
    the set includes all the slots except the following slots,
        $N_{S-SSB}$ slots in which S-SS/PSBCH block (S-SSB) is configured,
        $N_{nonSL}$ slots in each of which at least one of Y-th, (Y+1)-th, ..., (Y+X−1)-th OFDM symbols are not semi-statically configured as UL as per the higher layer parameter tdd-UL-DL-ConfigurationCommon of the serving cell if provided or sl-TDD-Configuration if provided or sl-TDD-Config of the received PSBCH if provided, where Y and X are set by the higher layer parameters sl-StartSymbol and sl-LengthSymbols, respectively.

...

The slots in the set are arranged in increasing order of slot index.

The UE determines the set of slots assigned to a sidelink resource pool as follows:

a bitmap $(b_0, b_1, \ldots, b_{L_{bitmap}-1})$ associated with the resource pool is used where $L_{bitmap}$ the length of the bitmap is configured by higher layers.
    a slot $t_k^{SL}$ ($0 \le k < 10240 \times 2^\mu - N_{S-SSB} - N_{nonSL} - N_{reserved}$) belongs to the set if $b_{k'}=1$ where $k' = k \bmod L_{bitmap}$.
    The slots in the set are re-indexed such that the subscripts i of the remaining slots $t'_i^{SL}$ are successive $\{0, 1, \ldots, T'_{max}-1\}$ where $T'_{max}$ is the number of the slots remaining in the set.

The UE determines the set of resource blocks assigned to a sidelink resource pool as follows:

The resource block pool consists of $N_{PRB}$ PRBs.
    The sub-channel m for m=0, 1, ..., numSubchannel−1 consists of a set of $n_{subCHsize}$ contiguous resource blocks with the physical resource block number $n_{PRB} = n_{subCHRBstart} + m \cdot n_{subCHsize} + j$ for j=0, 1, ..., $n_{subCHsize}-1$, where $n_{subCHRBstart}$ and $n_{subCHsize}$ are given by higher layer parameters sl-StartRB-Subchannel and sl-SubchannelSize, respectively A UE is not expected to use the last $N_{PRB} \bmod n_{subCHsize}$ PRBs in the resource pool.

8.1 UE Procedure for Transmitting the Physical Sidelink Shared Channel

Each PSSCH transmission is associated with an PSCCH transmission.

That PSCCH transmission carries the $1^{st}$ stage of the SCI associated with the PSSCH transmission; the $2^{nd}$ stage of the associated SCI is carried within the resource of the PSSCH.

If the UE transmits SCI format 1-A on PSCCH according to a PSCCH resource configuration in slot n and PSCCH resource m, then for the associated PSSCH transmission in the same slot one transport block is transmitted with up to two layers;
    The number of layers (v) is determined according to the 'Number of DMRS port' field in the SCI;
    The set of consecutive symbols within the slot for transmission of the PSSCH is determined according to clause 8.1.2.1;
    The set of contiguous resource blocks for transmission of the PSSCH is determined according to clause 8.1.2.2;

Transform precoding is not supported for PSSCH transmission.

Only wideband precoding is supported for PSSCH transmission.

The DM-RS antenna ports in Clause 8.4.1.1.2 of [4, TS38.211] are determined according to the ordering of DM-RS port(s) given by Tables 8.3.1.1-3 in Clause 8.3.1.1 of [5, TS 38.212].

The UE shall set the contents of the SCI format 2-A as follows:

the UE shall set value of the 'HARQ process number' field as indicated by higher layers.
    the UE shall set value of the 'NDI' field as indicated by higher layers.
    the UE shall set value of the 'Redundancy version' field as indicated by higher layers.
    the UE shall set value of the 'Source ID' field as indicated by higher layers.
    the UE shall set value of the 'Destination ID' field as indicated by higher layers.
    the UE shall set value of the 'HARQ feedback enabled/disabled indicator' field as indicated by higher layers.
    the UE shall set value of the 'Cast type indicator' field as indicated by higher layers.
    the UE shall set value of the 'CSI request' field as indicated by higher layers.

The UE shall set the contents of the SCI formats 2-B as follows:

the UE shall set value of the 'HARQ process number' field as indicated by higher layers.
    the UE shall set value of the 'NDI' field as indicated by higher layers.
    the UE shall set value of the 'Redundancy version' field as indicated by higher layers.
    the UE shall set value of the 'Source ID' field as indicated by higher layers.
    the UE shall set value of the 'Destination ID' field as indicated by higher layers.
    the UE shall set value of the 'HARQ feedback enabled/disabled indicator' field as indicated by higher layers.
    the UE shall set value of the 'Zone ID' field as indicated by higher layers.
    the UE shall set the 'Communication range requirement' field as indicated by higher layers.

The UE shall set the contents of the SCI format 2-C as follows:
  the UE shall set value of the 'HARQ process number' field as indicated by higher layers.
  the UE shall set value of the 'NDI' field as indicated by higher layers.
  the UE shall set value of the 'Redundancy version' field as indicated by higher layers.
  the UE shall set value of the 'Source ID' field as indicated by higher layers.
  the UE shall set value of the 'Destination ID' field as indicated by higher layers.
  the UE shall set value of the 'HARQ feedback enabled/disabled indicator' field as indicated by higher layers.
  the UE shall set value of the 'CSI request' field as indicated by higher layers.
  the UE shall set value of [request/coordination information flag] field as indicated by higher layers.
. . .

8.1.1 Transmission Schemes
Only one transmission scheme is defined for the PSSCH and is used for all PSSCH transmissions.
PSSCH transmission is performed with up to two antenna ports, with antenna ports 1000-1001 as defined in clause 8.2.4 of [4, TS 38.211].
8.1.2 Resource Allocation
In sidelink resource allocation mode 1:
  for PSSCH and PSCCH transmission, dynamic grant, configured grant type 1 and configured grant type 2 are supported. The configured grant Type 2 sidelink transmission is semi-persistently scheduled by a SL grant in a valid activation DCI according to Clause 10.2A of [6, TS 38.213].
8.1.2.1 Resource Allocation in Time Domain
The UE shall transmit the PSSCH in the same slot as the associated PSCCH.
The minimum resource allocation unit in the time domain is a slot.
The UE shall transmit the PSSCH in consecutive symbols within the slot, subject to the following restrictions:
  The UE shall not transmit PSSCH in symbols which are not configured for sidelink. A symbol is configured for sidelink, according to higher layer parameters sl-StartSymbol and sl-LengthSymbols, where sl-StartSymbol is the symbol index of the first symbol of sl-LengthSymbols consecutive symbols configured for sidelink.
  Within the slot, PSSCH resource allocation starts at symbol sl-StartSymbol+1.
  The UE shall not transmit PSSCH in symbols which are configured for use by PSFCH, if PSFCH is configured in this slot.
  The UE shall not transmit PSSCH in the last symbol configured for sidelink.
  The UE shall not transmit PSSCH in the symbol immediately preceding the symbols which are configured for use by PSFCH, if PSFCH is configured in this slot.
In sidelink resource allocation mode 1:
  For sidelink dynamic grant, the PSSCH transmission is scheduled by a DCI format 3_0.
  For sidelink configured grant type 2, the configured grant is activated by a DCI format 3_0.
  For sidelink dynamic grant and sidelink configured grant type 2:
    The "Time gap" field value m of the DCI format 3_0 provides an index m+1 into a slot offset table. That table is given by higher layer parameter sl-DCI-ToSL-Trans and the table value at index m+1 will be referred to as slot offset $K_{SL}$.
    The slot of the first sidelink transmission scheduled by the DCI is the first SL slot of the corresponding resource pool that starts not earlier than $T_{DL} - T_{TA}/2 + K_{SL} \times T_{slot}$, where $T_{DL}$ is the starting time of the downlink slot carrying the corresponding DCI, $T_{TA}$ is the timing advance value corresponding to the TAG of the serving cell on which the DCI is received and $K_{SL}$ is the slot offset between the slot of the DCI and the first sidelink transmission scheduled by DCI and $T_{slot}$ is the SL slot duration.
    The "Configuration index" field of the DCI format 3_0, if provided and not reserved, indicates the index of the sidelink configured type 2.
  For sidelink configured grant type 1:
    The slot of the first sidelink transmissions follows the higher layer configuration according to [10, TS 38.321].
8.1.2.2 Resource Allocation in Frequency Domain
The resource allocation unit in the frequency domain is the sub-channel.
The sub-channel assignment for sidelink transmission is determined using the "Frequency resource assignment" field in the associated SCI.
The lowest sub-channel for sidelink transmission is the sub-channel on which the lowest PRB of the associated PSCCH is transmitted.
If a PSSCH scheduled by a PSCCH would overlap with resources containing the PSCCH, the resources corresponding to a union of the PSCCH that scheduled the PSSCH and associated PSCCH DM-RS are not available for the PSSCH.
. . .
8.1.4 UE Procedure for Determining the Subset of Resources to be Reported to Higher Layers in PSSCH Resource Selection in Sidelink Resource Allocation Mode 2
In resource allocation mode 2, the higher layer can request the UE to determine a subset of resources from which the higher layer will select resources for PSSCH/PSCCH transmission. To trigger this procedure, in slot n, the higher layer provides the following parameters for this PSSCH/PSCCH transmission:
  the resource pool from which the resources are to be reported;
  L1 priority, $prio_{TX}$;
  the remaining packet delay budget;
  the number of sub-channels to be used for the PSSCH/PSCCH transmission in a slot, $L_{subCH}$;
  optionally, the resource reservation interval, $P_{rsvp\_TX}$, in units of msec.
  if the higher layer requests the UE to determine a subset of resources from which the higher layer will select resources for PSSCH/PSCCH transmission as part of re-evaluation or pre-emption procedure, the higher layer provides a set of resources $(r_0, r_1, r_2, \ldots)$ which may be subject to re-evaluation and a set of resources $(r_0', r_1', r_2', \ldots)$ which may be subject to pre-emption.
  it is up to UE implementation to determine the subset of resources as requested by higher layers before or after the slot $r_i'' - T_3$, where $r_i''$ is the slot with the smallest slot index among $(r_0, r_1, r_2, \ldots)$ and $(r_0', r_1', r_2', \ldots)$, and $T_3$ is equal to $T_{proc,1}^{SL}$, where $T_{proc,1}^{SL}$ is defined in slots in Table 8.1.4-2 where $\mu_{SL}$ is the SCS configuration of the SL BWP.
Optionally, the indication of resource selection mechanism(s), as sl-AllowedResourceSelectionConfig, which may comprise of full sensing only, partial sensing only, random resource selection only, or any combination(s) thereof.

. . .

8.1.5 UE Procedure for Determining Slots and Resource Blocks for PSSCH Transmission Associated with an SCI Format 1-A The set of slots and resource blocks for PSSCH transmission is determined by the resource used for the PSCCH transmission containing the associated SCI format 1-A, and fields 'Frequency resource assignment', 'Time resource assignment' of the associated SCI format 1-A as described below.

. . .

8.1.7 UE Procedure for Determining the Number of Logical Slots for a Reservation Period A given resource reservation period $P_{rsvp}$ in milliseconds is converted to a period $P'_{rsvp}$ in logical slots as:

$$P'_{rsvp} = \left\lceil \frac{T'_{max}}{10240 \text{ ms}} \times P_{rsvp} \right\rceil$$

where $T'_{max}$ is the number of slots that belong to a resource pool as defined in Clause 8.

8.2 UE Procedure for Transmitting Sidelink Reference Signals

8.2.1 CSI-RS Transmission Procedure

A UE transmits sidelink CSI-RS within a unicast PSSCH transmission if the following conditions hold:
- CSI reporting is enabled by higher layer parameter sl-CSI-Acquisition; and
- the 'CSI request' field in the corresponding SCI format 2-A is set to 1.

The following parameters for CSI-RS transmission are configured for each CSI-RS configuration:
- sl-CSI-RS-FirstSymbol indicates the first OFDM symbol in a PRB used for SL CSI-RS
- sl-CSI-RS-FreqAllocation indicates the number of antenna ports and the frequency domain allocation for SL CSI-RS.

When the UE is configured with $Q_p=\{1,2\}$ CSI-RS port(s) in sidelink and the number of scheduled layers PSSCH is $n_{layer}^{PSSCH}$, The CSI-RS scaling factor $\beta_{CSIRS}$ specified in clause 8.4.1.5.3 of [4, TS 38.211] is given by $$\beta_{CSIRS} = \beta_{DMRS}^{PSSCH} \cdot \sqrt{\frac{n_{layer}^{PSSCH}}{Q_p}}$$

where $\beta_{DMRS}^{PSSCH}$ is the scaling factor for the corresponding PSSCH specified in clause 8.3.1.5 of [4, TS 38.211].

8.2.2 PSSCH DM-RS Transmission Procedure

The UE selects the DM-RS time domain pattern out of the patterns configured using the higher layer parameter sl-PSSCH-DMRS-TimePatternList for the resource pool on which the PSSCH is to be transmitted. If more than one DM-RS time domain pattern is configured, the selected pattern is indicated by the 'DMRS pattern' field in the SCI format 1-A associated with the PSSCH transmission.

If PSSCH DM-RS and PSCCH are mapped to the same OFDM symbol, then this mapping within a single sub-channel is only supported if higher layer parameter sl-SubchannelSize>=20, i.e. the sub-channel size is at least 20 PRBs.

When a sub-channel size is less than 20 PRBs and the size of PSCCH is less than the sub-channel size, a UE is not expected to choose a PSSCH DM-RS pattern to be transmitted in the same OFDM symbol with PSCCH.

8.2.3 PT-RS Transmission Procedure

Transmission of PT-RS is only supported in frequency range 2.

The UE PT-RS transmission procedure specified in clause 6.2.3.1 applies for derivation of the PT-RS parameters $L_{PT-RS}$ and $K_{PT-RS}$ and for determination of PT-RS presence, with the following changes:
- timeDensity and frequencyDensity in PTRS-UplinkConfig are replaced by sl-PTRS-TimeDensity and sl-PTRS-FreqDensity in SL-PTRS-Config respectively, and SL-PTRS-Config is (pre)configured per resource pool;
- the number of antenna ports is the same as the number of PSSCH DM-RS antenna ports and the association between a PT-RS antenna port and a PSSCH DM-RS antenna port is fixed.

8.3 UE Procedure for Receiving the Physical Sidelink Shared Channel

For sidelink resource allocation mode 1, a UE upon detection of SCI format 1-A on PSCCH can decode PSSCH according to the detected SCI formats 2-A and 2-B, and associated PSSCH resource configuration configured by higher layers. The UE is not required to decode more than one PSCCH at each PSCCH resource candidate.

For sidelink resource allocation mode 2, a UE upon detection of SCI format 1-A on PSCCH can decode PSSCH according to the detected SCI formats 2-A and 2-B, and associated PSSCH resource configuration configured by higher layers. The UE is not required to decode more than one PSCCH at each PSCCH resource candidate.

A UE is required to decode neither the corresponding SCI formats 2-A and 2-B nor the PSSCH associated with an SCI format 1-A if the SCI format 1-A indicates an MCS table that the UE does not support.

8.4 UE Procedure for Receiving Reference Signals

8.4.1 CSI-RS Reception Procedure

The CSI-RS defined in Clause 8.4.1.5 of [4, TS 38.211] may be used for CSI computation.

8.4.2 DM-RS reception procedure for RSRP computation

8.4.2.1 RSRP for resource selection in sidelink resource allocation mode 2

In sidelink resource allocation mode 2, the UE measures RSRP for resource selection as follows:
- PSSCH-RSRP over the DM-RS resource elements for the PSSCH according to the received SCI format 1-A if higher layer parameter sl-RS-ForSensing is set to 'pssch', and
- PSCCH-RSRP over the DM-RS resource elements for the PSCCH carrying to the received SCI format 1-A if higher layer parameter sl-RS-ForSensing is set to 'pscch'.

8.4.3 PT-RS reception procedure

Reception of PT-RS is only supported in frequency range 2. The UE PT-RS reception procedure specified in clause 5.1.6.3 applies for derivation of the PT-RS parameters $L_{PT-RS}$ and $K_{PT-RS}$ and for determination of PT-RS presence, with the following changes:
- time Density and frequencyDensity in PTRS-DownlinkConfig are replaced by sl-PTRS-Time Density and sl-PTRS-FreqDensity in SL-PTRS-Config respectively, and SL-PTRS-Config is (pre)configured per resource pool;

the number of antenna ports is the same as the number of PSSCH DM-RS antenna ports and the association between a PT-RS antenna port and a PSSCH DM-RS antenna port is fixed.

8.5 UE Procedure for Reporting Channel State Information (CSI)

8.5.1 Channel State Information Framework

CSI consists of Channel Quality Indicator (CQI) and Rank Indicator (RI). The CQI and RI are always reported together.

8.5.1.1 Reporting Configurations

The UE shall calculate CSI parameters (if reported) assuming the following dependencies between CSI parameters (if reported)

CQI shall be calculated conditioned on the reported RI

The CSI reporting can be aperiodic (using [10, TS 38.321]). Table 8.5.1.1-1 shows the supported combinations of CSI reporting configurations and CSI-RS configurations and how the CSI reporting is triggered for CSI-RS configuration. Aperiodic CSI-RS is configured and triggered/activated as described in Clause 8.5.1.2.

TABLE 8.5.1.1-1

Triggering/Activation of CSI reporting for the possible CSI-RS Configurations.

| CSI-RS Configuration | Aperiodic CSI Reporting |
|---|---|
| Aperiodic CSI-RS | Triggered by SCI. |

For CSI reporting, wideband CQI reporting is supported. A wideband CQI is reported for a single codeword for the entire CSI reporting band.

8.5.1.2 Triggering of Sidelink CSI Reports

The CSI-triggering UE is not allowed to trigger another aperiodic CSI report for the same UE before the last slot of the expected reception or completion of the ongoing aperiodic CSI report associated with the SCI format 2-A with the 'CSI request' field set to 1, where the last slot of the expected reception of the ongoing aperiodic CSI report is given by [10, TS38.321].

An aperiodic CSI report is triggered by an SCI format 2-A with the 'CSI request' field set to 1.

A UE is not expected to transmit a sidelink CSI-RS and a sidelink PT-RS which overlap.

8.5.2 Channel State Information 8.5.2.1 CSI Reporting Quantities 8.5.2.1.1 Channel Quality Indicator (CQI)

The UE shall derive CQI as specified in clause 5.2.2.1, with the following changes PDSCH replaced by PSSCH uplink slot replaced by sidelink slot downlink physical resource blocks replaced by sidelink physical resource blocks Transport Block Size determination according to Clause 8.1.3.2

CSI reference resource according to the Clause 8.5.2.3 interference measurements are not supported sub-band CQI is not supported cqi-Table is determined as follows cqi-Table='table1' if Table 5.1.3.1-1 is determined as the MCS table according to Clause 8.1.3.1 of [6, 38.214], cqi-Table='table2' if Table 5.1.3.1-2 is determined as the MCS table according to Clause 8.1.3.1 of [6, 38.214], cqi-Table='table3' if Table 5.1.3.1-3 is determined as the MCS table according to Clause 8.1.3.1 of [6, 38.214]

8.5.2.2 Reference Signal (CSI-RS)

The UE can be configured with one CSI-RS pattern as indicated by the higher layer parameters sl-CSI-RS-FreqAllocation, sl-CSI-RS-FirstSymbol in SL-CSI-RS-Config. Parameters for which the UE shall assume non-zero transmission power for CSI-RS are configured according to clause 8.2.1.

A UE is not expected to be configured such that a CSI-RS and the corresponding PSCCH can be mapped to the same resource element. A UE is not expected to receive sidelink CSI-RS and PSSCH DM-RS, nor CSI-RS and 2nd-stage SCI, on the same symbol.

Sidelink CSI-RS shall be transmitted according to [4, TS 38.211] in the resource blocks used for the PSSCH associated with the SCI format 2-A triggering a report.

8.5.2.3 CSI Reference Resource Definition

The CSI reference resource in sidelink is defined as follows:

In the frequency domain, the CSI reference resource is defined by the group of sidelink physical resource blocks containing the sidelink CSI-RS to which the derived CSI relates.

In the time domain, the CSI reference resource for a CSI reporting in sidelink slot n is defined by a single sidelink slot $n_{CSI\_ref}$ where $n_{CSI\_ref}$ is the same sidelink slot as the corresponding CSI request.

If configured to report CQI index and RI index, in the CSI reference resource, the UE shall assume the following for the purpose of deriving the CQI index and RI index:

The reference resource uses the CP length and subcarrier spacing configured for the SL BWP.

Redundancy Version 0.

PSCCH occupies 2 OFDM symbols.

The number of PSSCH and DM-RS symbols is equal to sl-LengthSymbols-2.

Assume no REs allocated for sidelink CSI-RS.

Assume no REs allocated SCI format 2-A or SCI format 2-B.

Assume the same number of DM-RS symbols as the smallest one configured by the higher layer parameter sl-PSSCH-DMRS-TimePatternList.

Assume no REs allocated for sidelink PT-RS.

Assume sidelink CSI-RS RE power is the same as PSSCH RE power.

The PSSCH transmission scheme where the UE may assume that PSSCH transmission would be performed with up to 2 transmission layers as defined in Clause 8.3.1.4 of [4, TS 38.211]. For CQI calculation, the UE should assume that PSSCH signals on antenna ports in the set [1000, . . . , 1000+v−1] for v layers would result in signals equivalent to corresponding symbols transmitted on antenna ports [3000, . . . , 3000+P−1], as given by $$\begin{bmatrix} y^{(3000)}(i) \\ \ldots \\ y^{(3000+P-1)}(i) \end{bmatrix} = W(i) \begin{bmatrix} x^{(0)}(i) \\ \ldots \\ x^{(v-1)}(i) \end{bmatrix}$$

Where $x(i)=[x^{(0)}(i) \ldots x^{(v-1)}(i)]^T$ is a vector of PSSCH symbols from the layer mapping defined in Clause 8.3.1.4 of [4, TS 38.211], $P \in [1,2]$ is the number of CSI-RS ports. If only one CSI-RS port is configured, $W(i)$ is 1. Otherwise, $W(i)$ is the identity matrix.

8.5.3 CSI Reporting

The UE can be configured with one CSI reporting latency bound as indicated by the higher layer parameter sl-LatencyBoundCSI-Report. CSI reporting is aperiodic and is described in [10, TS 38.321].

Downlink Control Information (DCI) format and/or SL grant and/or Sidelink Control Information (SCI) format for sidelink are discussed in 3GPP TS 38.212 V17.3.0, one or more parts of which are quoted below:

7.3.1.4 DCI Formats for Scheduling of Sidelink
7.3.1.4.1 Format 3_0

DCI format 3_0 is used for scheduling of NR PSCCH and NR PSSCH in one cell.

The following information is transmitted by means of the DCI format 3_0 with CRC scrambled by SL-RNTI or SL-CS-RNTI:

Resource pool index—$\lceil \log_2 I \rceil$ bits, where I is the number of resource pools for transmission configured by the higher layer parameter sl-TxPoolScheduling.

Time gap—3 bits determined by higher layer parameter sl-DCI-ToSL-Trans, as defined in clause 8.1.2.1 of [6, TS 38.214]

HARQ process number—4 bits.

New data indicator—1 bit.

Lowest index of the subchannel allocation to the initial transmission—$\lceil \log_2(N_{subChannel}^{SL}) \rceil$ bits as defined in clause 8.1.2.2 of [6, TS 38.214]

SCI format 1-A fields according to clause 8.3.1.1:
  Frequency resource assignment.
  Time resource assignment.
  PSFCH-to-HARQ feedback timing indicator—$\lceil \log_2 N_{fb\_timing} \rceil$ bits, where $N_{fb\_timing}$ is the number of entries in the higher layer parameter sl-PSFCH-ToPUCCH, as defined in clause 16.5 of [5, TS 38.213]
  PUCCH resource indicator—3 bits as defined in clause 16.5 of [5, TS 38.213].
  . . .
  Padding bits, if required

. . .

8.3 Sidelink Control Information on PSCCH

SCI carried on PSCCH is a 1$^{st}$-stage SCI, which transports sidelink scheduling information.

8.3.1 1$^{st}$-Stage SCI Formats

. . .

8.3.1.1 SCI Format 1-A

SCI format 1-A is used for the scheduling of PSSCH and 2nd-stage-SCI on PSSCH

The following information is transmitted by means of the SCI format 1-A:

Priority—3 bits as specified in clause 5.4.3.3 of [12, TS 23.287] and clause 5.22.1.3.1 of [8, TS 38.321]. Value '000' of Priority field corresponds to priority value '1', value '001' of Priority field corresponds to priority value '2', and so on.

Frequency resource assignment $$-\left\lceil \log_2\left(\frac{N_{subChannel}^{SL}(N_{subChannel}^{SL}+1)}{2}\right)\right\rceil$$

bits when the value of the higher layer parameter sl-MaxNumPerReserve is configured to 2; otherwise $$\left\lceil \log_2\left(\frac{N_{subChannel}^{SL}(N_{subChannel}^{SL}+1)(2N_{subChannel}^{SL}+1)}{6}\right)\right\rceil$$

bits when the value of the higher layer parameter sl-MaxNumPerReserve is configured to 3, as defined in clause 8.1.5 of [6, TS 38.214].

Time resource assignment—5 bits when the value of the higher layer parameter sl-MaxNumPerReserve is configured to 2; otherwise 9 bits when the value of the higher layer parameter sl-MaxNumPerReserve is configured to 3, as defined in clause 8.1.5 of [6, TS 38.214].

Resource reservation period—$\lceil \log_2 N_{rsv\_period} \rceil$ bits as defined in clause 16.4 of [5, TS 38.213], where $N_{rsv\_period}$ is the number of entries in the higher layer parameter sl-ResourceReservePeriodList, if higher layer parameter sl-MultiReserveResource is configured; 0 bit otherwise.

DMRS pattern—$\lceil \log_2 N_{pattern} \rceil$ bits as defined in clause 8.4.1.1.2 of [4, TS 38.211], where $N_{pattern}$ is the number of DMRS patterns configured by higher layer parameter sl-PSSCH-DMRS-TimePatternList.

2$^{nd}$-stage SCI format—2 bits as defined in Table 8.3.1.1-1.

Beta_offset indicator—2 bits as provided by higher layer parameter sl-BetaOffsets2ndSCI and Table 8.3.1.1-2.

Number of DMRS port—1 bit as defined in Table 8.3.1.1-3.

Modulation and coding scheme—5 bits as defined in clause 8.1.3 of [6, TS 38.214].

Additional MCS table indicator—as defined in clause 8.1.3.1 of [6, TS 38.214]: 1 bit if one MCS table is configured by higher layer parameter sl-Additional-MCS-Table; 2 bits if two MCS tables are configured by higher layer parameter sl-Additional-MCS-Table; 0 bit otherwise.

PSFCH overhead indication—1 bit as defined clause 8.1.3.2 of [6, TS 38.214] if higher layer parameter sl-PSFCH-Period=2 or 4; 0 bit otherwise.

Reserved—a number of bits as determined by the following:

$N_{reserved}$ bits as configured by higher layer parameter sl-NumReservedBits, with value set to zero, if higher layer parameter indicationUEBScheme2 is not configured, or if higher layer parameter indicationUEBScheme2 is configured to 'Disabled';

$(N_{reserved}-1)$ bits otherwise, with value set to zero.

Conflict information receiver flag—0 or 1 bit 1 bit if higher layer parameter indicationUEBScheme2 is configured to 'Enabled', where the bit value of 0 indicates that the UE cannot be a UE to receive conflict information and the bit value of 1 indicates that the UE can be a UE to receive conflict information as defined in Clause 16.3.0 of [5, TS 38.213];

0 bit otherwise.

TABLE 8.3.1.1-1

2$^{nd}$-stage SCI formats

| Value of 2nd-stage SCI format field | 2nd-stage SCI format |
|---|---|
| 00 | SCI format 2-A |
| 01 | SCI format 2-B |

TABLE 8.3.1.1-1-continued

| 2nd-stage SCI formats | |
|---|---|
| Value of 2nd-stage SCI format field | 2nd-stage SCI format |
| 10 | SCI format 2-C |
| 11 | Reserved |

. . .

8.4 Sidelink Control Information on PSSCH

SCI carried on PSSCH is a 2nd-stage SCI, which transports sidelink scheduling information, and/or inter-UE coordination related information.

8.4.1 $2^{nd}$-Stage SCI Formats

. . .

8.4.1.1 SCI Format 2-A

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

HARQ process number—4 bits.
New data indicator—1 bit.
Redundancy version—2 bits as defined in Table 7.3.1.1.1-2.
Source ID—8 bits as defined in clause 8.1 of [6, TS 38.214].
Destination ID—16 bits as defined in clause 8.1 of [6, TS 38.214].
HARQ feedback enabled/disabled indicator—1 bit as defined in clause 16.3 of [5, TS 38.213].
Cast type indicator—2 bits as defined in Table 8.4.1.1-1 and in clause 8.1 of [6, TS 38.214].
CSI request—1 bit as defined in clause 8.2.1 of [6, TS 38.214] and in clause 8.1 of [6, TS 38.214].

TABLE 8.4.1.1-1

| Cast type indicator | |
|---|---|
| Value of Cast type indicator | Cast type |
| 00 | Broadcast |
| 01 | Groupcast when HARQ-ACK information includes ACK or NACK |
| 10 | Unicast |
| 11 | Groupcast when HARQ-ACK information includes only NACK |

8.4.1.2 SCI Format 2-B

SCI format 2-B is used for the decoding of PSSCH, with HARQ operation when HARQ-ACK information includes only NACK, or when there is no feedback of HARQ-ACK information.

The following information is transmitted by means of the SCI format 2-B:

HARQ process number—4 bits.
New data indicator—1 bit.
Redundancy version—2 bits as defined in Table 7.3.1.1.1-2.
Source ID—8 bits as defined in clause 8.1 of [6, TS 38.214].
Destination ID—16 bits as defined in clause 8.1 of [6, TS 38.214].
HARQ feedback enabled/disabled indicator—1 bit as defined in clause 16.3 of [5, TS 38.213].
Zone ID—12 bits as defined in clause 5.8.11 of [9, TS 38.331].
Communication range requirement—4 bits determined by higher layer parameter sl-ZoneConfigMCR-Index.

8.4.1.3 SCI Format 2-C

SCI format 2-C is used for the decoding of PSSCH, and providing inter-UE coordination information or requesting inter-UE coordination information. SCI format 2-C can be used only for unicast.

The following information is transmitted by means of the SCI format 2-C:

HARQ process number—4 bits
New data indicator—1 bit
Redundancy version—2 bits as defined in Table 7.3.1.1.1-2
Source ID—8 bits as defined in clause 8.1 of [6, TS 38.214]
Destination ID—16 bits as defined in clause 8.1 of [6, TS 38.214]
HARQ feedback enabled/disabled indicator—1 bit as defined in clause 16.3 of [5, TS 38.213]
CSI request—1 bit as defined in clause 8.2.1 of [6, TS 38.214] and in clause 8.1 of [6, TS 38.214]
Providing/Requesting indicator—1 bit, where value 0 indicates SCI format 2-C is used for providing inter-UE coordination information and value 1 indicates SCI format 2-C is used for requesting inter-UE coordination information

. . .

8.4.4 Rate Matching

For $2^{nd}$-stage SCI transmission on PSSCH with SL-SCH, the number of coded modulation symbols generated for $2^{nd}$-stage SCI transmission prior to duplication for the $2^{nd}$ layer if present, denoted as $Q_{SCI2}'$, is determined as follows:

. . .

8.4.5 Multiplexing of Coded $2^{nd}$-Stage SCI Bits to PSSCH

The coded $2^{nd}$-stage SCI bits are multiplexed onto PSSCH according to the procedures in Clause 8.2.1.

Sidelink reference signals and sidelink channels are discussed in 3GPP TS 38.211 V17.3.0, one or more parts of which are quoted below:

8.3 Physical Channels 8.3.1 Physical Sidelink Shared Channel 8.3.1.1 Scrambling

For the single codeword q=0, the block of bits $b^{(q)}(0), \ldots, b^{(q)}(M_{bit}^{(q)}-1)$, where $M_{bit}^{(q)} = M_{bit,SCI2}^{(q)} + M_{bit,data}^{(q)}$ is the number of bits in codeword q transmitted on the physical channel as defined in [4, TS 38.212], shall be scrambled prior to modulation.

. . .

8.3.1.5 Mapping to Virtual Resource Blocks

For each of the antenna ports used for transmission of the PSSCH, the block of complex-valued symbols $z^{(p)}(0), \ldots, z^{(p)}(M_{symb}^{ap}-1)$ shall be multiplied with the amplitude scaling factor $\beta_{DMRS}^{PSSCH}$ in order to conform to the transmit power specified in [5, TS 38.213] and mapped to resource elements $(k', l)_{p,\mu}$ in the virtual resource blocks assigned for transmission, where k'=0 is the first subcarrier in the lowest-numbered virtual resource block assigned for transmission. The mapping operation shall be done in two steps:

first, the complex-valued symbols corresponding to the bit for the $2^{nd}$-stage SCI in increasing order of first the index k' over the assigned virtual resource blocks and then the index l, starting from the first PSSCH symbol carrying an associated DM-RS and meeting all of the following criteria:
  the corresponding resource elements in the corresponding physical resource blocks are not used for transmission of the associated DM-RS, PT-RS, or PSCCH;
secondly, the complex-valued modulation symbols not corresponding to the $2^{nd}$-stage SCI shall be in increasing order of first the index k' over the assigned virtual resource blocks, and then the index l with the starting position given by [6, TS 38.214] and meeting all of the following criteria:
  the resource elements are not used for $2^{nd}$-stage SCI in the first step;
  the corresponding resource elements in the corresponding physical resource blocks are not used for transmission of the associated DM-RS, PT-RS, CSI-RS, or PSCCH.

The resource elements used for the PSSCH in the first OFDM symbol in the mapping operation above, including any DM-RS, PT-RS, or CSI-RS occurring in the first OFDM symbol, shall be duplicated in the OFDM symbol immediately preceding the first OFDM symbol in the mapping.

8.3.1.6 Mapping from Virtual to Physical Resource Blocks
Virtual resource blocks shall be mapped to physical resource blocks according to non-interleaved mapping.
For non-interleaved VRB-to-PRB mapping, virtual resource block n is mapped to physical resource block n.

8.3.2 Physical Sidelink Control Channel
...
8.3.2.3 Mapping to Physical Resources
The set of complex-valued modulation symbols d(0), . . . , $d(M_{symb}-1)$ shall be multiplied with the amplitude scaling factor $\beta_{DMRS}^{PSCCH}$ in order to conform to the transmit power specified in [5, TS 38.213] and mapped in sequence starting with d(0) to resource elements $(k,l)_{p,\mu}$ assigned for transmission according to clause 16.4 of [5, TS 38.213], and not used for the demodulation reference signals associated with PSCCH, in increasing order of first the index k over the assigned physical resources, and then the index l on antenna port p=2000.
The resource elements used for the PSCCH in the first OFDM symbol in the mapping operation above, including any DM-RS, PT-RS, or CSI-RS occurring in the first OFDM symbol, shall be duplicated in the immediately preceding OFDM symbol.
...
8.4 Physical Signals
8.4.1 Reference Signals
8.4.1.1 Demodulation Reference Signals for PSSCH
8.4.1.1.1 Sequence Generation
The sequence $r_l(m)$ shall be generated according to $$r_l(m) = \frac{1}{\sqrt{2}}(1-2c(2m)) + j\frac{1}{\sqrt{2}}(1-2c(2m+1))$$

where the pseudo-random sequence c(m) is defined in clause 5.2.1. The pseudo-random sequence generator shall be initialized with $$c_{init}=(2^{17}(N_{symb}^{slot}n_{s,f}^{\mu}+l+1)(2N_{ID}+1)+2N_{ID}) \mod 2^{31}$$

where l is the OFDM symbol number within the slot, $n_{s,f}^{\mu}$ is the slot number within a frame, and $N_{ID}=N_{ID}^{X} \mod 2^{16}$ where the quantity Nib equals the decimal representation of CRC on the PSCCH associated with the PSSCH according to $$N_{ID}^{X} = \sum_{i=0}^{L-1} p_i \cdot 2^{L-1-i}$$

with p and L given by clause 7.3.2 in [4, TS 38.212].
8.4.1.1.2 Mapping to Physical Resources
The sequence r(m) shall be mapped to the intermediate quantity $\tilde{a}_{k,l}^{(\tilde{p}_j,\mu)}$ according to clause 6.4.1.1.3 using configuration type 1 without transform precoding, and where $w_f(k')$, $w_t(l')$, and $\Delta$ are given by Table 8.4.1.1.2-2, and r(m) is specified in clause 8.4.1.1.1.
The patterns used for the PSSCH DM-RS is indicated in the SCI as described in clause 8.3.1.1 of [4, TS 38.212].
The intermediate quantity $\tilde{a}_{k,l}^{(\tilde{p}_j,\mu)}$ shall be precoded, multiplied with the amplitude scaling factor $\beta_{DMRS}^{PSSCH}$ specified in clause 8.3.1.5, and mapped to physical resources according to $$\begin{bmatrix} a_{k,l}^{(p_0,\mu)} \\ \vdots \\ a_{k,l}^{(p_{\rho-1},\mu)} \end{bmatrix} = \beta_{DMRS}^{PSSCH} W \begin{bmatrix} \tilde{a}_{k,l}^{(\tilde{p}_0,\mu)} \\ \vdots \\ \tilde{a}_{k,l}^{(\tilde{p}_{v-1},\mu)} \end{bmatrix}$$

where
  the precoding matrix W is given by clause 8.3.1.4,
  the set of antenna ports $\{p_0, \ldots, p_{\rho-1}\}$ is given by clause 8.3.1.4, and
  the set of antenna ports $\{\tilde{p}_0, \ldots, \tilde{p}_{v-1}\}$ is given by [6, TS 38.214];
and the following conditions are fulfilled:
  the resource elements $\tilde{a}_{k,l}^{(\tilde{p}_j,\mu)}$ are within the common resource blocks allocated for PSSCH transmission.
The quantity k is defined relative to subcarrier 0 in common resource block 0 and the quantity l is defined relative to the start of the scheduled resources for transmission of PSSCH and the associated PSCCH, including the OFDM symbol duplicated as described in clauses 8.3.1.5 and 8.3.2.3.
The position(s) of the DM-RS symbols is given by $\bar{l}$ according to Table 8.4.1.1.2-1 where the number of PSSCH DM-RS is indicated in the SCI, and $l_d$ is the duration of the scheduled resources for transmission of PSSCH and the associated PSCCH, including the OFDM symbol duplicated as described in clauses 8.3.1.5 and 8.3.2.3.
...
8.4.1.2 Phase-Tracking Reference Signals for PSSCH
8.4.1.2.1 Sequence Generation
The precoded sidelink phase-tracking reference signal for subcarrier k on layer j is given by $$r^{(\tilde{p}_j)}(m) = \begin{cases} r(m) & \text{if } j = j' \text{ or } j = j'' \\ 0 & \text{otherwise} \end{cases}$$

where
  antenna ports $\tilde{p}_{j'}$ or $\{\tilde{p}_{j'},\tilde{p}_{j''}\}$ associated with PT-RS transmission are given by clause 8.2.3 of [6, TS 38.214];
  r(m) is given by clause 8.4.1.1.1 at the position of the first PSSCH symbol carrying an associated DM-RS.
8.4.1.2.2 Mapping to physical resources
The UE shall transmit phase-tracking reference signals only in the resource blocks used for the PSSCH, and only if the procedure in [6, TS 38.214] indicates that phase-tracking reference signals are being used.

The PSSCH PT-RS shall be mapped to resource elements according to $$\begin{bmatrix} a_{k,l}^{(\tilde{p}_0,\mu)} \\ \vdots \\ a_{k,l}^{(\tilde{p}_{\rho-1},\mu)} \end{bmatrix} = \beta_{DMRS}^{PSSCH} W \begin{bmatrix} r^{(\tilde{p}_0)}(2n+k') \\ \vdots \\ r^{(\tilde{p}_{\nu-1})}(2n+k') \end{bmatrix}$$

$$k = 4n + 2k' + \Delta$$

when all the following conditions are fulfilled
  l is within the OFDM symbols allocated for the PSSCH transmission;
  resource element (k,l) is not used for PSCCH, nor DM-RS associated with PSSCH;
  k' and $\Delta$ correspond to $\tilde{p}_0, \ldots, \tilde{p}_{\nu-1}$
. . .

8.4.1.3 Demodulation Reference Signals for PSCCH
8.4.1.3.1 Sequence Generation
The sequence $r_l(m)$ shall be generated according to $$r_l(m) = \frac{1}{\sqrt{2}}(1 - 2c(2m)) + j\frac{1}{\sqrt{2}}(1 - 2c(2m+1))$$

where the pseudo-random sequence c(m) is defined in clause 5.2.1. The pseudo-random sequence generator shall be initialized with $$c_{init} = (2^{17}(N_{symb}^{slot} n_{s,f}^\mu + l + 1)(2N_{ID}+1) + 2N_{ID}) \bmod 2^{31}$$

where
  l is the OFDM symbol number within the slot,
  $n_{s,f}^\mu$ is the slot number within a frame, and
  $N_{ID} \in \{0,1, \ldots, 65535\}$ is given by the higher-layer parameter sl-DMRS-ScrambleID.

8.4.1.3.2 Mapping to Physical Resources
The sequence n (m) shall be multiplied with the amplitude scaling factor $\beta_{DMRS}^{PSCCH}$ in order to conform to the transmit power specified in [5, 38.213] and mapped in sequence starting with $r_l(0)$ to resource elements $(k,l)_{p,\mu}$ in a slot on antenna port p=2000 according to $$a_{k,l}^{(p,\mu)} = \beta_{DMRS}^{PSCCH} w_{f,i}(k') r_l(3n+k')$$

$$k = nN_{sc}^{RB} + 4k' + 1$$

$$k' = 0,1,2$$

$$n = 0,1, \ldots$$

where the following conditions are fulfilled
  they are within the resource elements constituting the PSCCH
The quantity $w_{f,i}(k')$ is given by Table 8.4.1.3.2-1 and $i \in \{0,1,2\}$ shall be randomly selected by the UE.
The reference point for k is subcarrier 0 in common resource block 0.
The quantity l is the OFDM symbol number within the slot.
. . .
8.4.1.5 CSI Reference Signals
8.4.1.5.1 General
8.4.1.5.2 Sequence Generation
The sequence r(m) shall be generated according to $$r(m) = \frac{1}{\sqrt{2}}(1 - 2c(2m)) + j\frac{1}{\sqrt{2}}(1 - 2c(2m+1))$$

where the pseudo-random sequence c(i) is defined in clause 5.2.1. The pseudo-random sequence generator shall be initialised with $$c_{init} = (2^{10}(N_{symb}^{slot} n_{s,f}^\mu + l + 1)(2n_{ID}+1) + n_{ID}) \bmod 2^{31}$$

at the start of each OFDM symbol where $n_{s,f}^\mu$ is the slot number within a radio frame, l is the OFDM symbol number within a slot, and $n_{ID} = N_{ID}^X \bmod 2^{10}$ where the quantity $N_{ID}^X$ equals the decimal representation of CRC for the sidelink control information mapped to the PSCCH associated with the CSI-RS according to $$N_{ID}^X = \sum_{i=0}^{L-1} p_i \cdot 2^{L-1-i}$$

with p and L given by clause 7.3.2 in [4, TS 38.212].
8.4.1.5.3 Mapping to Physical Resources
Mapping to resource elements shall be done according to clause 7.4.1.5.3 with the following exceptions:
  only 1 and 2 antenna ports are supported, $X \in \{1,2\}$;
  only density p=1 is supported;
  zero-power CSI-RS is not supported;
  the quantity $\beta_{CSIRS}$ is an amplitude scaling factor to conform with the transmit power specified in clause 8.2.1 of [6, TS 38.214].

A Study Item Description (SID) on expanded and/or improved NR positioning is introduced in RP-213588, one or more parts of which are quoted below:
3 Justification
4 Objective
4.1 Objective of SI or Core Part WI or Testing Part WI
  Study solutions for sidelink positioning considering the following: [RAN1, RAN2]
    Scenario/requirements . . .
    Define evaluation methodology with which to evaluate SL positioning for the uses cases and coverage scenarios, reusing existing methodologies from sidelink communication and from positioning as much as possible [RAN1].
    Study and evaluate performance and feasibility of potential solutions for SL positioning, considering relative positioning, ranging and absolute positioning: [RAN1, RAN2]
    Evaluate bandwidth requirement needed to meet the identified accuracy requirements [RAN1]
    Study of positioning methods (e.g. TDOA, RTT, AOA/D, etc) including combination of SL positioning measurements with other RAT dependent positioning measurements (e.g. Uu based measurements) [RAN1]
    Study of sidelink reference signals for positioning purposes from physical layer perspective, including signal design, resource allocation, measurements, associated procedures, etc, reusing existing reference signals, procedures, etc from sidelink communication and from positioning as much as possible [RAN1]
    Study of positioning architecture and signalling procedures (e.g. configuration, measurement reporting, etc) to enable sidelink positioning covering both UE based and network based positioning [RAN2, including coordination and alignment with RAN3 and SA2 as required]
Some agreements on sidelink positioning are discussed in RAN1 Chair's Notes of 3GPP TSG RAN WG1 #109-e, one or more parts of which are quoted below:

Agreement
  For SL positioning evaluation, simulation bandwidths of 10, 20, 40 and 100 MHz in FR1 can be used.
  For SL positioning evaluation, simulation bandwidths of 100, 200 and 400 MHz in FR2 can be used.

Agreement
For the purpose of RAN1 discussion during this study item, at least the following terminology is used:
  Target UE: UE to be positioned (in this context, using SL, i.e. PC5 interface).
  Sidelink positioning: Positioning UE using reference signals transmitted over SL, i.e., PC5 interface, to obtain absolute position, relative position, or ranging information.
  Ranging: determination of the distance and/or the direction between a UE and another entity, e.g., anchor UE.
  Sidelink positioning reference signal (SL PRS): reference signal transmitted over SL for positioning purposes.
  SL PRS (pre-)configuration: (pre-)configured parameters of SL PRS such as time-frequency resources (other parameters are not precluded) including its bandwidth and periodicity.
  Continue discussion on additional terminology clarification(s) such as: Initiator UE, Responder UE, Sidelink Positioning group, reference UE, etc, including whether such terminology is needed within RAN1 discussion.

Agreement
For the purpose of RAN1 discussion during this study item, at least the following terminology is used:
  Anchor UE: UE supporting positioning of target UE, e.g., by transmitting and/or receiving reference signals for positioning, providing positioning-related information, etc., over the SL interface.
    FFS: clarification of the knowledge of the location of the anchor UE Agreement
With regards to the frequency domain pattern, study further a Comb-N SL-PRS design. Study at least the following aspects:
  N>=1 (where N=1 corresponds to full RE mapping pattern)
  Fully staggered SL-PRS pattern (e.g., M symbols of SL-PRS with comb-N with M=N and, at each symbol a different RE offset is used), Partially staggered SL-PRS pattern (e.g., M symbol(s) of SL-PRS with comb-N, with M<N, at each symbol a different RE offset is used), Unstaggered SL-PRS patterns (e.g., M symbol(s) of SL-PRS with comb-N, at each symbol a same RE offset is used, N>1)
  The number of symbols of SL-PRS within a slot
    Any relation to the comb-N option
    RE offset pattern repetitions within a slot
  FFS: Other frequency domain pattern(s)

Agreement
With regards to the SL Positioning resource allocation, study further the following 2 options for SL Positioning resource (pre-)configuration:
  Option 1: Dedicated resource pool for SL-PRS
    Include in the study at least the following aspects:
      which slots can be used, SL frame structure, SL positioning slot structure, multiplexing of SL-PRS with control information (if included in the same slot)
      positioning measurement report
      whether a dedicated frequency allocation (e.g., layer/BWP) is needed for SL PRS
      resource allocation procedure(s) of SL-PRS
      This option may or may not include control information (i.e., configuration/activation/deactivation/triggering of SL-PRS) for the purpose of SL positioning operation
  Option 2: Shared resource pool with sidelink communication.
    Include in the study at least the following aspects:
      co-existence between SL communication and SL positioning, backward compatibility
      Multiplexing considerations of SL-PRS with other PHY channels (PSCCH, PSSCH, PSFCH) and any modifications in the SL-slot structure Some agreements on sidelink positioning are discussed in RAN1 Chair's Notes of 3GPP TSG RAN WG1 #110, one or more parts of which are quoted below:

Agreement
A new reference signal should be introduced for supporting SL positioning/ranging.

Agreement
Regarding SL-PRS resource allocation, both Scheme 1 and Scheme 2 should be introduced for supporting SL positioning/ranging:
  Scheme 1: Network-centric operation SL-PRS resource allocation (e.g. similar to a legacy Mode 1 solution)
    The network (e.g. gNB, LMF, gNB & LMF) allocates resources for SL-PRS.
  Scheme 2: UE autonomous SL-PRS resource allocation (e.g. similar to legacy Mode 2 solution)
    At least one of the UE(s) participating in the sidelink positioning operation allocates resources for SL-PRS Agreement
With regards to the SL Positioning resource allocation, one of the following alternatives should be introduced for supporting SL positioning/ranging:
  Alt. 1: only dedicated resource pool(s) can be (pre-)configured for SL-PRS
  Alt. 2: either dedicated resource pool(s) and/or a-shared resource pool(s) with sidelink communication can be (pre-)configured for SL-PRS
  Note: whether other signals/channels can be present in the dedicated resource pool can be further discussed Agreement
With regards to the frequency domain pattern, a Comb-N SL-PRS occupying M symbol(s) design should be introduced for the support of NR SL positioning
  Note: there could be multiple values for M, N Some agreements on sidelink positioning are discussed in RAN1 Chair's Notes of 3GPP TSG RAN WG1 #110bis-e, one or more parts of which are quoted below:

Agreement
Regarding Scheme 1 SL-PRS resource allocation, a transmitting UE receives a SL-PRS resource allocation signaling from the network. Consider one or more of the following options:
  Opt. 1: through higher layers from the LMF
  Opt. 2: through Dynamic grant, or through configured grant type 1/type 2 from gNB
    Up to further discussion which one or more of these shall be applicable Agreement
From RAN1 perspective, the following cast types of SL-PRS transmission can be introduced for SL positioning:
Unicast, Groupcast (not including many to one)
  Broadcast (as a working assumption).

Agreement

With regards to the frequency and time domain pattern of a SL-PRS resource within a slot has the following characteristics:
  With regards to the value N (comb size) and the number M of SL-PRS symbols within a slot excluding the symbol(s) used for AGC training/RxTx Turnaround:
    At least the following values are considered as potential candidate values: N={1,2,4,6,8,12}
    FFS: the values considered as potential candidate values for M
    FFS1: Whether to consider N>12 as a potential candidate value(s)
  The symbols of a SL-PRS resource within a slot are consecutive symbols
    FFS: consecutive and/or non-consecutive symbols for shared resource pool (if supported)
    FFS: RE-Offset sequence within a SL-PRS resource, including whether to have in the end of the SL-PRS pattern a symbol with the same RE-offset as the first symbol, for phase-tracking purpose Agreement For a dedicated resource pool for SL positioning,
  With regards to which channels can be included in the resource pool in addition to SL-PRS, consider the following options:
  Opt. 1: No other channel can be included beyond SL-PRS
  Opt. 2: PSCCH which carries SCI associated with SL-PRS transmission(s) is included
  Opt. 3: PSCCH which carries SCI associated with SL-PRS transmission(s) and PSSCH associated with SL-PRS transmission(s) are included
  FFS: Details
  FFS: definition of PSSCH associated with SL-PRS transmission(s)
  Note: Companies are encouraged to provide their analysis and views on the above Agreement With regards to the SL Positioning resource allocation, for SL Positioning resource (pre-)configuration in a shared resource pool with Rel-16/17/18 sidelink communication (if supported), backward compatibility with legacy Rel-16/17 UEs should be ensured.

Agreement

With regards to SL signaling of the reservation/indication of SL-PRS resource(s) for dedicated resource pool and shared resource pool (if supported) for positioning:
  Option A.1: SCI can be used for reserving/indicating one or more SL-PRS resource(s)
  Note: This does NOT mean that only SCI is being used. There can still be higher layer signaling for the purpose of indicating a part of SL-PRS configuration.
  FFS: Whether SCI is single stage SCI or two stage SCI
  FFS: SL-MAC-CE or other higher-layer signaling reservation/indication Some contributions of RAN1 #111 associated with sidelink positioning are discussed in R1-2211012, one or more parts of which are quoted below:

For the configuration of SL-PRS, option 2 is preferred. we think the high-layer signaling is involved to configure some SL-PRS parameters (such as comb N, number of symbols M, configuration of resource pool and configuration of resource, etc.). The high-layer signaling can be
Opt a: RRC or LPP between network and UE
Opt b: PC5-SLPP between UEs
Opt c: pre-configured RRC In addition, we also think the low layer is involved in some SL-PRS parameters (e.g., PRS timing/frequency resource, SL-PRS sequence ID, period indication, priority, and RE offset).

Furthermore, according to the previous meeting, the SCI is supported to be used for SL-PRS resource reservation. Considering the content of SCI, the following information should be carried in the SCI at least: SL PRS timing/frequency resource, destination ID, source ID, period indication, priority, and RE offset.

Proposal 9
  For the configuration of SL-PRS, option 2 is preferred
    Option 2: High-layer and lower-layer signaling involvement in the SL-PRS configuration.

Proposal 10
  For the SCI used for the reservation/indication of SL-PRS, the following information should be carried in the SCI.
    SL PRS timing/frequency resource, destination ID, source ID, period indication, priority, and RE offset.

Some contributions of RAN1 #111 associated with sidelink positioning are discussed in R1-2211203, one or more parts of which are quoted below:

In Rel-16/17 NR V2X. two stage SCI had been introduced for the resource allocation of PSSCH and the IUC schemes for PSSCH. The new SCI design for SL-PRS in Rel-18 should reuse the existing SCI design for PSSCH in Rel-16/17 NR V2X as much as possible to reduce the workload of standardization and the complexity of UE implementation. Hence, the two stage SCI for scheduling the SL-PRS transmission should be introduced for the resource allocation of SL-PRS and potential IUC schemes for SL-PRS.

Proposal 29: The new SCI design for SL-PRS in Rel-18 should reuse the existing SCI design for PSSCH in Rel-16/17 NR V2X as much as possible to reduce the workload of standardization and the complexity of UE implementation.

Proposal 30: Two stage SCI should be supported to indicate the resource allocation and other information of SL-PRS transmission in Rel-18.

Considering the backward compatibility with R16/17 sidelink UEs and simplicity of the design, placing the two stage SCI together with SL-PRS in dedicated resource pool would be a reasonable solution. In other words. PSCCH which carries $1^{st}$-stage SCI associated with SL-PRS transmission(s) and PSSCH which carries $2^{nd}$-stage SCI associated with SL-PRS transmission(s) should be included in the dedicated resource pool in addition to SL-PRS. However, it needs further study on whether the PSSCH which carries measurement reports associated with SL-PRS transmission(s) should also be included in the dedicated resource pool.

Proposal 31: The two stage SCI used for the scheduling of SL-PRS, should be transmitted in the dedicated resource pool for sidelink positioning.

Proposal 32: For a dedicated resource pool for SL positioning, PSCCH which carries 1st-stage SCI associated with SL-PRS transmission(s) and PSSCH which carries 2nd-stage SCI associated with SL-PRS transmission(s) should be included in the dedicated resource pool in addition to SL-PRS.
  FFS: Whether the PSSCH which carries measurement reports associated with SL-PRS transmission(s) should also be included in the dedicated resource pool.

Regarding the contents of the two stage SCI, the information transmitted by legacy $1^{st}$-stage SCI and $2^{nd}$-stage SCI defined in Rel-16/17 V2X can be a starting point. At least the following information should be considered:

Priority
Frequency resource assignment
Time resource assignment
Resource Reservation period
SL-PRS pattern
Source ID
Destination ID
SL-PRS request/indication Proposal 33: For the contents of the two stage SCI for SL-PRS in Rel-18, the information transmitted by legacy 1st-stage SCI and $2^{nd}$-stage SCI defined in Rel-16/17 V2X should be a starting point.

Some contributions of RAN1 #111 associated with sidelink positioning are discussed in R1-2211268, one or more parts of which are quoted below:

5. Resource Allocation for SL Positioning

When UE selects the SL PRS resources based on sensing, in addition to the field indicated by DCI when a network allocates the SL PRS resources, the source/destination ID of the SL PRS TX and RX UE needs to be included. SCI can also include the flag to indicate whether the retransmission request is applied for the SL PRS. As a result, the associated control channel (SCI) includes at least the following fields for SL PRS resources.

Source/destination ID
Resource pool index for SL PRS transmission
SL PRS resource information
   Resource timing
   Periodicity/offset
   Comb pattern
   Number of symbols
   etc.
Retransmission request flag The value of each parameter is selected within the allowed set of values (pre-)configured in a resource pool. If the multiple SL PRS configurations are allowed in a resource pool, the SL PRS configuration index can be included. This issue needs further study.

Proposal 25: When UE selects the SL PRS resources based on sensing, the $2^{nd}$ SCI indicates at least the source/destination ID and retransmission request flag in addition to the resource pool index and SL PRS resource information.

For sidelink design in New Radio (NR) Release 16 (Rel-16) and/or Release 17 (Rel-17), sidelink slots can be utilized for transmission and/or reception of Physical Sidelink Broadcast Channel (PSBCH) and/or transmission and/or reception of Physical Sidelink Control Channel (PSCCH)/Physical Sidelink Shared Channel (PSSCH)/Physical Sidelink Feedback Channel (PSFCH). In the present disclosure, the term "PSCCH/PSSCH/PSFCH" may refer to PSCCH, PSSCH and/or PSFCH. In some examples, PSBCH may be multiplexed (e.g., time division multiplexed (TDMed)), in slot level, from PSCCH/PSSCH/PSFCH (which may mean that sidelink slots, excluding slots for PSBCH, can be utilized for PSCCH/PSSCH/PSFCH transmission/reception). In the present disclosure, the term "transmission/reception" may refer to transmission and/or reception. Alternatively and/or additionally, concept of sidelink resource pool for sidelink communication may be utilized for PSCCH/PSSCH/PSFCH transmission/reception. A sidelink resource pool may comprise a set of sidelink slots (except slots for PSBCH, for example) and a set of frequency resources. In some examples, a sidelink resource pool may correspond to a sidelink communication resource pool (e.g., a pool of resources for sidelink communication). One, some and/or all instances of the term "sidelink resource pool" in the present disclosure may be replaced with "sidelink communication resource pool". Different sidelink resource pools may be multiplexed (e.g., TDMed and/or frequency division multiplexed (FDMed)). In an example, a PSCCH in a sidelink resource pool (e.g., one sidelink resource pool) can schedule PSSCH resource(s) (e.g., only PSSCH resource(s)) in the same sidelink resource pool (e.g., the one sidelink resource pool). In some examples, a PSCCH in a sidelink resource pool (e.g., one sidelink resource pool) is not able to schedule PSSCH resource(s) in other sidelink resource pool. For a PSCCH/PSSCH, associated PSFCH (e.g., a PSFCH associated with the PSCCH/PSSCH) may be in the same sidelink resource pool (as the PSCCH/PSSCH, for example), instead of in different sidelink resource pools. In the present disclosure, the term "PSCCH/PSSCH" may refer to PSCCH and/or PSSCH.

A sidelink resource pool (e.g., one sidelink resource pool) may comprise multiple sub-channels in frequency domain, wherein a sub-channel comprises multiple contiguous Physical Resource Blocks (PRBs) in frequency domain. A PRB (e.g., one PRB) may comprise multiple Resource Elements (REs) (e.g., a PRB (e.g., one PRB) may consist of 12 REs). A configuration of the sidelink resource pool may indicate the number of PRBs of each sub-channel in the (corresponding) sidelink resource pool. Sub-channel based resource allocation in frequency domain may be supported for PSSCH. For a PSSCH resource scheduled by a PSCCH in the same sidelink slot, a fixed relationship between the PSCCH and the PSSCH resource may be indicated (e.g., specified) and/or defined, which may mean that the PSCCH may be located in the lowest sub-channel (e.g., sub-channel with lowest index) of the scheduled PSSCH resource. As for scheduled PSSCH resource in different slot(s), starting frequency position of the scheduled PSSCH resource will be scheduled/indicated by sidelink control information, instead of fixed relationship.

In some examples, in sidelink design of NR Rel-16 and/or Rel-17, a sidelink control information (SCI) (e.g., one SCI) may indicate at most three PSSCH resources via Frequency resource assignment and/or Time resource assignment in the SCI. The SCI may comprise a 1st stage SCI and a 2nd stage SCI. The 1st stage SCI may be transmitted via PSCCH. The 2nd stage SCI may be transmitted via multiplexed with a scheduled PSSCH resource (e.g., scheduled via the 1st stage SCI and/or other signal) in the same sidelink slot (e.g., the same slot as the 1st stage SCI). In an example, the scheduled PSSCH resource may correspond to a first PSSCH resource of the at most three PSSCH resources. For example, the SCI may schedule at most two PSSCH resources (e.g., a second PSSCH resource and/or a third PSSCH resource) in later sidelink slots (e.g., one or more slots after the slot in which the 1st stage SCI and/or the 2nd stage SCI are transmitted). The at most three PSSCH resources may be in different slots in a sidelink resource pool. The at most three PSSCH resources may be within 32 contiguous (e.g., consecutive) slots in a sidelink resource pool (e.g., a difference in time between an initial PSSCH resource of the three PSSCH resources and a last PSSCH resource of the three PSSCH resource may not be over a time period corresponding to 32 consecutive slots). The at most three PSSCH resources may be associated with (and/or utilized for) a same data packet, e.g., a same Transport Block (TB) and/or a same Medium Access Control (MAC) Protocol/Packet Data Unit (PDU). In some examples, standalone PSSCH/SCI may not be supported in NR sidelink, which may mean that for each PSSCH transmission in a slot, there may be a corresponding PSCCH/SCI transmission in the same slot, and/or vice versa.

Alternatively and/or additionally, resource reservation for a TB (e.g., another TB) by a SCI may be configured (e.g., pre-configured) with enabled or not enabled or not configured in a sidelink resource pool (e.g., resource reservation for the TB may be enabled and/or configured for the sidelink resource pool and/or resource reservation for the TB may not be enabled and/or may not be configured for the sidelink resource pool). In some examples, in a sidelink resource pool, whether resource reservation by a SCI for another TB is enabled, is not enabled or is not configured, may be configured (e.g., whether the resource reservation is enabled, not enabled or not configured for the sidelink resource pool may be pre-configured for the sidelink resource pool). When a sidelink resource pool is configured (e.g., pre-configured) with enablement of such resource reservation (e.g., when the resource reservation is enabled for the sidelink resource pool), the sidelink resource pool is configured with a set of reservation period values. In an example, the set of reservation period values (e.g., a set of one or more reservation period values) may comprise 0 milliseconds, 1:99 milliseconds (e.g., a value in the range of at least 1 millisecond to at most 99 milliseconds, 100 milliseconds, 200 milliseconds, 300 milliseconds, 400 milliseconds, 500 milliseconds, 600 milliseconds, 700 milliseconds, 800 milliseconds, 900 milliseconds, and/or 1000 milliseconds. In some examples, a resource reservation period field in a SCI in the sidelink resource pool may indicate one or more reservation period values for one or more resource reservations (e.g., the resource reservation period field may be indicative of which reservation period value to use for a future resource reservation). In some examples, a size of the set of reservation period values (e.g., a number of values of the set of reservation period values) may be from 1 to 16 (e.g., the set of reservation period values may comprise at most 16 reservation period values).

In sidelink design of NR Rel-16 and/or Rel-17, there are two sidelink resource allocation modes defined for NR sidelink communication: (i) mode 1 (e.g., network scheduling mode and/or NR sidelink resource allocation mode 1) is that base station/network node can schedule sidelink resource(s) to be used by User Equipment (UE) for sidelink transmission(s), and/or (ii) mode 2 (e.g., UE selection mode and/or NR sidelink resource allocation mode 2) is that UE determines (e.g., base station/network node does not schedule) sidelink transmission resource(s) within sidelink resources configured by base station/network node and/or pre-configured sidelink resources.

For network scheduling mode (e.g., NR sidelink resource allocation mode 1), the network node may transmit a sidelink (SL) grant (e.g., Downlink Control Information (DCI) format 3_0) on Uu interface for scheduling PSSCH resources (e.g., at most three PSSCH resources) (for a same data packet, for example). The sidelink grant may comprise a "time gap" field and/or one or more "Lowest index of the subchannel allocation to the initial transmission" fields for indicating a first PSSCH resource of the PSSCH resources (e.g., the at most three PSSCH resources) and/or a PSCCH resource in a defined slot (e.g., a specific slot). Alternatively and/or additionally, the sidelink grant may comprise a "Frequency resource assignment" field and/or a "Time resource assignment" field for indicating a second PSSCH resource of the PSSCH resources (e.g., the at most three PSSCH resources) and/or a third PSSCH resource (if any) of the PSSCH resources (e.g., the at most three PSSCH resources). Alternatively and/or additionally, the sidelink grant may comprise a "resource pool index" for indicating a sidelink resource pool (e.g., one sidelink resource pool), wherein the scheduled PSSCH resources (e.g., the at most three PSSCH resources) are within the indicated sidelink resource pool (e.g., the one sidelink resource pool). Transmitter UE (TX UE) may perform PSCCH and PSSCH transmissions on PC5 interface, in response to the received sidelink grant, for a data packet. The Uu interface may correspond to a wireless interface for communication between network and UE. The PC5 interface may correspond to a wireless interface for communication (e.g., direct communication) between UEs/devices.

For UE (e.g., autonomous) selection mode (e.g. NR sidelink resource allocation mode 2), since transmission resource is not scheduled via network node, the UE may require performing sensing before selecting a resource for transmission (e.g., sensing-based transmission) in order to avoid resource collision and/or interference from and/or to other UEs (e.g., UEs using NR sidelink). Full sensing may be supported from NR Rel-16 sidelink, while partial sensing may be supported from NR Rel-17 sidelink. Based on a result of sensing procedure, the UE may determine a resource set (e.g., a valid/identified resource set, which may correspond to a set of one or more resources that the UE identifies and/or determines to be valid, such as usable for sidelink transmission). The resource set (e.g., the valid/identified resource set) may be reported to higher layers (of the UE, for example). The UE may select (e.g., randomly select) one or more resources (e.g., one or more valid/identified resources) from the resource set (e.g., the valid/identified resource set) to perform sidelink transmission(s) from the UE. The sidelink transmission(s) from the UE may comprise PSCCH transmission and/or PSSCH transmission.

Alternatively and/or additionally, the sidelink control information scheduling PSSCH transmission(s) will indicate cast type (e.g., unicast, groupcast, or broadcast) associated with the scheduled PSSCH transmission. Alternatively and/or additionally, the sidelink control information (e.g., the 2nd stage SCI) may indicates a source Identity (ID) (e.g., a layer-1 source ID) and a destination ID (e.g., a layer-1 destination ID). In some examples, the destination ID (e.g., the layer-1 destination ID) is utilized for one or more Receiver UEs (RX UEs) to determine whether or not to receive and/or decode the scheduled PSSCH transmission. In sidelink communication, a RX UE may need to receive and/or detect one or more PSCCHs/PSSCHs from one or more TX UEs in a sidelink transmission occasion (e.g., one sidelink transmission occasion). For each PSCCH/PSSCH from each TX UE in the one sidelink transmission occasion, a destination of the PSCCH/PSSCH may or may not comprise the RX UE. The RX UE may need to receive, decode and/or measure each sidelink control information from PSCCH and/or corresponding 2-nd stage SCI, which may be due, at least in part, to the destination ID (e.g., the layer-1 destination ID) being indicated in the 2-nd stage SCI, whereby the RX UE may need to decode PSCCH and after decoding the PSCCH, decode the corresponding 2-nd stage SCI. In some examples, if the RX UE receiving the sidelink control information does not associate with the indicated destination ID (e.g., the layer-1 destination ID), the RX UE may not decode the scheduled PSSCH transmission (and/or may not measure SL Channel State Information based Reference Signal (CSI-RS)). If the RX UE receiving the sidelink control information associates with the indicated destination ID (e.g., the layer-1 destination ID), the RX UE may receive and/or decode the scheduled PSSCH transmission (and/or measure SL CSI-RS). In some examples, the source ID (e.g., the layer-1 source ID) is utilized for the RX UE to determine whether or not two scheduled PSSCH transmissions are from the same TX UE, and/or know whether or not two scheduled PSSCH transmissions can be Hybrid Automatic Repeat Request (HARQ)-combined. For example, when two sidelink control information for scheduling two PSSCH transmissions indicate the same source ID (e.g., the same layer-1 source ID) and the same destination ID (e.g., the same layer-1 destination ID) and the same cast-type with same HARQ process number and/or non-toggled New Data Indicator (NDI), the RX UE may perform HARQ combining of the two scheduled PSSCH transmissions for decoding the data packet. Otherwise, in some examples, the RX UE cannot perform HARQ combining of the two scheduled PSSCH transmissions.

In NR Release 18 (Rel-18) (discussed in RP-213588, for example), study on "NR Positioning Enhancements" may investigate higher accuracy, lower latency location, high integrity and reliability requirements resulting from new applications and industry verticals for 5G. NR Rel-18 may (also) study feasibility of potential solutions for SL positioning, considering relative positioning, ranging and/or absolute positioning, wherein the SL positioning is operated in device-to-device interface (e.g., PC5-interface between device and device). The device may be a UE.

In RAN1 meetings (discussed in RAN1 Chair's Notes of 3GPP TSG RAN WG1 #109-e, RAN1 Chair's Notes of 3GPP TSG RAN WG1 #110, and/or RAN1 Chair's Notes of 3GPP TSG RAN WG1 #110bis-e, for example), RAN1 agreed to study Round Trip Time (RTT)-type solutions using SL, SL-Angle of Arrival (AoA) (SL-AoA), SL-Time Difference of Arrival (TDOA) (SL-TDOA), SL-Angle of Departure (AoD) (SL-AoD) with regard to positioning methods supported using SL measurements. Accordingly, an enhanced reference signal (e.g., a new reference signal) for SL positioning/ranging may be introduced, and existing Downlink (DL) Positioning Reference Signal (PRS) or Uplink (UL) Sounding Reference Signal-Positioning (SRS-Pos) design and SL design framework may be used as a starting point. The enhanced reference signal for SL positioning/ranging may be noted as SL PRS. For supporting time-based positioning methods, larger bandwidth for SL PRS may be required for higher accuracy positioning. It may be possible that the required bandwidth for SL PRS may be 10 megahertz (MHz), 20 MHz, or even more, especially in higher frequency band. With regard to the SL Positioning resource allocation, RAN1 may study further Option 1: Dedicated resource pool for SL-PRS and/or Option 2: Shared resource pool with sidelink communication (e.g., PSCCH/PSSCH and/or PSFCH). Shared resource pool with sidelink communication may mean that SL PRS transmission(s) are multiplexed in sidelink resource pool with PSCCH/PSSCH resources (e.g., in NR Release 16/17/18 sidelink resource pool).

Alternatively and/or additionally, sidelink control information may be provided by TX UE for scheduling/indicating/allocating SL PRS resources (e.g., the TX UE may provide the sidelink control information in order to let RX UE know where and/or when to receive and/or measure one or more corresponding SL PRSs)). In the present disclosure, the term "scheduling/indicating/allocating" may refer to scheduling, indicating and/or allocating. The sidelink control information for scheduling/indicating/allocating SL PRS resources may be multiplexed in the dedicated resource pool for SL-PRS of option 1, or may be transmitted on PSCCH in shared sidelink resource pool of option 2.

Alternatively and/or additionally, given a larger bandwidth requirement of SL PRS, Comb-N SL PRS design may be supported for providing more available SL PRS resources, and/or a configured and/or adjusted symbol number (e.g., adjustable and/or configurable symbol number) may be supported as one SL PRS occasion. In some examples, a potential candidate value of N may be 1, 2, 4, 6, 8, or 12. According to RAN1 #109-c (discussed in RAN1 Chair's Notes of 3GPP TSG RAN WG1 #109-e, for example), at least some possible designs of SL PRS pattern, given M symbols and comb-N, are as follows: (i) Fully staggered SL PRS pattern, wherein M=N and/or wherein at each symbol a different Resource Element (RE) offset is used, (ii) Partially staggered SL PRS pattern, wherein M<N and/or wherein at each symbol a different RE offset is used, and/or (iii) Unstaggered SL PRS patterns, wherein N>1 and/or wherein at each symbol a same RE offset is used.

In some examples, for comb-N SL-PRS design/structure, possible frequency offsets and/or comb offsets may range from 0 to (N−1).

According to RAN1 #110 (discussed in RAN1 Chair's Notes of 3GPP TSG RAN WG1 #110, for example), scheme 1 and scheme 2 are introduced for SL PRS resource allocation. Scheme 1 may correspond to Network-centric operation SL-PRS resource allocation (e.g., similar to a legacy NR Mode 1 solution). In some examples, in scheme 1, the network (e.g. gNB, Location Management Function (LMF), gNB & LMF) may allocate resources for SL-PRS. Scheme 2 may correspond to UE autonomous SL-PRS resource allocation (e.g. similar to legacy NR Mode 2 solution). In some examples, in scheme 2, at least one of the UE(s) participating in the sidelink positioning operation may allocate resources for SL-PRS.

In some examples, for scheme 1, a network node may transmit a SL grant for scheduling SL PRS resource(s). There may be some mechanisms/methods for designing the SL grant, which may include (i) defining extra fields in DCI format 3_0 (e.g., current sidelink grant for scheduling PSSCH resource) to load SL PRS resource information, and/or (2) defining an enhanced DCI format (e.g., a new DCI format) for including (e.g., exclusively including) SL PRS resource information, wherein the enhanced DCI format is with Cyclic Redundancy Check (CRC) scrambled by SL-PRS-Radio Network Temporary Identifier (RNTI).

In some examples, for scheme 2, if concept of legacy NR Mode 2 is applied, UE may perform sensing on SL PRS resources in sensing duration, and then may exclude candidate SL PRS resources based on sensing result. After exclusion step (e.g., after excluding candidate SL PRS resources based on sensing result), UE may determine valid candidate SL PRS resources and then select (e.g., randomly select) one or more candidate SL PRS resource(s) from the valid candidate SL PRS resources (e.g., the valid candidate SL PRS resources may exclude the excluded candidate SL PRS resources).

Figure 5:
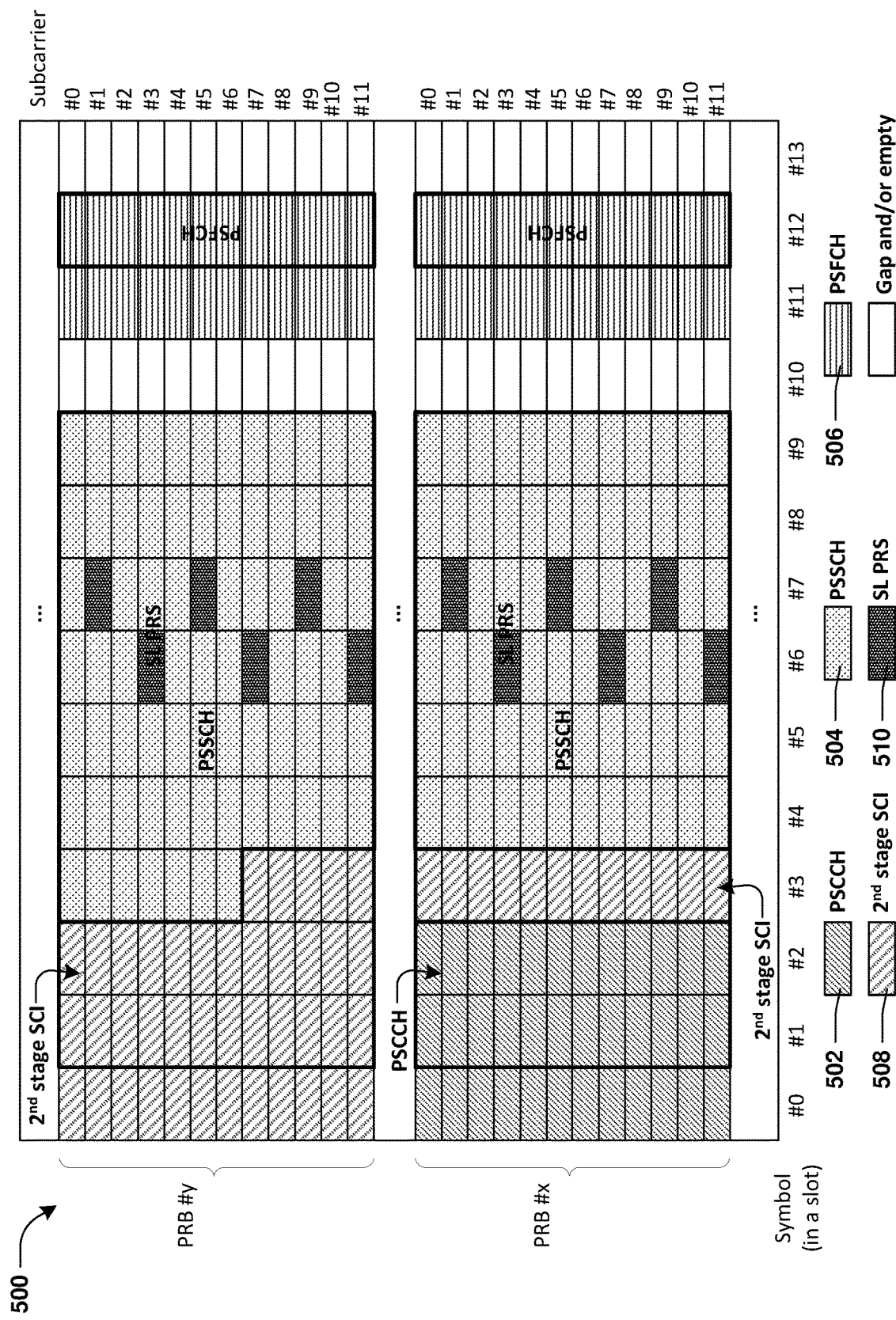
FIG. 5 illustrates a resource grid representative of a scenario associated with transmissions in a slot in a shared resource pool with sidelink communication, according to one exemplary embodiment.

FIG. 5 illustrates a resource grid 500 representative of a scenario associated with transmissions of PSCCH, PSSCH, SL PRS and/or PSFCH in a slot in a shared resource pool with sidelink communication, in accordance with some embodiments. A PSSCH transmission may occupy a set of PRBs, which may comprise the PRB #x and the PRB #y in frequency domain. In some examples, each PRB of one, some and/or all of the set of PRBs comprises 12 REs. Other quantities of REs of a PRB of the set of PRBs are within the scope of the present disclosure. In some examples, each PRB of one, some and/or all of the set of PRBs spans 12 subcarriers. Other quantities of subcarriers of a PRB of the set of PRBs are within the scope of the present disclosure. In some examples, a RE is made up of one subcarrier in frequency domain and one symbol (e.g., orthogonal frequency-division multiplexing (OFDM) symbol) in time domain. In the resource grid 500, (i) REs of a PSCCH transmission (e.g., the PSCCH transmission may schedule the PSSCH transmission) are shown with a first pattern 502, (ii) REs of the PSSCH transmission are shown with a second pattern 504, (iii) REs of a PSFCH transmission are shown with a third pattern 506, (iv) REs of a $2^{nd}$ stage SCI transmission are shown with a fourth pattern 508, (v) REs of a SL PRS transmission are shown with a fifth pattern 510, and/or (vi) gap REs and/or empty REs are shown with white blocks.

The PSCCH transmission scheduling the PSSCH transmission may be transmitted in at least a portion of one or more PRBs (e.g., a single PRB or multiple PRBs) occupied by the PSSCH transmission (e.g., at least a portion of PRBs in a lowest sub-channel that is occupied by the PSSCH transmission). In an example shown in the resource grid 500, the PSCCH transmission (i) may be performed in symbol #1 and #2, (ii) may occupy (and/or comprise) REs of the PRB #x, and/or (iii) does not occupy (and/or does not comprise) REs of the PRB #y. The PRB #x and the PRB #y may or may not be with a same sub-channel. Within the set of PRBs and within symbol #1~#9 in the slot, REs that are not comprised and/or utilized for PSCCH transmission in PRB #y can be utilized for the PSSCH transmission and/or the $2^{nd}$ stage SCI transmission (e.g., $2^{nd}$ stage SCI may be in earlier symbols than the PSSCH) and/or for the SL PRS transmission. If there is no PSFCH resource in a slot, within the set of PRBs and within symbol #1~#12 in the slot, REs that are not comprised and/or utilized for PSCCH transmission in PRB #y can be utilized for the PSSCH transmission and/or the $2^{nd}$ stage SCI transmission and/or for the SL PRS transmission. It may be appreciated that the PSCCH transmission may comprise Demodulation Reference Signal (DMRS) for PSCCH. Alternatively and/or additionally, the PSSCH transmission may comprise DMRS for PSSCH, Phase Tracking Reference Signal (PT-RS), and/or SL CSI-RS. Alternatively and/or additionally, a transmission (e.g., transmission of PSCCH, PSSCH and/or $2^{nd}$-stage SCI) in symbol #1 may be duplicated into symbol #0. In some examples, a first symbol (e.g., an initial symbol) which may be used for 2"d-stage SCI mapping is a first PSSCH DMRS symbol (e.g., an initial PSSCH DMRS symbol). In some examples, the first PSSCH DMRS symbol is not an Automatic Gain Control (AGC) symbol. In some examples, if symbol #1 comprises $2^{nd}$-stage SCI, duplication of symbol #1 into symbol #0 may cause symbol #0 to comprise 210-stage SCI. In some examples, one or more PSFCH transmissions in symbol #12 are duplicated into symbol #11. In some examples, symbol #0 and #11 are utilized for AGC. A TX UE transmitting the PSCCH transmission, the PSSCH transmission, and/or the SL PRS transmission may or may not transmit PSFCH in the slot. For example, in the slot, the PSFCH transmission may be transmitted from another TX UE different from the TX UE transmitting the PSCCH transmission, the PSSCH transmission, and/or the SL PRS transmission. Accordingly, symbol #10 may be a gap symbol for possible TX-to-RX switch or RX-to-TX switch. Alternatively and/or additionally, symbol #13 may be a gap symbol for possible TX-to-RX switch or RX-to-TX switch, in order to perform transmission and/or reception in a subsequent slot (e.g., a next slot after the slot associated with the resource grid 500). According to contributions R1-2211012, R1-2211203 and/or R1-2211268, SL PRS with comb-N structure may be transmitted within PSSCH resource. In an example shown in the resource grid 500, the SL PRS transmission in symbol #6 and #7 utilizes REs with comb/RE offset=0 in comb-4 structure.

Alternatively and/or additionally, unicast, groupcast and/or broadcast may be considered for SL PRS transmission.

Contributions R1-2211012, R1-2211203 and/or R1-2211268 propose that some information for reservation and/or indication of SL PRS may be carried in sidelink control information (SCI), wherein the some information may comprise SL PRS resource (e.g., timing and/or frequency resource for SL PRS), destination ID, source ID, periodicity, priority, SL-PRS request and/or indication, and/or RE offset (and/or comb offset). An SCI design for SL PRS in Rel-18 may reuse at least some of the existing SCI design for PSSCH in Rel-16/17 NR sidelink (as much as possible, for example), e.g., two stage SCI structure can be supported for SL PRS.

Thus, SL PRS transmission may be associated with a destination ID and a source ID. PSSCH transmission may be associated with a destination ID and a source ID. When a TX UE transmits PSSCH transmission and SL PRS transmission in a slot, it is not clear how to handle respective destination ID and source ID associated with the PSSCH transmission and the SL PRS transmission, since some $2^{nd}$ stage SCIs (e.g., SCI format 2-A/B/C) can include only one destination ID (e.g., only one layer-1 destination ID) and one source ID (e.g., only one layer-1 source ID). Furthermore, since legacy Release 16/17 UEs does not know existence of SL PRS, there is a need for a mechanism to provide backward compatibility with legacy Release 16/17 UEs in the shared resource pool with Rel-16/17/18 sidelink communication and SL PRS.

One or more of the above issues may be handled (e.g., solved and/or avoided) and/or improved using one or more embodiments, concepts, mechanisms, methods, etc. provided herein.

A TX UE may perform sidelink communication in a sidelink resource pool. A configuration (e.g., a second configuration) of the sidelink resource pool may provide (and/or configure the TX UE with) a number of slots and a number of frequency resources (e.g., a number of sub-channels and/or PRBs) for transmission and/or reception of PSSCH and/or PSCCH. In some examples, the sidelink resource pool may be allowed to perform (and/or may be configured to be utilized for) PSCCH/PSSCH transmission/reception and/or SL PRS transmission/reception/measurement. In the present disclosure, the term "transmission/reception/measurement" may refer to transmission, reception and/or measurement. In some examples, the sidelink resource pool is a shared resource pool with sidelink communication and SL PRS. In some examples, the resource pool for SL PRS may comprise SL PRS resources, PSCCH/PSSCH resources and/or PSFCH resources. In some examples, different Transmission Time Intervals (TTIs) in the sidelink resource pool may correspond to PSCCH/PSSCH transmission/reception and/or SL PRS transmission/reception/measurement. Alternatively and/or additionally, different TTIs in the sidelink resource pool may correspond to either PSCCH/PSSCH transmission/reception or SL PRS transmission/reception/measurement. Alternatively and/or additionally, at least one TTI in the sidelink resource pool may be allowed to perform (and/or may be used for performing) PSCCH/PSSCH transmission/reception and/or SL PRS transmission/reception/measurement.

In some examples, the TX UE may determine to perform a SL PRS transmission in a first slot in the sidelink resource pool. The SL PRS transmission may be associated with a first destination ID (e.g., a layer-1 or layer-2 destination ID), a first source ID (e.g., a layer-1 or layer-2 destination ID), SL PRS ID, a first priority, and/or a first cast type. In some examples, the SL PRS transmission may be in a SL PRS occasion (e.g., one SL PRS occasion) comprising M symbols and with comb-N structure (e.g., the SL PRS transmission and/or the SL PRS occasion may have the comb-N structure).

When the TX UE performs the SL PRS transmission in the first slot, the TX UE may transmit first sidelink control information for scheduling the SL PRS transmission/resource. In the present disclosure, the term "transmission/resource" may refer to a transmission and/or a resource. For example, the SL PRS transmission/resource may refer to the SL PRS transmission and/or a resource used to perform the SL PRS transmission. The first sidelink control information may comprise the first destination ID (e.g., layer-1 destination ID), the first source ID (e.g., layer-1 source ID), the SL PRS ID, the first priority, and/or an indication of the first cast type. The first sidelink control information may be indicative of frequency resource of the SL PRS transmission (e.g., the frequency resource may be indicated in units of sub-channels or PRBs), time resource of the PSSCH transmission (e.g., the M symbols of the SL PRS occasion, such as the one SL PRS occasion), and/or comb/RE offset (e.g., an integer in [0, N−1]).

Alternatively and/or additionally, the TX UE may determine to perform a PSSCH transmission for transmitting a sidelink data packet in the first slot in the sidelink resource pool. The PSSCH transmission and/or the sidelink data packet may be associated with a second destination ID (e.g., a layer-1 or layer-2 destination ID), a second source ID (e.g., a layer-1 or layer-2 source ID), a second priority, and/or a second cast type. In some examples, the second destination ID is different than the first destination ID, the second source ID is different than the first source ID, the second priority is different than the first priority and/or the second cast type is different than the first cast type.

When the TX UE performs the PSSCH transmission in the first slot, the TX UE may (i) transmit an associated 1st stage SCI (e.g., SCI format 1-A) via a PSCCH transmission in the first slot and (ii) transmit an associated $2^{nd}$ stage SCI (e.g., SCI format 2-A/2-B/2-C) in the first slot. The associated $2^{nd}$ stage SCI transmission may be multiplexed with the PSSCH transmission/resource (e.g., the PSSCH transmission and/or a resource used to perform the PSSCH transmission). In some examples, the PSCCH transmission and the associated $2^{nd}$ stage SCI transmission may comprise second sidelink control information for scheduling the PSSCH transmission/resource. The second sidelink control information may comprise the second destination ID (e.g., layer-1 destination ID), the second source ID (e.g., layer-1 source ID), the second priority, and/or the second cast type. In some examples, the PSCCH transmission may be indicative of the second priority, frequency resource of the PSSCH transmission (e.g., the frequency resource may be indicated in units of sub-channels), and/or information of the second cast type. The $2^{nd}$ stage SCI transmission may comprise the second destination ID (e.g., layer-1 destination ID), the second source ID (e.g., layer-1 source ID), and/or information of the second cast type.

Concept A

In Concept A of the present disclosure, when the TX UE performs the PSSCH transmission and the SL PRS transmission in the first slot in the sidelink resource pool, the TX UE may transmit the first sidelink control information and the second sidelink control information.

A first embodiment may be to design an enhanced $2^{nd}$ stage SCI (e.g., new $2^{nd}$ stage SCI) to comprise both (i) the first sidelink control information and (ii) at least a portion of the second sidelink control information. In some examples, the enhanced $2^{nd}$ stage SCI may comprise a first part of the second sidelink control information and/or may not comprise a second part of the second sidelink control information. The second part of the second sidelink control information may be comprised in the PSCCH transmission. The $1^{st}$ stage SCI comprised in the PSCCH transmission may indicate (existence of) the enhanced $2^{nd}$ stage SCI. In an example, the $1^{st}$ stage SCI may be indicative of whether or not a subsequent $2^{nd}$ stage SCI is the enhanced $2^{nd}$ stage SCI or other version (e.g., prior version) of $2^{nd}$ stage SCI. Thus, based on the indication of the $1^{st}$ stage SCI, RX UE(s) may determine to receive (and/or decode) the enhanced $2^{nd}$ stage SCI and may acquire the first sidelink control information for scheduling the SL PRS transmission/resource. The TX UE may multiplex the enhanced $2^{nd}$ stage SCI transmission with the PSSCH transmission/resource. The TX UE may rate match the PSSCH considering the enhanced $2^{nd}$ stage SCI (e.g., based on existence of the enhanced $2^{nd}$ stage SCI). In some examples, the TX UE may put the enhanced $2^{nd}$ stage SCI bits first and then PSSCH bits in the PSSCH resources. In an example, among the PSSCH resources (used to perform the PSSCH transmission, for example), the enhanced $2^{nd}$ stage SCI bits (e.g., bits of the enhanced $2^{nd}$ stage SCI) may be in included in a first set of the PSSCH resources and/or the PSSCH bits (e.g., bits of the sidelink data packet transmitted via the PSSCH transmission) may be included in a second set of the PSSCH resources (e.g., the first set may be before the second set).

Figure 6:
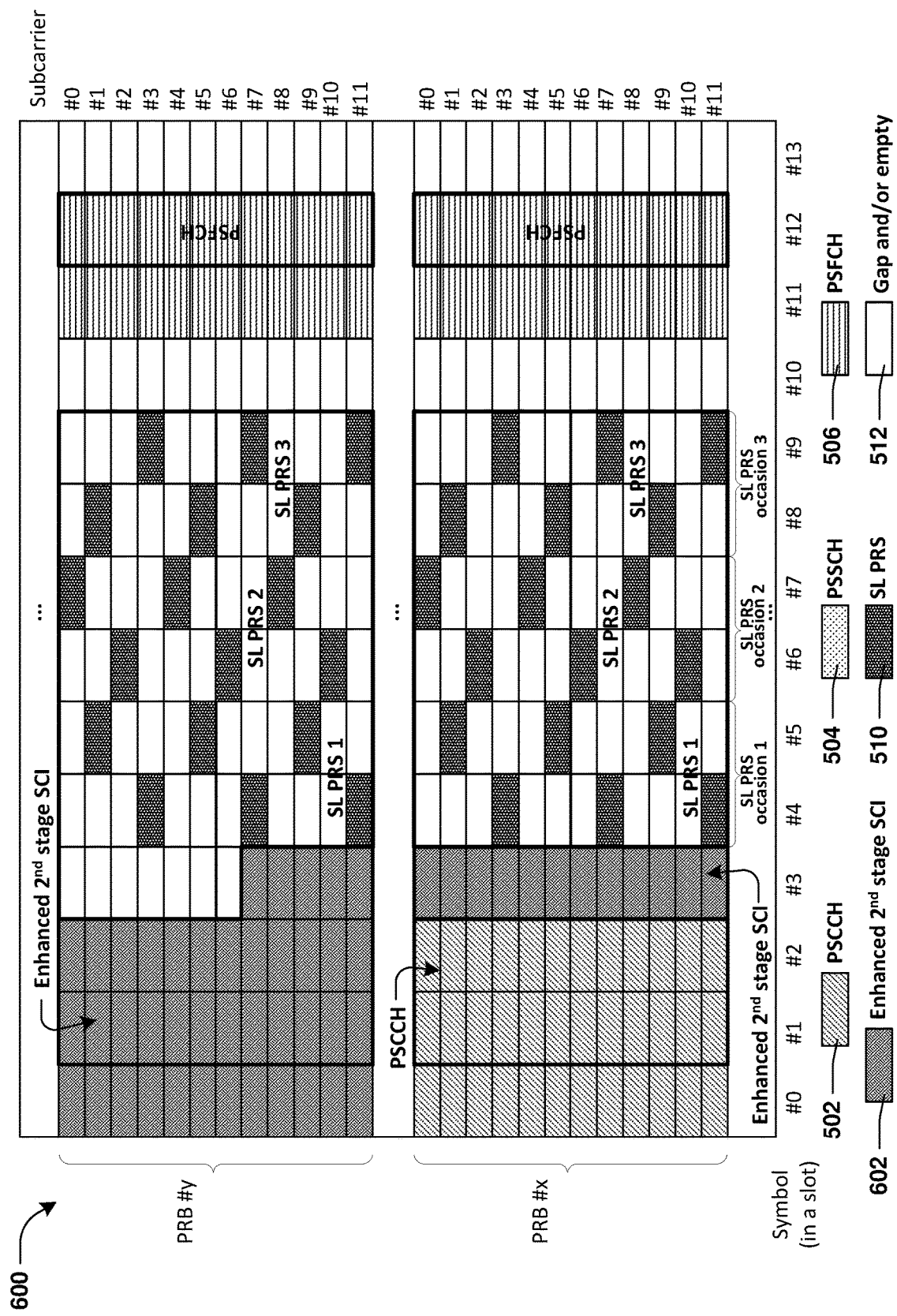
FIG. 6 illustrates a resource grid representative of a scenario associated with transmissions in a slot in a shared resource pool with sidelink communication, according to one exemplary embodiment.

FIG. 6 illustrates a resource grid 600 representative of a scenario associated with transmissions of PSCCH, PSSCH, SL PRS and/or PSFCH in a slot in a shared resource pool with sidelink communication, in accordance with some embodiments. In the resource grid 600, REs of the enhanced $2^{nd}$ stage SCI are shown with a sixth pattern 602.

The $2^{nd}$ stage SCI in FIG. 6 may be the enhanced (e.g., new) $2^{nd}$ stage SCI. In some examples, the enhanced $2^{nd}$ stage SCI may be transmitted in one or more symbols that do not overlap with the SL PRS transmission. In other words, the enhanced (e.g., new) $2^{nd}$ stage SCI may be transmitted in non-overlapped symbol(s) with the SL PRS transmission.

An issue associated with the first embodiment may be that some UEs (e.g., UEs with older configurations and/or Release 16 and/or 17 RX UEs) may not be able to process the enhanced $2^{nd}$ stage SCI and/or know the enhanced $2^{nd}$ stage SCI, which may mean that Release 16/17 RX UEs may not receive (and/or decode) the PSSCH transmission. Thus, the second destination ID (e.g., the second layer-1 destination ID) may be associated with Rel-18 RX UE (e.g., a RX UE configured with a Rel-18 configuration) and/or a RX UE associated with (e.g., configured with) a later release (e.g., a release subsequent to Rel-18). Alternatively and/or additionally, the second (e.g., layer-1) destination ID may not be associated with a Rel-16 RX UE and/or Rel-17 RX UE (e.g., the second (layer-1) destination ID may be restricted to not being associated with Rel-16 RX UE and/or Rel-17 RX UE).

Concept B

In Concept B of the present disclosure, when the TX UE performs the PSSCH transmission and the SL PRS transmission in the first slot in the sidelink resource pool, the SL PRS transmission and the PSSCH transmission (and/or the sidelink data packet) may be associated with the same defined ID (e.g., a predefined and/or specific ID). For example, the SL PRS transmission and the PSSCH transmission (and/or the sidelink data packet) may be restricted to being associated with the same defined ID.

In some examples, the defined ID may be (e.g., layer-1) destination ID. In some examples, the same defined ID may be the same destination ID, which may mean that the first (e.g., layer-1) destination ID is the same as the second (e.g., layer-1) destination ID.

In some examples, the defined ID may be (e.g., layer-1) source ID. In some examples, the same defined ID may be the same source ID, which may mean that the first (e.g., layer-1) source ID is the same as the second (e.g., layer-1) source ID.

In some examples, the defined ID may be (e.g., layer-1) destination ID and (e.g., layer-1) source ID. In some examples, the same defined ID may be the same source ID and the same destination ID, which may mean that the first (e.g., layer-1) source ID is the same as the second (e.g., layer-1) source ID, and the first (e.g., layer-1) destination ID is the same as the second (e.g., layer-1) destination ID.

In some examples, when the SL PRS transmission and the PSSCH transmission (and/or the sidelink data packet) are not associated with the same defined ID, the TX UE may not (and/or may not be able to and/or may be prevented and/or prohibited and/or excluded from) perform both the PSSCH transmission and the SL PRS transmission in the first slot. The TX UE may be configured to (and/or allowed to and/or able to) to perform either the PSSCH transmission or the SL PRS transmission in the first slot.

In some examples, whether or not TX UE performs the SL PRS transmission and the PSSCH transmission (and/or the sidelink data packet) in the first slot is based on whether or not the SL PRS transmission and the PSSCH are associated with the same defined ID. In some examples, the same defined ID is associated with unicast, groupcast, and/or broadcast. In some examples, the same defined ID is limited to unicast ONLY.

In some examples, when the TX UE performs the PSSCH transmission and the SL PRS transmission in the first slot in the sidelink resource pool, the SL PRS transmission overlaps with (e.g., at least partially overlaps with) the PSSCH transmission in time domain. In some examples, when the TX UE performs the PSSCH transmission and the SL PRS transmission in the first slot in the sidelink resource pool, the M symbols of the SL PRS transmission overlap with (e.g., at least partially overlap with) symbols occupied by the PSSCH transmission in time domain.

In one embodiment, the TX UE may (firstly, for example) determine to perform the SL PRS transmission in the first slot. The TX UE may generate the sidelink data packet and/or the PSSCH transmission (if available, for example) such that the SL PRS transmission and the PSSCH transmission (and/or the sidelink data packet) are associated with the same defined ID. For example, the TX UE may generate the sidelink data packet and/or the PSSCH transmission such that the SL PRS transmission and the PSSCH transmission (and/or the sidelink data packet) meet a condition that the SL PRS transmission and the PSSCH transmission and/or the sidelink data packet are associated with the same defined ID). The TX UE may determine (e.g., select) one or more sidelink logical channels (with available sidelink data, for example) with the same defined ID as the SL PRS transmission, and then generate the sidelink data packet from and/or based on one, some and/or all of the determined (e.g., selected) one or more sidelink logical channels. In some examples, the TX UE may (firstly, for example) determine to perform the SL PRS transmission since the first priority associated with the SL PRS transmission is higher than one or more priorities of one or more sidelink logical channels with pending/available sidelink data. The first priority may be higher than the second priority. A value of the first priority may be smaller than a value of the second priority (e.g., the value of the first priority being smaller than the value of the second priority may be representative of the first priority being higher than the second priority). In some examples, once the TX UE determines to perform SL PRS transmission in the first slot, the TX UE may check whether or not there is pending PSSCH transmission (and/or pending sidelink data packet) which would be transmitted with same destination and/or source as the same defined ID of the SL PRS transmission. In some examples, in response to (and/or when) the PSSCH transmission (e.g., pending PSSCH transmission) (and/or the sidelink data packet) being associated with the same destination and/or the same source as the (determined) SL PRS transmission, the TX UE may perform the SL PRS transmission and the PSSCH transmission in the first slot (e.g., the TX UE may perform the SL PRS transmission and the PSSCH transmission concurrently, such as simultaneously, in the first slot).

In one embodiment, the TX UE may (firstly, for example) determine to perform the PSSCH transmission in the first slot. Then, the TX UE may determine to perform the SL PRS transmission (if there is pending SL PRS transmission, for example) when the SL PRS transmission and the PSSCH transmission (and/or the sidelink data packet) are associated with the same defined ID. The TX UE may determine to perform the SL PRS transmission wherein the defined ID of SL PRS transmission is set based the defined ID of the PSSCH transmission (and/or the sidelink data packet). In some examples, the TX UE may (firstly, for example) determine to perform the PSSCH transmission since the second priority associated with the PSSCH transmission is higher than one or more priorities of pending SL PRS transmission(s). The second priority may be higher than the first priority. A value of the second priority may be smaller than a value of the first priority. In some examples, once the TX UE determines to perform PSSCH transmission in the first slot, the TX UE would check whether or not there is pending SL PRS transmission which would be transmitted with same destination and/or source as the same defined ID of the PSSCH transmission. In some examples, in response to (and/or when) the SL PRS transmission (e.g., pending SL PRS transmission) being associated with the same destination and/or the same source as the (determined) PSSCH transmission, the TX UE may perform the SL PRS transmission and the PSSCH transmission simultaneously in the first slot (e.g., the TX UE may perform the SL PRS transmission and the PSSCH transmission concurrently, such as simultaneously, in the first slot).

Concept C

In Concept C of the present disclosure, the TX UE may be configured to (and/or allowed to and/or able to) perform the SL PRS transmission, without transmission of sidelink data packet, in the first slot in the sidelink resource pool. In some examples, standalone SL PRS transmission (e.g., without transmission of sidelink data packet and/or without multiplexing PSSCH) may be allowed for transmission in a slot. In some examples, the sidelink data packet may mean sidelink data that is from and/or based on one or more sidelink logical channels (with pending/available sidelink data, for example). The TX UE may or may not perform the PSSCH transmission in the first slot.

In comparison, in some examples, the TX UE is not configured to (and/or is not allowed and/or not able to) to perform SL CSI-RS transmission, without PSSCH transmission and/or transmission of sidelink data packet in the same slot.

In one embodiment, the TX UE may not perform PSSCH transmission in the first slot. In some examples, in the first slot, the TX UE may be configured to (and/or allowed to and/or able to) perform the SL PRS transmission, and transmit $1^{st}$ stage SCI (e.g., SCI format 1-A) on PSCCH transmission and enhanced $2^{nd}$ stage SCI (e.g., SCI format 2-D and/or 2-E) associated with the SL PRS transmission. In some examples, the $1^{st}$ stage SCI and enhanced $2^{nd}$ stage SCI may comprise the first sidelink control information for scheduling the SL PRS transmission/resource. In some examples, the enhanced $2^{nd}$ stage SCI may be transmitted in one or more symbols that do not overlap with the SL PRS transmission. In some examples, the first sidelink control information may comprise information of the frequency resource of the SL PRS transmission (e.g., the information of the frequency resource may indicate the frequency resource in units of sub-channels or PRBs). In some examples, the PSCCH transmission comprising the associated $1^{st}$ stage SCI may be performed within the frequency resource of the SL PRS transmission (e.g., in a configured number of PRBs within the frequency resource of the SL PRS transmission, or within one sub-channel occupied by the SL PRS transmission). In some examples, the TX UE may receive a SL grant for SL PRS from network node, where the SL grant may indicate and/or schedule the SL PRS transmission/resource. The SL grant for SL PRS may indicate and/or schedule the resource of the PSCCH transmission associated with the SL PRS transmission/resource.

In some examples, the TX UE may perform one or more SL PRS transmissions respectively in one or more SL PRS occasions in the first slot. In some examples, each SL PRS occasion may occupy a number of symbols (e.g., M symbols and/or other number of symbols). In some examples, the frequency resource of the one or more SL PRS transmissions may be the same (e.g., each of the one or more SL PRS transmissions may use a same set of frequency resources). Alternatively and/or additionally, the frequency resource (e.g., in units of sub-channels or PRBs) of the one or more SL PRS transmissions may be the same or different (e.g., a first SL PRS transmission of the one or more SL PRS transmissions may use the same set as a second SL PRS transmission of the one or more SL PRS transmissions or a different set of frequency resources different than a set of frequency resources used the second SL PRS transmission of the one or more SL PRS transmissions). In some examples, the first sidelink control information may comprise information of the one or more SL PRS occasions. The one or more SL PRS occasions may be non-overlapping in time domain. The one or more SL PRS transmissions may be with the same comb/RE offset or may be with different comb/RE offsets. In some examples, the one or more SL PRS transmissions may be with same comb-N structure (e.g., for each of the one or more SL PRS transmissions, an associated N value is the same). Alternatively and/or additionally, the one or more SL PRS transmissions may be with same or different comb-N structure (e.g., a first SL PRS transmission of the one or more SL PRS transmissions may be associated with the same N value as a second SL PRS transmission of the one or more SL PRS transmissions or a different N value different than an N value associated with the second SL PRS transmission).

In the example scenario illustrated in FIG. 6, there may be three SL PRS transmissions on three SL PRS occasions, respectively. The three SL PRS transmissions may comprise a transmission "SL PRS 1" on an occasion "SL PRS occasion 1", a transmission "SL PRS 2" on an occasion "SL PRS occasion 2", and/or a transmission "SL PRS 3" on an occasion "SL PRS occasion 3". The three SL PRS transmission may be scheduled and/or indicated by the first sidelink control information, which may be in $1^{st}$ stage SCI on PSCCH transmission and the enhanced $2^{nd}$ stage SCI transmission.

Thus, at least some embodiments of the present disclosure, such as those provided herein with respect to Concept C and/or others herein, may provide for (and/or may guarantee) backward compatibility with NR release 16/17 sidelink UEs (e.g., sidelink UEs that are configured with Rel-16 configuration and/or Rel-17 configuration and/or are not configured with Rel-18). The $1^{st}$ stage SCI may indicate the frequency resources of the SL PRS transmission. the legacy Release 16/17 UEs may not know the enhanced $2^{nd}$ stage SCI, since there is no PSSCH transmission (but still know reserved resource, periodicity, Reference Signal Received Power (RSRP) based on $1^{st}$ stage SCI and DMRS for $1^{st}$ stage SCI), NR release 16/17 sidelink UEs will not need to performing reception (and/or decoding) based on the enhanced $2^{nd}$ stage SCI. In some examples, a differentiation between release 16/17 UEs and Rel-18 UEs (and/or later release UEs) may be associated with an indication in the $1^{st}$ stage SCI. For example, the $1^{st}$ stage SCI may comprise a $2^{nd}$ stage SCI format bit field. The $2^{nd}$ stage SCI format bit field may be used to indicative of the enhanced $2^{nd}$ stage SCI. In some examples, NR release 16/17 UEs may consider the $1^{st}$ stage SCI indicates a reserved field (e.g., other than 2-A/2-B/2-C). For example, NR release 16/17 UEs may consider the $2^{nd}$ stage SCI format bit field to be a reserved filed. Rel-18 UEs (and/or later release UEs) may consider the $1^{st}$ stage SCI indicates enhanced $2^{nd}$ stage SCI. For example, Rel-18 UEs (and/or later release UEs) may interpret the $2^{nd}$ stage SCI format bit field to be indicative of the enhanced $2^{nd}$ stage SCI.

In one embodiment, the TX UE may perform SL PRS transmission in symbol(s) of PSFCH occasion in the first slot in the sidelink resource pool. In some examples, the first slot may comprise one or more PSFCH resources and/or one or more PSFCH occasions. In some examples, the frequency resources of the SL PRS transmission may not overlap with frequency resources of PSFCH transmissions. In some examples, the sidelink resource pool (configuration) may provide (and/or configure the TX UE with) a first set of PRBs for SL PRS and a second set of PRBs for PSFCH. In some examples, the first set of PRBs and the second set of PRBs may not overlap in frequency domain. In some examples, the frequency resources of the SL PRS transmission are within the first set of PRBs (e.g., the frequency resources of the SL PRS transmission are restricted to within the first set of PRBs). In some examples, the TX UE may or may not perform the PSSCH transmission in the first slot.

In some examples, the TX UE may transmit the first sidelink control information for scheduling the SL PRS transmission/resource. In some examples, the first sidelink control information may be transmitted in the first slot. In some examples, the first sidelink control information may be transmitted in a slot earlier than the first slot (e.g., previous slot). In some examples, the first sidelink control information may be transmitted via one or more of the techniques provided herein with respect to Concept A. Alternatively and/or additionally, the first sidelink control information may be transmitted in symbol(s) of PSFCH occasion in a previous slot earlier than the first slot (e.g., a previous slot with PSFCH resources). The first sidelink control information may indicate the first slot. In some examples, the first sidelink control information may be transmitted in non-overlapping frequency resources of PSFCH transmissions.

Concept D

In Concept D of the present disclosure, the sidelink resource pool may provide defined slots (e.g., predefined and/or specific slots) for SL PRS transmission/reception in time domain. In some examples, the (first) configuration of the sidelink resource pool may provide/configure the defined slots. In some examples, the defined slots may not overlap with the number of slots (for PSCCH/PSSCH transmission/reception, for example) in time domain. The TX UE may be configured to (and/or allowed to and/or able to) perform SL PRS transmission in the defined slots in the sidelink resource pool. The TX UE may not be configured to (and/or not allowed to and/or not able to) perform SL PRS transmission in slots other than the defined slots in the sidelink resource pool. In some examples, the defined slots may not be available/utilizable/configured for a first set of UEs (e.g., NR release 16/17 sidelink UEs). In the present disclosure, the term "available/utilizable/configured" may refer to available, utilizable and/or configured. In some examples, the defined slots may be available/utilizable/configured for a second set of UEs (e.g., Rel-18 UEs and/or later release UEs). In some examples, the defined slots may be indicated via a bitmap configuration and/or a periodicity configuration in the sidelink resource pool configuration.

In a first example, the TX UE may perform the SL PRS transmission and may be configured to (and/or allowed to and/or able to) perform the PSSCH transmission in the defined slots. The defined slots may comprise the first slot. In some examples, the SL PRS transmission in Concept A and/or B may be performed within the defined slots.

In a second example, the TX UE may perform the SL PRS transmission and may not be configured to (and/or not allowed to and/or not able to) perform the PSSCH transmission in the defined slots. In some examples, the SL PRS transmission discussed with respect to Concept C may be performed within the defined slots.

One, some and/or all of the foregoing examples, concepts, techniques and/or embodiments can be formed and/or combined to a new embodiment.

In some examples, embodiments disclosed herein, such as embodiments described with respect to Concept A, Concept B, Concept C and Concept D may be implemented independently and/or separately. Alternatively and/or additionally, a combination of embodiments described herein, such as embodiments described with respect to Concept A, Concept B, Concept C and/or Concept D, may be implemented. Alternatively and/or additionally, a combination of embodiments described herein, such as embodiments described with respect to Concept A, Concept B, Concept C and/or Concept D, may be implemented concurrently and/or simultaneously.

Various techniques, embodiments, methods and/or alternatives of the present disclosure may be performed independently and/or separately from one another. Alternatively and/or additionally, various techniques, embodiments, methods and/or alternatives of the present disclosure may be combined and/or implemented using a single system. Alternatively and/or additionally, various techniques, embodiments, methods and/or alternatives of the present disclosure may be implemented concurrently and/or simultaneously.

With respect to one or more embodiments herein, such as one or more techniques, devices, concepts, methods, example scenarios and/or alternatives described above, in some examples, the SL PRS may be replaced and/or substituted with (and/or changed to) sidelink reference signal. In some examples, in the present disclosure, one, some and/or all instances of the term "SL PRS" may be replaced with the term "sidelink reference signal".

With respect to one or more embodiments herein, in some examples, the sidelink reference signal may be sidelink positioning reference signal (SL PRS).

With respect to one or more embodiments herein, in some examples, the sidelink reference signal may be applied and/or utilized for (absolute and/or relative) positioning and/or ranging.

With respect to one or more embodiments herein, in some examples, the sidelink reference signal may be applied and/or utilized for any of time-based positioning/ranging methods and/or angle-based positioning/ranging methods. In some examples, the sidelink reference signal may be applied and/or utilized for any of TDoA, RTT-based positioning/ranging, AoA, AoD, and/or carrier phase measurement based positioning With respect to one or more embodiments herein, in some examples, the sidelink reference signal may be SL beam management Reference Signal (RS). In some examples, the sidelink reference signal may be SL CSI-RS (for beam management, for example). In some examples, the SL CSI-RS is not combined within a PSSCH (e.g., a PSSCH bandwidth) in frequency domain. In some examples, the sidelink reference signal may require large bandwidth (e.g., a bandwidth larger than a threshold bandwidth). In some examples, the sidelink reference signal may be utilized for (High-Resolution, for example) localization, sensing, or imaging. In some examples, the sidelink reference signal may be utilized for beam management (e.g., in FR2).

One or more of the techniques, devices, concepts, methods, example scenarios and/or alternatives provided herein for sidelink reference signal may be applied for other types of reference signals (other than SL PRS, for example). For example, one, some and/or all of the techniques provided herein with respect to sidelink reference signal (e.g., SL PRS) may be used in conjunction with other types of reference signals (e.g., reference signal designed/introduced in future versions of 5G, 6G, etc.).

One or more of the techniques, devices, concepts, methods, example scenarios and/or alternatives provided herein for sidelink reference signal may be applied for SL CSI-RS (for beam management, for example). For example, one, some and/or all of the techniques provided herein with respect to transmitting sidelink reference signal (e.g., SL PRS) may be used in conjunction with SL CSI-RS (for beam management, for example).

One or more of the techniques, devices, concepts, methods, example scenarios and/or alternatives provided herein for sidelink reference signal may be applied for localization (e.g., High-Resolution localization) (e.g., reference signal designed/introduced in future versions of 5G, 6G, etc.). For example, one, some and/or all of the techniques provided herein with respect to sidelink reference signal (e.g., SL PRS) may be used in conjunction with localization (e.g., High-Resolution localization) (e.g., reference signal designed/introduced in future versions of 5G, 6G, etc.).

One or more of the techniques, devices, concepts, methods, example scenarios and/or alternatives provided herein for sidelink reference signal may be applied for sensing (e.g., High-Resolution sensing) (e.g., reference signal designed/introduced in future versions of 5G, 6G, etc.). For example, one, some and/or all of the techniques provided herein with respect to sidelink reference signal (e.g., SL PRS) may be used in conjunction with sensing (e.g., High- Resolution sensing) (e.g., reference signal designed/introduced in future versions of 5G, 6G, etc.).

One or more of the techniques, devices, concepts, methods, example scenarios and/or alternatives provided herein for sidelink reference signal may be applied for imaging (e.g., High-Resolution imaging) (e.g., reference signal designed/introduced in future versions of 5G, 6G, etc.). For example, one, some and/or all of the techniques provided herein with respect to sidelink reference signal (e.g., SL PRS) may be used in conjunction with imaging (e.g., High-Resolution imaging) (e.g., reference signal designed/introduced in future versions of 5G, 6G, etc.).

With respect to one or more embodiments herein, in some examples, puncturing a (channel/signal) transmission in a resource element may mean that generating the (channel/signal) transmission in the resource element, and replace the (channel/signal) transmission with another (channel or signal) transmission in the resource element.

With respect to one or more embodiments herein, in some examples, rate matching a (channel/signal) transmission considering/based on a resource element may mean considering/based on the resource element (e.g., based on utilization/existence/presence of the resource element), generating the (channel/signal) transmission in the resource element. In some examples, the rate matching the (channel/signal) transmission considering/based on the resource element may mean considering/based on (utilization/existence/presence of) the resource element, generating output bit sequence from input channel-coded bit sequence (partially/full repetition, segmentation, and/or drop of the input channel-coded bit sequence) for the (channel/signal) transmission. In some examples, the (channel/signal) transmission in the resource element is not duplicated from the (channel/signal) transmission in another resource element.

With respect to one or more embodiments herein, in some examples, rate matching a (channel/signal) transmission considering/based on another (channel/signal) transmission may mean considering/based on (utilization/existence/presence of) the another (channel/signal) transmission, generating the (channel/signal) transmission. In some examples, the rate matching the (channel/signal) transmission considering/based on the another (channel/signal) transmission may mean that considering/basing on (utilization/existence/presence of) the another (channel/signal) transmission, generating output bit sequence from input channel-coded bit sequence (partially/full repetition, segmentation, and/or drop of the input channel-coded bit sequence) for the (channel/signal) transmission. In some examples, the another (channel/signal) transmission does not replace any part of the generated (channel/signal) transmission.

With respect to one or more embodiments herein, in some examples, the sidelink resource pool for sidelink reference signal may be a sidelink resource pool that supports (e.g., enables and/or is configured for) both sidelink data transmission/reception and sidelink reference signal transmission/reception. In some examples, the sidelink resource pool for sidelink reference signal may comprise resources of the sidelink data transmission and resources of the sidelink reference signal. In some examples, the sidelink resource pool for sidelink reference signal may be a shared sidelink resource pool for both sidelink data transmission and sidelink reference signal.

With respect to one or more embodiments herein, in some examples, the sidelink data transmission may be PSSCH.

With respect to one or more embodiments herein, in some examples, the sidelink reference signal may be any one of SL PRS or SL beam management RS. In some examples, the sidelink reference signal may be SL CSI-RS (for beam management, for example). In some examples, the SL CSI-RS is not combined within a PSSCH (e.g., a PSSCH bandwidth) in frequency domain. In some examples, the sidelink reference signal may require large bandwidth (e.g., a bandwidth larger than a threshold bandwidth). In some examples, the sidelink reference signal may be utilized for (High-Resolution, for example) localization, sensing, and/or imaging. In some examples, the sidelink reference signal may be utilized for beam management (e.g., in FR2). In some examples, bandwidth of a sidelink reference signal may comprise part of resource blocks of the sidelink resource pool for sidelink reference signal. In some examples, bandwidth of a sidelink reference signal may comprise all resource blocks of the sidelink resource pool for sidelink reference signal.

With respect to one or more embodiments herein, in some examples, a symbol (e.g., one symbol) between a SCI/PSCCH occasion and a subsequent SL PRS occasion (e.g., the subsequent SL PRS occasion may correspond a next and/or closest SL PRS occasion following the SCI/PSCCH occasion) may be utilized for AGC. Alternatively and/or additionally, there may be no AGC symbol (e.g., no symbol utilized for AGC) between the SCI/PSCCH occasion and the subsequent SL PRS occasion.

With respect to one or more embodiments herein, in some examples, one symbol between two SL PRS occasions (e.g., two adjacent/neighboring SL PRS occasions) may be utilized for AGC. In some examples, two symbols between two SL PRS occasions (e.g., two adjacent/neighboring SL PRS occasions) may be utilized for Gap/TX-RX_Switch and AGC (respectively). Alternatively and/or additionally, there may be no AGC/Gap/TX-RX_Switch symbol between two SL PRS occasions (e.g., two adjacent/neighboring SL PRS occasions).

With respect to one or more embodiments herein, in some examples, the first/initial symbol of one slot or one scheduling/allocation time unit may be utilized for AGC. In some examples, the last symbol of one slot or one scheduling/allocation time unit may be utilized as gap symbol for possible TX-RX switch.

With respect to one or more embodiments herein, in some examples, other example structures other than those explicitly shown in the drawings of the present disclosure are within the scope of the present disclosure. Some embodiments within the scope of the present disclosure may have differences with the example structures shown in the drawings of the present disclosure, wherein the differences may comprise one or more differences associated with distribution of AGC, SCI/PSCCH, SL PRS, Gap, TX-RX switch, and/or resource pool configuration (e.g., the one or more differences may depend on future design).

With respect to one or more embodiments herein, in some examples, the SCI/PSCCH associated with SL PRS may comprise information for scheduling/indicating/allocating SL PRS resource. In some examples, the SCI/PSCCH in the resource pool for SL PRS may not comprise information for PSSCH/PSFCH. In some examples, the SCI/PSCCH in the resource pool for SL PRS may be different from another SCI/PSCCH in a resource pool with sidelink communication (e.g., PSSCH and/or PSFCH). In some examples, the SCI/PSCCH associated with SL PRS may be different from another SCI/PSCCH associated with PSSCH and/or PSFCH.

With respect to one or more embodiments herein, in some examples, sidelink control information for PSSCH may be transmitted/delivered via 1st stage SCI and 2nd stage SCI. In some examples, the sidelink control information for PSSCH may be delivered at least in PSCCH. In some examples, the sidelink control information for PSSCH may comprise 1st stage SCI. In some examples, the 1st stage SCI may be transmitted via PSCCH. In some examples, the sidelink control information for PSSCH may comprise 2nd stage SCI. In some examples, the 2nd stage SCI may be transmitted via multiplexed with PSSCH. In some examples, the SCI format 1 or SCI format 1-X is 1st stage SCI. In some examples, the SCI format 2-A or 2-B or 2-C or 2-X is a 2nd stage SCI.

With respect to one or more embodiments herein, in some examples, for transmitting PSSCH in a slot or subslot, TX UE needs to transmit SCI in the slot or the subslot for scheduling the PSSCH.

With respect to one or more embodiments herein, in some examples, the slot may correspond to (e.g., may be and/or may refer to) a sidelink slot. In some examples, the slot may be represented as and/or replaced with a TTI. In some examples, in the present disclosure, one, some and/or all instances of the term "slot" may be replaced with the term "TTI".

With respect to one or more embodiments herein, in some examples, the sidelink slot may correspond to (e.g., may be and/or may refer to) slot for sidelink. In some examples, a TTI may be a subframe (for sidelink, for example), a slot (for sidelink, for example) or a sub-slot (for sidelink, for example). In some examples, a TTI comprises multiple symbols, e.g., 12, 14 or other number of symbols. In some examples, a TTI may be a slot comprising sidelink symbols (e.g., the slot may fully/partially comprise the sidelink symbols). In some examples, a TTI may correspond to (e.g., may be and/or may refer to) a transmission time interval for a sidelink transmission (e.g., a sidelink data transmission). In some examples, a sidelink slot (e.g., a slot for sidelink) may comprise OFDM symbols (e.g., all OFDM symbols) available for sidelink transmission. In some examples, a sidelink slot (e.g., a slot for sidelink) may comprise a set of contiguous (e.g., consecutive) symbols that are available for sidelink transmission. In some examples, a sidelink slot (e.g., a slot for sidelink) may correspond to (e.g., may be and/or may refer to) a slot that is included in a sidelink resource pool.

With respect to one or more embodiments herein, in some examples, the symbol may correspond to (e.g., may be and/or may refer to) a symbol indicated/configured for sidelink.

With respect to one or more embodiments herein, in some examples, the slot may correspond to (e.g., may comprise and/or may refer to) a sidelink slot associated with the resource pool (e.g., the sidelink resource pool). In some examples, the slot may not correspond to (e.g., may not comprise and/or may not refer to) a sidelink slot associated with a different resource pool (e.g., a second sidelink resource pool different than the sidelink resource pool).

With respect to one or more embodiments herein, in some examples, the contiguous (e.g., consecutive) slots may refer to contiguous sidelink slots that are in (and/or for) the (sidelink) resource pool.

With respect to one or more embodiments herein, in some examples, the contiguous slots may or may not be contiguous (e.g., consecutive) in physical slots, which may mean that the contiguous slots in the sidelink resource pool may be not contiguous and/or consecutive from the aspect of physical slot (e.g., there may be another slot that does not belong to the sidelink resource pool between two contiguous/consecutive slots in the sidelink resource pool). In some examples, the contiguous/consecutive slots may or may not be contiguous/consecutive in sidelink slots in/for a sidelink BWP or a sidelink carrier/cell, which may mean that the contiguous slots in the (sidelink) resource pool may be not contiguous and/or consecutive from the aspect of sidelink slots in a sidelink BWP or a sidelink carrier/cell. In some examples, there may be one or more resource pools (e.g., one or more sidelink resource pools) in a sidelink BWP and/or a sidelink carrier/cell.

With respect to one or more embodiments herein, in some examples, a sub-channel is a unit for sidelink resource allocation and/or scheduling (e.g., sidelink resource allocation and/or scheduling for PSSCH). In some examples, a sub-channel may comprise multiple contiguous PRBs in frequency domain. In some examples, the number of PRBs for each sub-channel may be configured (e.g., pre-configured) for a sidelink resource pool. In some examples, a sidelink resource pool configuration (e.g., a sidelink resource pool pre-configuration) may indicate and/or configure the number of PRBs for each sub-channel. In some examples, the number of PRBs for a sub-channel (e.g., each sub-channel of one, some and/or all sub-channels of the sidelink resource pool) may be 10, 12, 15, 20, 25, 50, 75, 100, and/or other value. In some examples, a sub-channel may be represented as a unit for sidelink resource allocation and/or scheduling. In some examples, a sub-channel may correspond to (e.g., may be and/or may refer to) a set of contiguous (e.g., consecutive) PRBs in frequency domain. In some examples, a sub-channel may correspond to (e.g., may be and/or may refer to) a set of contiguous (e.g., consecutive) resource elements in frequency domain.

With respect to one or more embodiments herein, in some examples, the first UE may have (and/or may maintain and/or establish) multiple sidelink links/connections on PC5 interface. For different sidelink links/connections, the first UE may perform sidelink transmission/reception to/from different paired UE(s).

With respect to one or more embodiments herein, in some examples, the first UE may have (and/or may maintain and/or establish) a first sidelink link/connection and a second sidelink link/connection. A first paired UE of the first sidelink link/connection (e.g., the first UE may communicate with the first paired UE using the first sidelink link/connection) may be different from a second paired UE of the second sidelink link/connection (e.g., the first UE may communicate with the second paired UE using the second sidelink link/connection). In some examples, one or more sidelink logical channels associated with the first sidelink link/connection (e.g., one or more sidelink logical channels associated with the first paired UE of the first sidelink link/connection) are separate and/or independent from one or more sidelink logical channels associated with the second sidelink link/connection (e.g., one or more sidelink logical channels associated with the second paired UE of the second sidelink link/connection).

With respect to one or more embodiments herein, in some examples, the UE may be and/or comprise a device.

With respect to one or more embodiments herein, in some examples, the sidelink transmission and/or reception may be UE-to-UE transmission and/or reception. The sidelink transmission and/or reception may be device-to-device transmission and/or reception, may be Vehicle-to-Everything (V2X) transmission and/or reception, and/or may be Pedestrian-to-Everything (P2X) transmission and/or reception. In some examples, the sidelink transmission and/or reception may be on a PC5 interface.

With respect to one or more embodiments herein, in some examples, the PC5 interface may be a wireless interface for communication between a device and a device. The PC5 interface may be a wireless interface for communication between devices and/or between UEs. The PC5 interface may be a wireless interface for V2X and/or P2X communication. The Uu interface may be a wireless interface for communication between a network node and a device. The Uu interface may be a wireless interface for communication between a network node and a UE.

With respect to one or more embodiments herein, in some examples, the first UE may be a first device. The first UE may be a vehicle UE and/or a V2X UE.

With respect to one or more embodiments herein, in some examples, the second UE may be a second device. The second UE may be a vehicle UE and/or a V2X UE.

With respect to one or more embodiments herein, in some examples, the first UE and the second device are different devices.

In some examples, in the present disclosure, one, some and/or all instances of the term "frequency offset" may be replaced with the term "RE offset" and/or the term "comb-offset" (e.g., 0~N−1).

In some examples, in the present disclosure, the term "frequency offset", the term "RE offset" and/or the term "comb-offset" may be used interchangeably.

Figure 7:
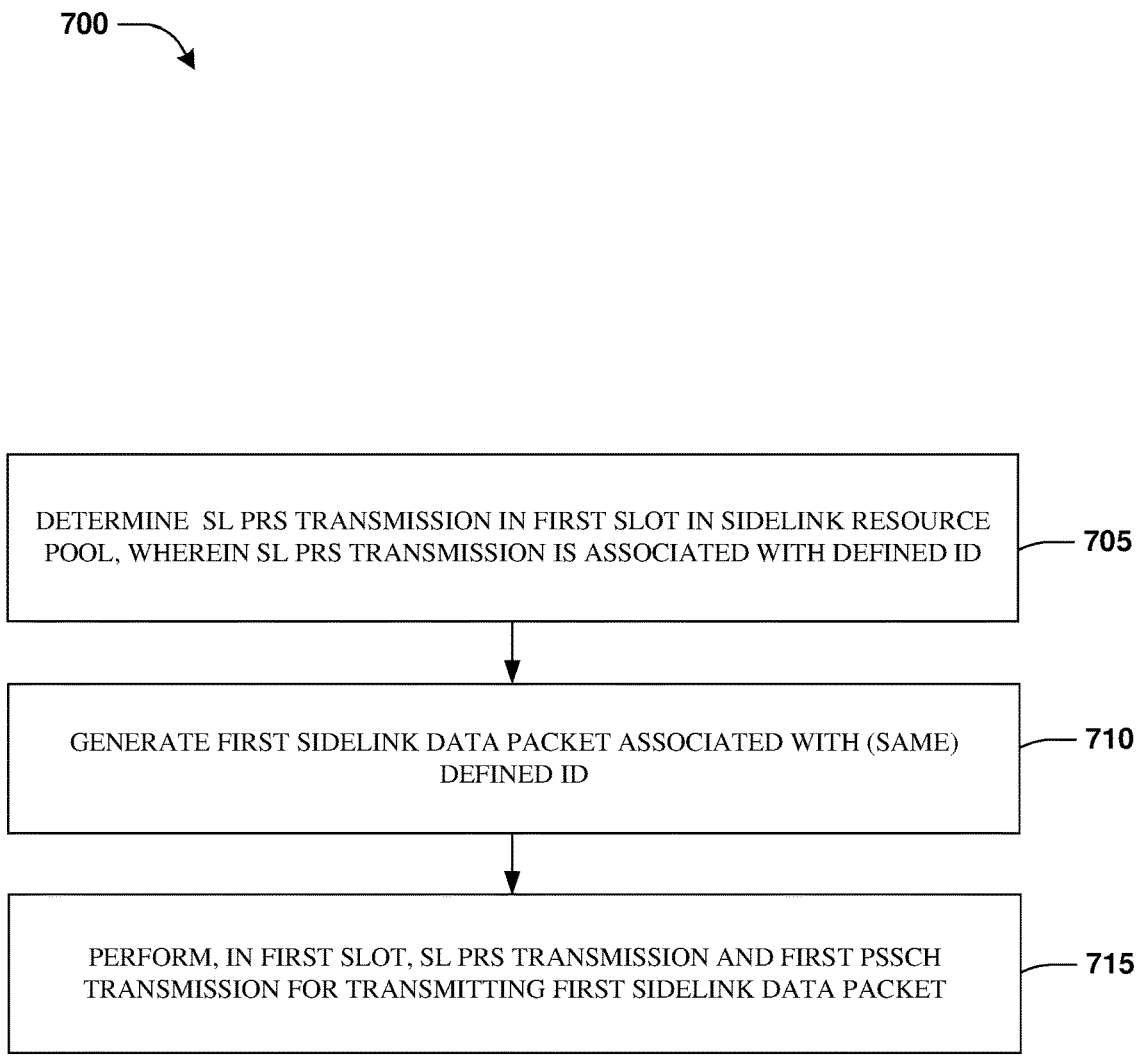
FIG. 7 is a flow chart according to one exemplary embodiment.

FIG. 7 is a flow chart 700 according to one exemplary embodiment from the perspective of a first device. In step 705, the first device determines a SL PRS transmission in a first slot in a sidelink resource pool, wherein the SL PRS transmission is associated with a to perform the SL PRS in the first slot. The sidelink resource pool may comprise the first slot. In step 710, the first device generates a first sidelink data packet associated with the (same) defined ID. In some examples, the first sidelink data packet meets (e.g., satisfies) a first condition that the first sidelink data packet (to be transmitted in the first slot associated with the SL PRS transmission, for example) is associated with the (same) defined ID (e.g., the first condition may be met when the first sidelink data packet is associated with the same defined ID that the SL PRS transmission is associated with). For example, the first device may generate the first sidelink data packet to meet the first condition. In step 715, the first device performs, in the first slot, the SL PRS transmission (associated with the defined ID) and a first PSSCH transmission for transmitting the first sidelink data packet (associated with the defined ID). For example, the first PSSCH transmission comprises transmission of the first sidelink data packet.

In one embodiment, for PSSCH transmission in the first slot, the first device does not generate a sidelink data packet that is associated with a different ID (different than the SL defined ID associated with the SL PRS transmission). For example, for PSSCH transmission in the first slot, the first device may be prevented and/or prohibited (and/or excluded) from generating a sidelink data packet associated with a different ID (different than the defined ID associated with the SL PRS transmission). In some examples, the first device is configured to not transmit a PSSCH transmission comprising a sidelink data packet that is associated with a different ID (different than the defined ID associated with the SL PRS transmission) in the first slot. Alternatively and/or additionally, for PSSCH transmission in the first slot, the first device may exclude, from consideration, a sidelink data packet that is associated with a different ID (different than the defined ID associated with the SL PRS transmission).

In one embodiment, the first device considers data packet(s) that meet the first condition as suitable for transmission via a PSSCH transmission in the first slot (e.g., the first device may consider a sidelink data packet associated with the defined ID as suitable for transmission via a PSSCH transmission in the first slot). For example, the first device may consider only data packet(s) that meet the first condition as suitable for transmission via a PSSCH transmission in the first slot (e.g., the first device may consider only a sidelink data packet associated with the defined ID as suitable for transmission via a PSSCH transmission in the first slot). Alternatively and/or additionally, the first device may consider data packet(s) that do not meet the first condition (e.g., a data packet associated with a different ID different than the defined ID associated with the SL PRS transmission) as unsuitable for transmission via a PSSCH transmission in the first slot.

In some examples, the first device determines (in step 705, for example) to perform the SL PRS transmission in the first slot prior to (i) generating (in step 710, for example) the first sidelink data packet (for transmission in the first slot, for example) and/or (ii) determining to transmit the first sidelink data packet via the first PSSCH transmission in the first slot. In some examples, after determining (in step 705, for example) to perform the SL PRS transmission in the first slot, the first device may generate the first sidelink data packet (for transmission in the first slot, for example) to meet the first condition. Alternatively and/or additionally, after determining (in step 705, for example) to perform the SL PRS transmission in the first slot, the first device may determine to transmit the first sidelink data packet via the first PSSCH transmission in the first slot based on the first sidelink data packet meeting the first condition. In some examples, after determining (in step 705, for example) to perform the SL PRS transmission in the first slot, the first device may determine not to perform a PSSCH transmission of a sidelink data packet (e.g., any PSSCH transmission of a sidelink data packet) in the first slot based on a determination that a sidelink data packet does not meet the first condition (and/or a determination that there is no pending sidelink data packet that meets the first condition).

In one embodiment, whether or not the first device performs both the SL PRS transmission and the first PSSCH transmission in the first slot is based on whether or not the SL PRS transmission and the first PSSCH transmission are associated with the (same) defined ID. For example, the first device may perform both the SL PRS transmission and the first PSSCH transmission in the first slot based on a determination that the SL PRS transmission and the first PSSCH transmission are associated with the (same) defined ID. Alternatively and/or additionally, the first device may not perform both the SL PRS transmission and the first PSSCH transmission in the first slot (e.g., may only perform the SL PRS transmission in the first slot) based on a determination that the SL PRS transmission and the first PSSCH transmission are not associated with the (same) defined ID (e.g., the first PSSCH transmission is associated with a different ID different than the defined ID associated with the SL PRS transmission).

In one embodiment, the first device does not perform both the SL PRS transmission and the first PSSCH transmission in the first slot when the SL PRS transmission and the first PSSCH transmission are not associated with the (same) defined ID (e.g., the first PSSCH transmission is associated with a different ID different than the defined ID associated with the SL PRS transmission). In some examples, the first device may be prevented and/or prohibited (and/or excluded) from performing both the SL PRS transmission and the first PSSCH transmission in the first slot when the SL PRS transmission and the first PSSCH transmission are not associated with the (same) defined ID. In some examples, the first device is configured not to perform both the SL PRS transmission and the first PSSCH transmission in the first slot when the SL PRS transmission and the first PSSCH transmission are not associated with the (same) defined ID.

In one embodiment, when the first device performs both the SL PRS transmission and the first PSSCH transmission in the first slot in the sidelink resource pool, the first PSSCH transmission overlaps (e.g., at least partially overlaps) with the SL PRS transmission in time domain.

In one embodiment, the defined ID is a destination ID (e.g., a layer-1 destination ID).

In one embodiment, the defined ID is a source ID (e.g., a layer-1 source ID).

Referring back to FIGS. 3 and 4, in one exemplary embodiment of a first device, the device 300 includes a program code 312 stored in the memory 310. The CPU 308 may execute program code 312 to enable the first device (i) to determine a SL PRS transmission in a first slot in a sidelink resource pool, wherein the SL PRS transmission is associated with a defined ID, (ii) to generate a first sidelink data packet associated with the (same) defined ID, and (iii) to perform, in the first slot, the SL PRS transmission and a first PSSCH transmission for transmitting the first sidelink data packet. Furthermore, the CPU 308 can execute the program code 312 to perform one, some and/or all of the above-described actions and steps and/or others described herein.

Figure 8:
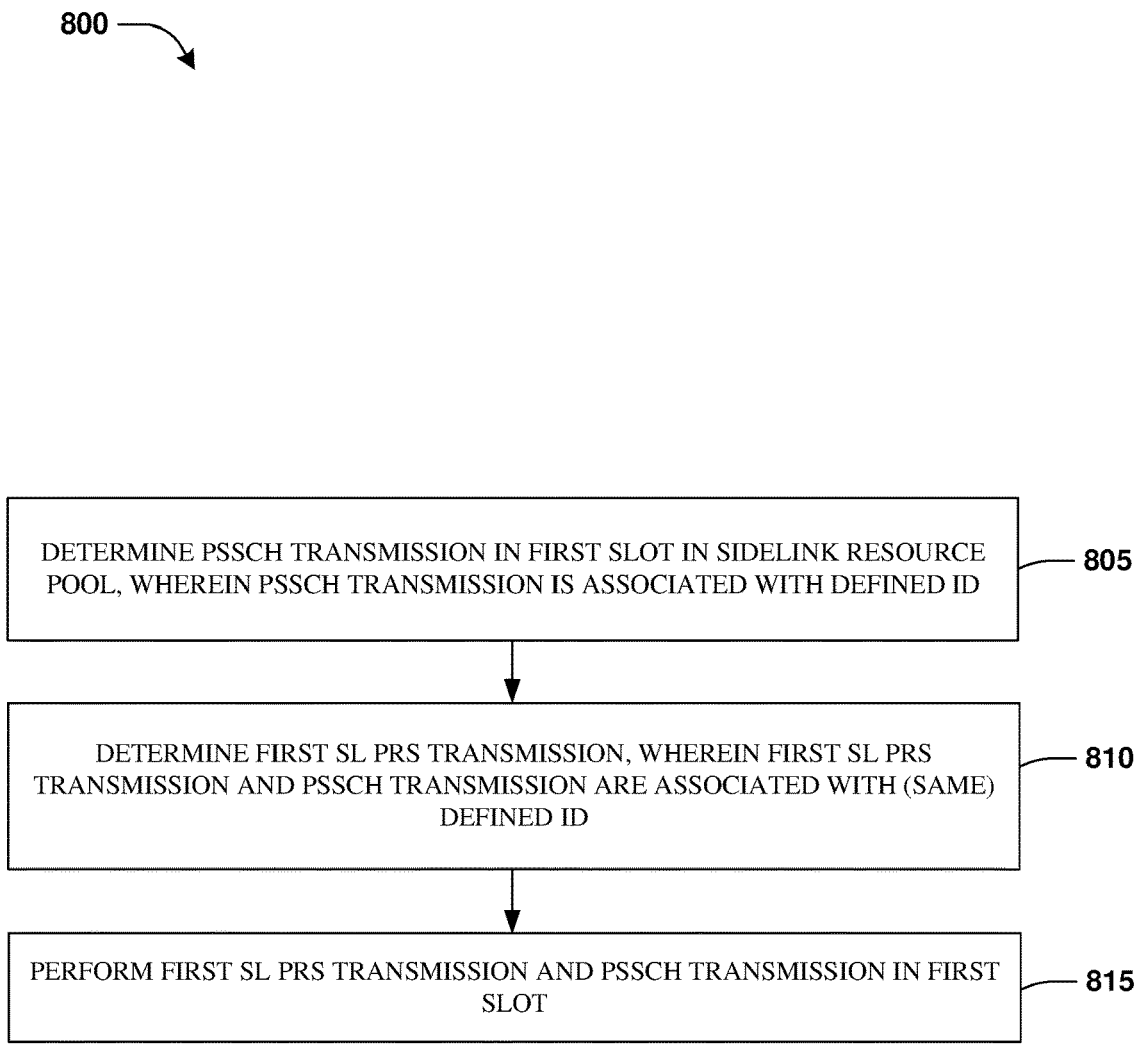
FIG. 8 is a flow chart according to one exemplary embodiment.

FIG. 8 is a flow chart 800 according to one exemplary embodiment from the perspective of a first device. In step 805, the first device determines a PSSCH transmission in a first slot in a sidelink resource pool, wherein the PSSCH transmission is associated with a to perform the PSSCH transmission in the first slot. The sidelink resource pool may comprise the first slot. In step 810, the first device determines a first SL PRS transmission, wherein the first SL PRS transmission and the PSSCH transmission are associated with the (same) defined ID. In step 815, the first device performs the first SL PRS transmission and the PSSCH transmission in the first slot.

In some examples, the first SL PRS transmission may correspond to a pending SL PRS transmission. In some examples, the first device includes the first SL PRS transmission in a queue of pending transmissions in response to SL PRS (e.g., reference signal for positioning and/or ranging in sidelink) being triggered for transmission (e.g., the first SL PRS transmission may comprise transmission of the SL PRS information). In some examples, the determination by the first device to perform the PSSCH transmission in the first slot is performed while the first SL PRS transmission is included in the queue of pending transmissions. In some examples, the first device determines to perform the first SL PRS transmission in the first slot while the first SL PRS transmission is included in the queue of pending transmissions.

In some examples, the first SL PRS transmission meets a second condition that the first SL PRS transmission (to be transmitted in the first slot associated with the PSSCH transmission, for example) is associated with the (same) defined ID (e.g., the second condition may be met when the first SL PRS transmission is associated with the same defined ID that the PSSCH transmission is associated with). For example, the first device may determine to perform the first SL PRS transmission in the first slot based on the first SL PRS transmission meeting the second condition.

In one embodiment, in the first slot (in which the first device performs the PSSCH transmission), the first device does not transmit a SL PRS transmission that is associated with a different ID (different than the defined ID associated with the PSSCH transmission). For example, the first device may be prevented and/or prohibited (and/or excluded) from transmitting, in the first slot (in which the first device performs the PSSCH transmission), a SL PRS transmission that is associated with a different ID (different than the defined ID associated with the PSSCH transmission). In some examples, the first device is configured to not transmit a SL PRS transmission that is associated with a different ID (different than the defined ID associated with the PSSCH transmission) in the first slot. Alternatively and/or additionally, the first device may exclude, from consideration for the first slot, a SL PRS transmission that is associated with a different ID (different than the defined ID associated with the PSSCH transmission).

In one embodiment, the first device considers SL PRS transmission(s) that meet the second condition as suitable for transmission in the first slot (e.g., the first device may consider a SL PRS transmission associated with the defined ID as suitable for transmission in the first slot). For example, the first device may consider only SL PRS transmission(s) that meet the second condition as suitable for transmission in the first slot (e.g., the first device may consider only a SL PRS transmission associated with the defined ID as suitable for transmission in the first slot). Alternatively and/or additionally, the first device may consider SL PRS transmission(s) that do not meet the second condition (e.g., a data packet associated with a different ID different than the defined ID associated with the PSSCH transmission) as unsuitable for transmission in the first slot.

In some examples, the first device determines (in step 805, for example) to perform the PSSCH transmission in the first slot prior to determining (in step 810, for example) to perform the first SL PRS transmission in the first slot. In some examples, after determining (in step 805, for example) to perform the PSSCH transmission in the first slot, the first device may determine (in step 810, for example) to perform the first SL PRS transmission in the first slot based on the first SL PRS transmission meeting the second condition. In some examples, after determining (in step 805, for example) to perform the PSSCH transmission in the first slot, the first device may determine not to perform a SL PRS transmission (e.g., any SL PRS transmission) in the first slot based on a determination that a SL PRS transmission does not meet the second condition (and/or a determination that there is no pending SL PRS transmission that meets the second condition).

In one embodiment, whether or not the first device performs both the PSSCH transmission and the first SL PRS transmission in the first slot is based on whether or not the PSSCH transmission and the first SL PRS transmission are associated with the (same) defined ID. For example, the first device may perform both the PSSCH transmission and the first SL PRS transmission in the first slot based on a determination that the PSSCH transmission and the first SL PRS transmission are associated with the (same) defined ID. Alternatively and/or additionally, the first device may not perform both the PSSCH transmission and the first SL PRS transmission in the first slot (e.g., may only perform the PSSCH transmission in the first slot) based on a determination that the PSSCH transmission and the first SL PRS transmission are not associated with the (same) defined ID (e.g., the first SL PRS transmission is associated with a different ID different than the defined ID associated with the PSSCH transmission).

In one embodiment, the first device does not perform both the PSSCH transmission and the first SL PRS transmission in the first slot when the PSSCH transmission and the first SL PRS transmission are not associated with the (same) defined ID (e.g., the first SL PRS transmission is associated with a different ID different than the defined ID associated with the PSSCH transmission). In some examples, the first device may be prevented and/or prohibited (and/or excluded) from performing both the PSSCH transmission and the first SL PRS transmission in the first slot when the PSSCH transmission and the first SL PRS transmission are not associated with the (same) defined ID. In some examples, the first device is configured not to perform both the PSSCH transmission and the first SL PRS transmission in the first slot when the PSSCH transmission and the first SL PRS transmission are not associated with the (same) defined ID.

In one embodiment, when the first device performs both the PSSCH transmission and the first SL PRS transmission in the first slot in the sidelink resource pool, the first SL PRS transmission overlaps (e.g., at least partially overlaps) with the PSSCH transmission in time domain.

In one embodiment, the defined ID is a destination ID (e.g., a layer-1 destination ID).

In one embodiment, the defined ID is a source ID (e.g., a layer-1 source ID).

Referring back to FIGS. 3 and 4, in one exemplary embodiment of a first device, the device 300 includes a program code 312 stored in the memory 310. The CPU 308 may execute program code 312 to enable the first device (i) to determine a PSSCH transmission in a first slot in a sidelink resource pool, wherein the PSSCH transmission is associated with a defined ID, (ii) to determine a first SL PRS transmission, wherein the first SL PRS transmission and the PSSCH transmission are associated with the (same) defined ID, and (iii) to perform the first SL PRS transmission and the PSSCH transmission in the first slot. Furthermore, the CPU 308 can execute the program code 312 to perform one, some and/or all of the above-described actions and steps and/or others described herein.

Figure 9:
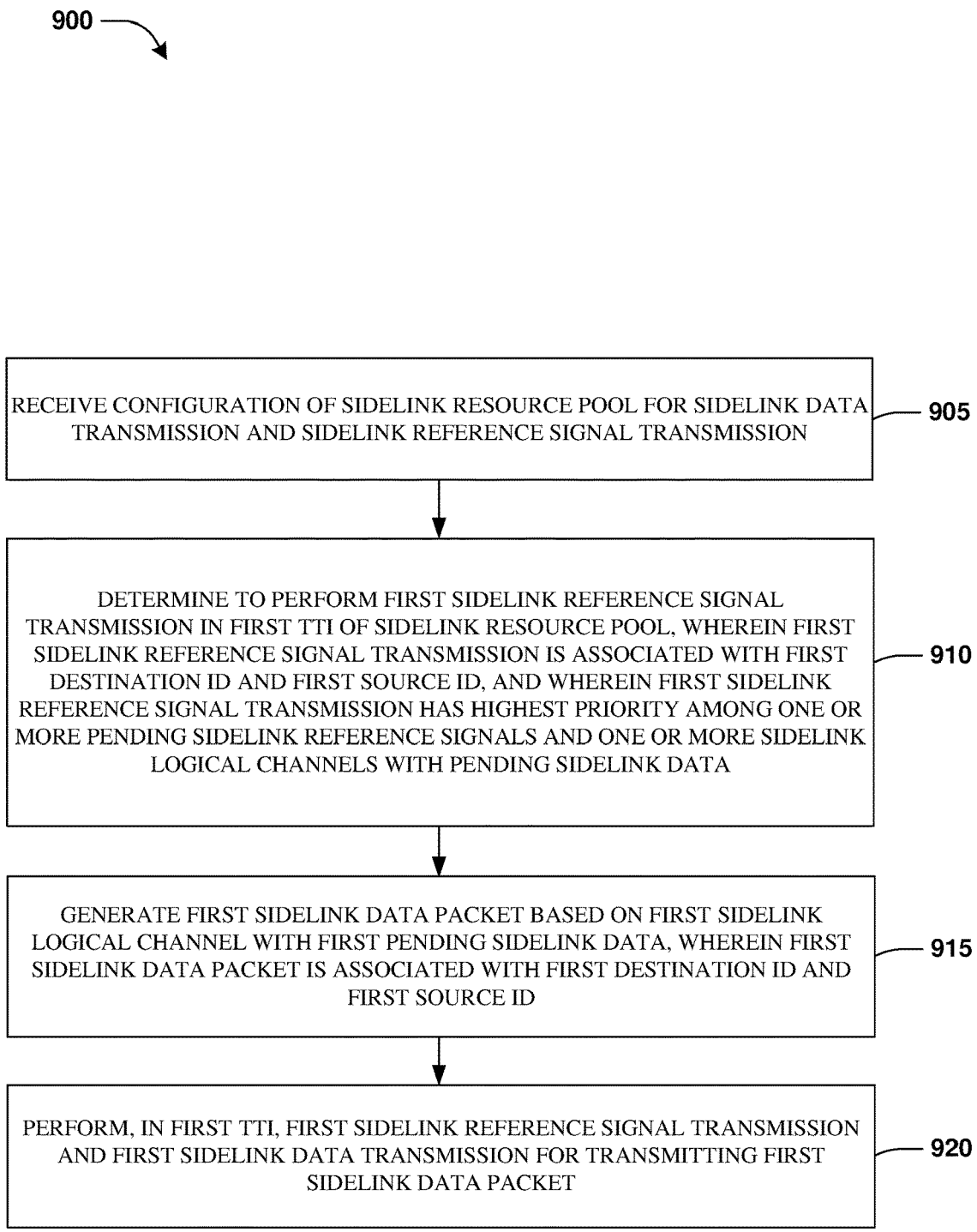
FIG. 9 is a flow chart according to one exemplary embodiment.

FIG. 9 is a flow chart 900 according to one exemplary embodiment from the perspective of a first device. In step 905, the first device receives a configuration of a sidelink resource pool for sidelink data transmission and sidelink reference signal transmission. The sidelink resource pool may be used for communication (e.g., transmission and/or reception) of sidelink data and/or transmission and/or reception of one or more sidelink reference signals. In step 910, the first device determines to perform a first sidelink reference signal transmission in a first TTI of the sidelink resource pool, wherein the first sidelink reference signal transmission is associated with a first destination ID and a first source ID (e.g., a first layer-2 destination ID and a first layer-2 source ID). The first sidelink reference signal transmission has a highest priority among one or more pending sidelink reference signals and one or more sidelink logical channels with pending sidelink data. In some examples, the first device may determine to perform the first sidelink reference signal transmission in the first TTI based on priorities comprising (i) one or more first priorities associated with the one or more pending sidelink reference signals, (ii) one or more second priorities associated with the one or more sidelink logical channels with pending sidelink data, and/or (iii) one or more other priorities associated with one or more other signals and/or channels. For example, the priorities may be compared with each other to identify the highest priority (associated with the first sidelink reference signal transmission) among the priorities. In step 915, the first device generates a first sidelink data packet based on a first sidelink logical channel with first pending sidelink data, wherein the first sidelink data packet is associated with the first destination ID and the first source ID. In some examples, the first sidelink data packet may be generated based upon one or more sidelink logical channels with pending sidelink data (in addition to the first sidelink logical channel with the first pending sidelink data, for example). The first sidelink data packet may comprise at least some of first pending sidelink data from the first sidelink logical channel (e.g., the first device may generate the first sidelink data packet to include at least some of the first pending sidelink data). In some examples, the first sidelink data packet meets a first condition that the first sidelink data packet (to be transmitted in the first TTI, for example) is associated with (i) the first destination ID associated with the first sidelink reference signal transmission and (ii) the first source ID associated with the first sidelink reference signal transmission. For example, the first sidelink data packet may meet the first condition when the first sidelink data packet is associated with (i) the same destination ID (e.g., the first destination ID) as the first sidelink reference signal transmission and (ii) the same source ID (e.g., the first source ID) as the first sidelink reference signal transmission. In some examples, the first device may generate the first sidelink data packet to meet the first condition. In step 920, the first device performs, in the first TTI, the first sidelink reference signal transmission and a first sidelink data transmission for transmitting the first sidelink data packet (e.g., the first sidelink data transmission may comprise sidelink transmission of the first sidelink data packet).

In some examples, the first device determines (in step 910, for example) to perform the first sidelink reference signal transmission in the first TTI in response to determining that the first sidelink reference signal transmission has the highest priority among the one or more pending sidelink reference signals and the one or more sidelink logical channels with pending sidelink data (e.g., a priority of the first sidelink reference signal transmission is highest among the priorities comprising the one or more first priorities and the one or more second priorities). In some examples, a sidelink logical channel of the one or more sidelink logical channels (e.g., each sidelink logical channel of the one or more sidelink logical channels) may correspond to a sidelink logical channel that has pending sidelink data (e.g., data that is available for sidelink transmission).

In some examples, the first sidelink data packet comprises pending sidelink data from a single sidelink logical channel (e.g., the first sidelink logical channel) associated with the first destination ID and the first source ID. Alternatively and/or additionally, the first sidelink data packet may comprise pending sidelink data from multiple sidelink logical channels comprising the first sidelink logical channel. The first sidelink logical channel and/or the multiple sidelink logical channels may be among the one or more sidelink logical channels. In some examples, each of the multiple sidelink logical channels is associated with the first destination ID and the first source ID.

In some examples, the first sidelink reference signal transmission may correspond to a first pending sidelink reference signal. In some examples, the first device includes the first pending sidelink reference signal in the queue of pending transmissions in response to the first pending sidelink reference signal (which may include reference signal for positioning and/or ranging in sidelink, for example) being triggered for transmission. In some examples, the determination by the first device to perform the first sidelink reference signal transmission in the first TTI is performed while the first pending sidelink reference signal (with the highest priority among priorities of transmissions in the queue of pending transmissions, for example) is included in the queue of pending transmissions. In some examples, the one or more pending sidelink reference signals are included in the queue of pending transmissions.

In one embodiment, the first device includes at least some of the first pending sidelink data of the first sidelink logical channel in the first sidelink data packet based on the first sidelink logical channel being associated with the first destination ID and the first source ID. In some examples, the first device generates the first sidelink data packet for transmission in the first TTI (in conjunction/multiplexing with the first sidelink reference signal transmission, for example). The first device may determine that inclusion of at least some of the first pending sidelink data of the first sidelink logical channel in the first sidelink data packet results in the first sidelink data packet meeting the first condition since the first sidelink logical channel is associated with (i) the same destination ID (e.g., the first destination ID) as the first sidelink reference signal transmission and (ii) the same source ID (e.g., the first source ID) as the first sidelink reference signal transmission.

In one embodiment, the first device excludes second pending sidelink data of a second sidelink logical channel from inclusion in the first sidelink data packet (e.g., the first device generates the first sidelink data packet to not comprise the second pending sidelink data) based on the second sidelink logical channel being associated with (i) a second destination ID different than the first destination ID and/or (ii) a second source ID different than the first source ID. The first device may determine that inclusion of the second pending sidelink data of the second sidelink logical channel in the first sidelink data packet would result in the first sidelink data packet not meeting the first condition since the second sidelink logical channel is not associated with (i) the same destination ID (e.g., the first destination ID) as the first sidelink reference signal transmission and/or (ii) the same source ID (e.g., the first source ID) as the first sidelink reference signal transmission.

In one embodiment, the first device excludes, from inclusion in the first sidelink data packet, any sidelink data of any sidelink logical channel that has a different destination ID than the first destination ID and/or a different source ID than the first source ID.

In one embodiment, the first device does not generate the first sidelink data packet (to be transmitted in the first TTI in conjunction/multiplexing with the first sidelink reference signal transmission, for example) from a sidelink logical channel (e.g., any sidelink logical channel) that has a different destination ID than the first destination ID and/or a different source ID than the first source ID. For example, the first device may be prevented and/or prohibited (and/or excluded) from generating the first sidelink data packet (to be transmitted in the first TTI in conjunction with the first sidelink reference signal transmission, for example) from a sidelink logical channel (e.g., any sidelink logical channel) that has a different destination ID than the first destination ID and/or a different source ID than the first source ID. Alternatively and/or additionally, for generation of the first sidelink data packet (to be transmitted in the first TTI in conjunction/multiplexing with the first sidelink reference signal transmission, for example), the first device may exclude, from consideration, inclusion of sidelink data of a sidelink logical channel (e.g., any sidelink logical channel) that has a different destination ID than the first destination ID and/or a different source ID than the first source ID.

In one embodiment, the first device considers sidelink data (e.g., the first pending sidelink data) that meets the first condition as suitable for inclusion in the first sidelink data packet (to be transmitted in the first TTI in conjunction with the first sidelink reference signal transmission, for example). For example, the first device may consider only sidelink data (e.g., the first pending sidelink data) that meets the first condition as suitable for inclusion in the first sidelink data packet (to be transmitted in the first TTI in conjunction/multiplexing with the first sidelink reference signal transmission, for example). Alternatively and/or additionally, the first device may consider data that does not meet the first condition (e.g., the second pending sidelink data associated with the second destination ID different than the first destination ID and/or the second source ID different than the first source ID) as unsuitable for inclusion in the first sidelink data packet (to be transmitted in the first TTI in conjunction with the first sidelink reference signal transmission, for example).

In one embodiment, the first sidelink reference signal transmission and the first sidelink data transmission are performed in the first TTI based on both the first sidelink reference signal transmission and the first sidelink data transmission being associated with the first destination ID and the first source ID.

In some examples, the first device determines (in step 910, for example) to perform the first sidelink reference signal transmission in the first TTI prior to (i) generating (in step 915, for example) the first sidelink data packet (for transmission in the first TTI, for example) and/or (ii) determining to transmit the first sidelink data packet via the first sidelink data transmission in the first TTI. In some examples, after determining (in step 910, for example) to perform the first sidelink reference signal transmission in the first TTI, the first device may generate the first sidelink data packet (for transmission in the first TTI, for example) to meet the first condition. Alternatively and/or additionally, after determining (in step 910, for example) to perform the first sidelink reference signal transmission in the first TTI, the first device may determine to transmit the first sidelink data packet via the first sidelink data transmission in the first TTI based on the first sidelink data packet meeting the first condition. In some examples, after determining (in step 910, for example) to perform the first sidelink reference signal transmission in the first TTI, the first device may determine not to transmit a sidelink data packet in the first TTI based on a determination that a sidelink data packet does not meet the first condition (and/or a determination that there is no pending sidelink data packet that meets the first condition).

In one embodiment, whether or not the first device performs both the first sidelink reference signal transmission and the first sidelink data transmission in the first TTI is based on whether or not the first sidelink reference signal transmission and the first sidelink data packet are associated with (i) the same destination ID (e.g., the first destination ID) and (ii) the same source ID (e.g., the first source ID). For example, the first device may perform both the first sidelink reference signal transmission and the first sidelink data transmission in the first TTI based on a determination that the first sidelink reference signal transmission and the first sidelink data transmission are associated with (i) the same destination ID (e.g., the first destination ID) and (ii) the same source ID (e.g., the first source ID). Alternatively and/or additionally, the first device may not perform both the first sidelink reference signal transmission and a second sidelink data transmission in the first TTI based on a determination that the first sidelink reference signal transmission and the second sidelink data transmission are (i) not associated with the same destination ID (e.g., the first destination ID) and/or (ii) not associated with the same source ID (e.g., the first source ID) (e.g., the second sidelink data transmission is associated with a different destination ID different than the first destination ID and/or is associated with a different source ID different than the first source ID). In some examples, based on a determination that the first sidelink reference signal transmission and the second sidelink data transmission are (i) not associated with the same destination ID (e.g., the first destination ID) and/or (ii) not associated with the same source ID (e.g., the first source ID), the first device (i) may perform the first sidelink reference signal transmission in the first TTI, (ii) may not perform the second sidelink data transmission in the first TTI, and/or (iii) may perform the second sidelink data transmission in a different TTI that may be after the first TTI.

In one embodiment, the first device transmits a first SCI for scheduling the first sidelink reference signal transmission and the first sidelink data transmission, wherein the first SCI is indicative of at least a portion of the first destination ID and/or at least a portion of the first source ID (e.g., layer-1 destination ID and/or layer-1 source ID). In some examples, a recipient of the first SCI may determine, based on the first SCI, scheduling information that may be utilized to receive the first sidelink reference signal transmission and/or the first sidelink data transmission. For example, according to the scheduling information, the recipient may monitor one or more resources during the first TTI to receive the first sidelink reference signal transmission and/or the first sidelink data transmission from the first device.

In one embodiment, the first SCI may comprise and/or mean and/or correspond to SCI format 2-D.

In one embodiment, the first device performs transmission of a 1st stage SCI in the first TTI, wherein the 1st stage SCI comprises a field of a 2nd stage SCI format, and wherein the field is indicative of the SCI format 2-D. For example, the field may be used for indicating a SCI format of a 2nd stage SCI. In some examples, the 2nd stage SCI is transmitted (by the first device, for example) in the first TTI as the transmission of the 1st stage SCI.

In one embodiment, the field in the 1st stage SCI in the first TTI is not indicative of any of SCI format 2-A, SCI format 2-B, or SCI format 2-C. Each of the SCI format 2-A, the SCI format 2-B, and the SCI format 2-C is (i) associated with (e.g., used for) scheduling sidelink data transmission and (ii) not associated with (e.g., not used for) scheduling sidelink reference signal transmission.

In one embodiment, the first sidelink reference signal transmission comprises transmission of a sidelink positioning reference signal.

In one embodiment, a first sidelink reference signal (e.g., the first pending sidelink reference signal) may comprise and/or mean a first sidelink positioning reference signal. Sidelink reference signal may comprise and/or mean sidelink positioning reference signal.

In one embodiment, the first sidelink data transmission is (and/or means) a PSSCH transmission. In some examples, sidelink data transmission is (and/or means) PSSCH transmission.

In one embodiment, the first TTI corresponds to a first slot.

In one embodiment, the first sidelink reference signal transmission does not overlap in time domain with the first sidelink data transmission in the first TTI.

In one embodiment, the first sidelink reference signal transmission occupies first symbols (e.g., first OFDM symbols) in the first TTI and the first sidelink data transmission occupies second symbols (e.g., second OFDM symbols) in the first TTI.

In one embodiment, the first symbols are different than the second symbols. In some examples, the first symbols and the second symbols do not share any common symbols (e.g., there is no symbol common to both the first symbols occupied by the first sidelink reference signal transmission and the second symbols occupied by the first sidelink data transmission).

In one embodiment, the first sidelink reference signal transmission and the first sidelink data packet are associated with a same cast type. In one embodiment, the first sidelink reference signal transmission and the first sidelink data transmission are associated with a same cast type.

In one embodiment, the same cast type is one of unicast, groupcast or broadcast.

In one embodiment, the same cast type is associated with the first destination ID and the first source ID.

In one embodiment, the sidelink resource pool supports (e.g., is configured for and/or enables) (i) transmission of sidelink data transmission(s), (ii) reception of sidelink data transmission(s), (iii) transmission of sidelink reference signal(s), and/or (iv) reception of sidelink reference signal(s).

In one embodiment, the sidelink resource pool corresponds to a shared sidelink resource pool for (i) transmission of sidelink data transmission(s), (ii) reception of sidelink data transmission(s), (iii) transmission of sidelink reference signal(s), and/or (iv) reception of sidelink reference signal(s).

In one embodiment, the sidelink resource pool comprises (i) resources for sidelink data transmission(s), and/or (ii) resources for sidelink reference signal transmission(s).

In some examples, if there is no pending sidelink data that meets the first condition (e.g., if there is no pending sidelink data, from the one or more sidelink logical channels with pending sidelink data, that is associated with the first destination ID and associated with the first source ID), the first device may perform the sidelink reference signal transmission in the first TTI without transmitting sidelink data packet in the first TTI (e.g., the first device may perform the sidelink reference signal transmission in the first TTI without transmitting any sidelink data packet from any sidelink logical channel in the first TTI). The sidelink data packet may be generated from one or more sidelink logical channels with pending sidelink data.

Referring back to FIGS. 3 and 4, in one exemplary embodiment of a first device, the device 300 includes a program code 312 stored in the memory 310. The CPU 308 may execute program code 312 to enable the first device (i) to receive a configuration of a sidelink resource pool for sidelink data transmission and sidelink reference signal transmission, (ii) to determine to perform a first sidelink reference signal transmission in a first TTI of the sidelink resource pool, wherein the first sidelink reference signal transmission is associated with a first destination ID and a first source ID, and/or wherein the first sidelink reference signal transmission has a highest priority among one or more pending sidelink reference signals and one or more sidelink logical channels with pending sidelink data, (iii) to generate a first sidelink data packet based on a first sidelink logical channel with first pending sidelink data, wherein the first sidelink data packet is associated with the first destination ID and the first source ID, and (iv) to perform, in the first TTI, the first sidelink reference signal transmission and a first sidelink data transmission for transmitting the first sidelink data packet. Furthermore, the CPU 308 can execute the program code 312 to perform one, some and/or all of the above-described actions and steps and/or others described herein.

Figure 10:
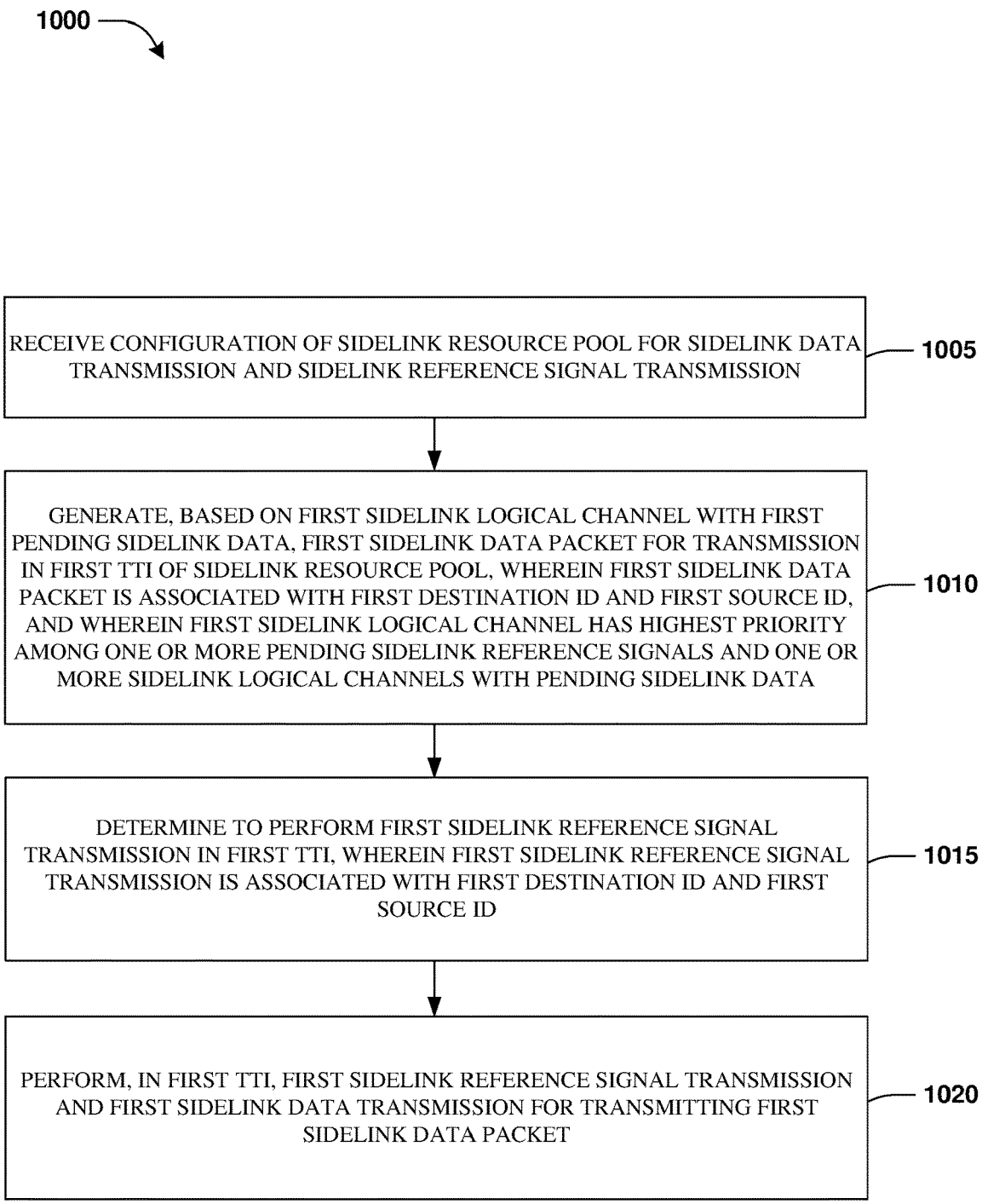
FIG. 10 is a flow chart according to one exemplary embodiment.

FIG. 10 is a flow chart 1000 according to one exemplary embodiment from the perspective of a first device. In step 1005, the first device receives a configuration of a sidelink resource pool for sidelink data transmission and sidelink reference signal transmission. The sidelink resource pool may be used for communication (e.g., transmission and/or reception) of sidelink data and/or transmission and/or reception of one or more sidelink reference signals. In step 1010, the first device generates, based on a first sidelink logical channel with first pending sidelink data, a first sidelink data packet for transmission in a first TTI of the sidelink resource pool, wherein the first sidelink data packet is associated with a first destination ID and a first source ID (e.g., a first layer-2 destination ID and a first layer-2 source ID). The first sidelink logical channel has a highest priority among one or more pending sidelink reference signals and one or more sidelink logical channels with pending sidelink data. In some examples, the first sidelink data packet may be generated based upon one or more sidelink logical channels with pending sidelink data (in addition to the first sidelink logical channel with the first pending sidelink data, for example). The first sidelink data packet may comprise at least some of the first pending sidelink data (e.g., the first device may generate the first sidelink data packet to include at least some of the first pending sidelink data). In some examples, the first pending sidelink data may correspond to data (of the first sidelink logical channel) that is pending for transmission and/or available for transmission. In some examples, the first device may generate the first sidelink data packet and/or determine to transmit the first sidelink data packet in the first TTI based on priorities comprising (i) one or more first priorities associated with the one or more pending sidelink reference signals, (ii) one or more second priorities associated with the one or more sidelink logical channels with pending sidelink data, and/or (iii) one or more other priorities associated with one or more other signals and/or channels. For example, the priorities may be compared with each other to identify the highest priority (associated with the first sidelink logical channel) among the priorities. In step 1015, the first device determines to perform a first sidelink reference signal transmission in the first TTI, wherein the first sidelink reference signal transmission is associated with the first destination ID and the first source ID. In some examples, the first sidelink reference signal transmission (and/or the first sidelink reference signal) meets a second condition that the first sidelink reference signal transmission (to be transmitted in the first TTI, for example) and/or the first sidelink reference signal transmission are associated with (i) the first destination ID associated with the first sidelink data packet and (ii) the first source ID associated with the first sidelink data packet. For example, the first sidelink reference signal transmission may meet the second condition when the first sidelink reference signal transmission is associated with (i) the same destination ID (e.g., the first destination ID) as the first sidelink data packet and (ii) the same source ID (e.g., the first source ID) as the first sidelink data packet. In some examples, the first device may determine to perform the first sidelink reference signal transmission in the first TTI (in conjunction/multiplexing with transmitting the first sidelink data packet in the first TTI, for example) based on the first sidelink reference signal transmission meeting the second condition. In step 1020, the first device performs, in the first TTI, a first sidelink data transmission of the first sidelink data packet and the first sidelink reference signal transmission.

In some examples, the first device may generate the first sidelink data packet to include at least some of the first pending sidelink data and/or may determine to transmit the first sidelink data packet in the first TTI in response to determining that the first sidelink logical channel has the highest priority among the one or more pending sidelink reference signals and the one or more sidelink logical channels with pending sidelink data (e.g., a priority of the first sidelink logical channel is highest among the priorities comprising the one or more first priorities and the one or more second priorities). In some examples, a sidelink logical channel of the one or more sidelink logical channels (e.g., each sidelink logical channel of the one or more sidelink logical channels) may correspond to a sidelink logical channel that has pending sidelink data (e.g., data that is available for sidelink transmission).

In some examples, the first sidelink data packet comprises (at least some of) the first pending sidelink data from a single sidelink logical channel (e.g., the first sidelink logical channel) associated with the first destination ID and the first source ID. Alternatively and/or additionally, the first sidelink data packet may comprise pending sidelink data from multiple sidelink logical channels comprising the first sidelink logical channel. The first sidelink logical channel and/or the multiple sidelink logical channels may be among the one or more sidelink logical channels. In some examples, each of the multiple sidelink logical channels is associated with the first destination ID and the first source ID.

In some examples, the first sidelink reference signal transmission may correspond to a first pending sidelink reference signal. In some examples, the first device includes the first pending sidelink reference signal in a queue of pending transmissions in response to the first pending sidelink reference signal (which may include reference signal for positioning and/or ranging in sidelink, for example) being triggered for transmission. In some examples, the first device may generate the first sidelink data packet while the first sidelink logical channel (with the highest priority) is included in the queue of pending transmissions. In some examples, the determination by the first device to perform the first sidelink reference signal transmission in the first TTI is performed while the first sidelink data packet is included in the queue of pending transmissions. In some examples, the first sidelink reference signal transmission (and/or the first pending sidelink reference signal) may be among the one or more pending sidelink reference signals.

In one embodiment, the first device determines to perform the first sidelink reference signal transmission in the first TTI (in conjunction/multiplexing with the first sidelink data transmission of the first sidelink data packet, for example) based on the first sidelink reference signal transmission being associated with the first destination ID and the first source ID.

In one embodiment, the first device considers sidelink reference signal transmission(s) (e.g., the first sidelink reference signal transmission) that meet the second condition as suitable for transmission in the first TTI. For example, the first device may consider only sidelink reference signal transmission(s) that meet the second condition as suitable for transmission in the first TTI (e.g., suitable to be multiplexed with the first sidelink data transmission in the first TTI). Alternatively and/or additionally, the first device may consider sidelink reference signal transmission(s) that do not meet the second condition (e.g., a sidelink reference signal transmission that is not associated with the first source ID and/or the first destination ID associated with the first sidelink data packet) as unsuitable for transmission in the first TTI (e.g., unsuitable to be multiplexed with the first sidelink data transmission in the first TTI).

In one embodiment, the first device determines not to perform a second sidelink reference signal transmission in the first TTI based on the second sidelink reference signal transmission being associated with a second destination ID different than the first destination ID and/or a second source ID different than the first source ID. Alternatively and/or additionally, the first device may determine not to perform the second sidelink reference signal transmission in the first TTI based on the second sidelink reference signal transmission not meeting the second condition. For example, the first device may determine not to perform the second sidelink reference signal transmission in the first TTI based on the second sidelink reference signal transmission not being associated with the first destination ID associated with the first sidelink data packet and/or the second sidelink reference signal transmission not being associated with the first source ID associated with the first sidelink data packet. In some examples, the second sidelink reference signal transmission may be among the one or more pending sidelink reference signals.

In one embodiment, the first sidelink reference signal transmission and the first sidelink data transmission are performed in the first TTI based on both the first sidelink reference signal transmission and the first sidelink data transmission being associated with the first destination ID and the first source ID.

In some examples, the first device generates (in step 1010, for example) the first sidelink data packet (for transmission in the first TTI, for example) and/or determines to transmit the first sidelink data packet in the first TTI prior to determining (in step 1015, for example) to perform the first sidelink reference signal transmission in the first TTI. In some examples, after generating (in step 1010, for example) the first sidelink data packet (for transmission in the first TTI, for example) and/or determining to transmit the first sidelink data packet in the first TTI, the first device may determine (in step 1015, for example) to perform the first sidelink reference signal transmission in the first TTI (in conjunction/multiplexing with the first sidelink data transmission, for example) based on the first sidelink reference signal transmission being associated with the first destination ID and the first source ID. Alternatively and/or additionally, after generating (in step 1010, for example) the first sidelink data packet (for transmission in the first TTI, for example) and/or determining to transmit the first sidelink data packet in the first TTI, the first device may determine (in step 1015, for example) to perform the first sidelink reference signal transmission in the first TTI (in conjunction/multiplexing with the first sidelink data transmission, for example) based on the first sidelink reference signal transmission meeting the second condition. In some examples, after generating (in step 1010, for example) the first sidelink data packet (for transmission in the first TTI, for example) and/or determining to transmit the first sidelink data packet in the first TTI, the first device may determine not to perform a transmission of a sidelink reference signal (e.g., any sidelink reference signal transmission of a sidelink reference signal) in the first TTI based on a determination that a sidelink reference signal does not meet the second condition (and/or a determination that there is no pending sidelink reference signal that meets the second condition).

In one embodiment, whether or not the first device performs both the first sidelink reference signal transmission and the first sidelink data transmission in the first TTI is based on whether or not the first sidelink reference signal transmission and the first sidelink data packet are associated with (i) the same destination ID (e.g., the first destination ID) and (ii) the same source ID (e.g., the first source ID). For example, the first device may perform both the first sidelink reference signal transmission and the first sidelink data transmission of the first sidelink data packet in the first TTI based on a determination that the first sidelink reference signal transmission and the first sidelink data transmission are associated with (i) the same destination ID (e.g., the first destination ID) and (ii) the same source ID (e.g., the first source ID). Alternatively and/or additionally, the first device may not perform both a second sidelink reference signal (transmission) and the first sidelink data transmission in the first TTI based on a determination that the second sidelink reference signal (transmission) and the first sidelink data transmission are (i) not associated with the same destination ID (e.g., the first destination ID) and/or (ii) not associated with the same source ID (e.g., the first source ID). In some examples, based on a determination that the second sidelink reference signal (transmission) and the first sidelink data transmission are (i) not associated with the same destination ID (e.g., the first destination ID) and/or (ii) not associated with the same source ID (e.g., the first source ID), the first device (i) may perform the first sidelink data transmission in the first TTI, (ii) may not perform the second sidelink reference signal transmission in the first TTI, and/or (iii) may perform the second sidelink reference signal transmission in a different TTI (that may be after the first TTI, for example).

In one embodiment, the first device transmits a first SCI for scheduling the first sidelink reference signal transmission and the first sidelink data transmission, wherein the first SCI is indicative of at least a portion of the first destination ID and/or at least a portion of the first source ID (e.g., layer-1 destination ID and/or layer-1 source ID). In some examples, a recipient of the first SCI may determine, based on the first SCI, scheduling information that may be utilized to receive the first sidelink reference signal transmission and/or the first sidelink data transmission. For example, according to the scheduling information, the recipient may monitor one or more resources during the first TTI to receive the first sidelink reference signal transmission and/or the first sidelink data transmission from the first device.

In one embodiment, the first SCI may comprise and/or mean and/or correspond to SCI format 2-D.

In one embodiment, the first device performs transmission of a 1st stage SCI in the first TTI, wherein the 1st stage SCI comprises a field of a 2nd stage SCI format, and wherein the field is indicative of the SCI format 2-D. For example, the field may be used for indicating a SCI format of a 2nd stage SCI. In some examples, the 2nd stage SCI is transmitted (by the first device, for example) in the first TTI as the transmission of the 1st stage SCI.

In one embodiment, the field in the 1st stage SCI in the first TTI is not indicative of any of SCI format 2-A, SCI format 2-B, or SCI format 2-C. Each of the SCI format 2-A, the SCI format 2-B, and the SCI format 2-C is (i) associated with (e.g., used for) scheduling sidelink data transmission and (ii) not associated with (e.g., not used for) scheduling sidelink reference signal transmission.

In one embodiment, the first sidelink reference signal transmission comprises transmission of a sidelink positioning reference signal.

In one embodiment, a first sidelink reference signal (e.g., the first pending sidelink reference signal) may comprise and/or mean a first sidelink positioning reference signal. Sidelink reference signal may comprise and/or mean sidelink positioning reference signal.

In one embodiment, the first sidelink data transmission is (and/or means) a PSSCH transmission. In some examples, sidelink data transmission is (and/or means) PSSCH transmission.

In one embodiment, the first TTI corresponds to a first slot.

In one embodiment, the first sidelink reference signal transmission does not overlap in time domain with the first sidelink data transmission in the first TTI.

In one embodiment, the first sidelink reference signal transmission occupies first symbols (e.g., first OFDM symbols) in the first TTI and the first sidelink data transmission occupies second symbols (e.g., second OFDM symbols) in the first TTI.

In one embodiment, the first symbols are different than the second symbols. In some examples, the first symbols and the second symbols do not share any common symbols (e.g., there is no symbol common to both the first symbols occupied by the first sidelink reference signal transmission and the second symbols occupied by the first sidelink data transmission).

In one embodiment, the first sidelink reference signal transmission and the first sidelink data packet are associated with a same cast type. In one embodiment, the first sidelink reference signal transmission and the first sidelink data transmission are associated with a same cast type.

In one embodiment, the same cast type is one of unicast, groupcast or broadcast.

In one embodiment, the same cast type is associated with the first destination ID and the first source ID.

In one embodiment, the sidelink resource pool supports (e.g., is configured for and/or enables) (i) transmission of sidelink data transmission(s), (ii) reception of sidelink data transmission(s), (iii) transmission of sidelink reference signal(s), and/or (iv) reception of sidelink reference signal(s).

In one embodiment, the sidelink resource pool corresponds to a shared sidelink resource pool for (i) transmission of sidelink data transmission(s), (ii) reception of sidelink data transmission(s), (iii) transmission of sidelink reference signal(s), and/or (iv) reception of sidelink reference signal(s).

In one embodiment, the sidelink resource pool comprises (i) resources for sidelink data transmission(s), and/or (ii) resources for sidelink reference signal transmission(s).

Referring back to FIGS. 3 and 4, in one exemplary embodiment of a first device, the device 300 includes a program code 312 stored in the memory 310. The CPU 308 may execute program code 312 to enable the first device (i) to receive a configuration of a sidelink resource pool for sidelink data transmission and sidelink reference signal transmission, (ii) generate, based on a first sidelink logical channel with first pending sidelink data, a first sidelink data packet for transmission in a first TTI of the sidelink resource pool, wherein the first sidelink data packet is associated with a first destination ID and a first source ID, and/or wherein the first sidelink logical channel has a highest priority among one or more pending sidelink reference signals and one or more sidelink logical channels with pending sidelink data, (iii) to determine to perform a first sidelink reference signal transmission in the first TTI, wherein the first sidelink reference signal transmission is associated with the first destination ID and the first source ID, and (iv) to perform, in the first TTI, a first sidelink data transmission of the first sidelink data packet and the first sidelink reference signal transmission. Furthermore, the CPU 308 can execute the program code 312 to perform one, some and/or all of the above-described actions and steps and/or others described herein.

Figure 11:
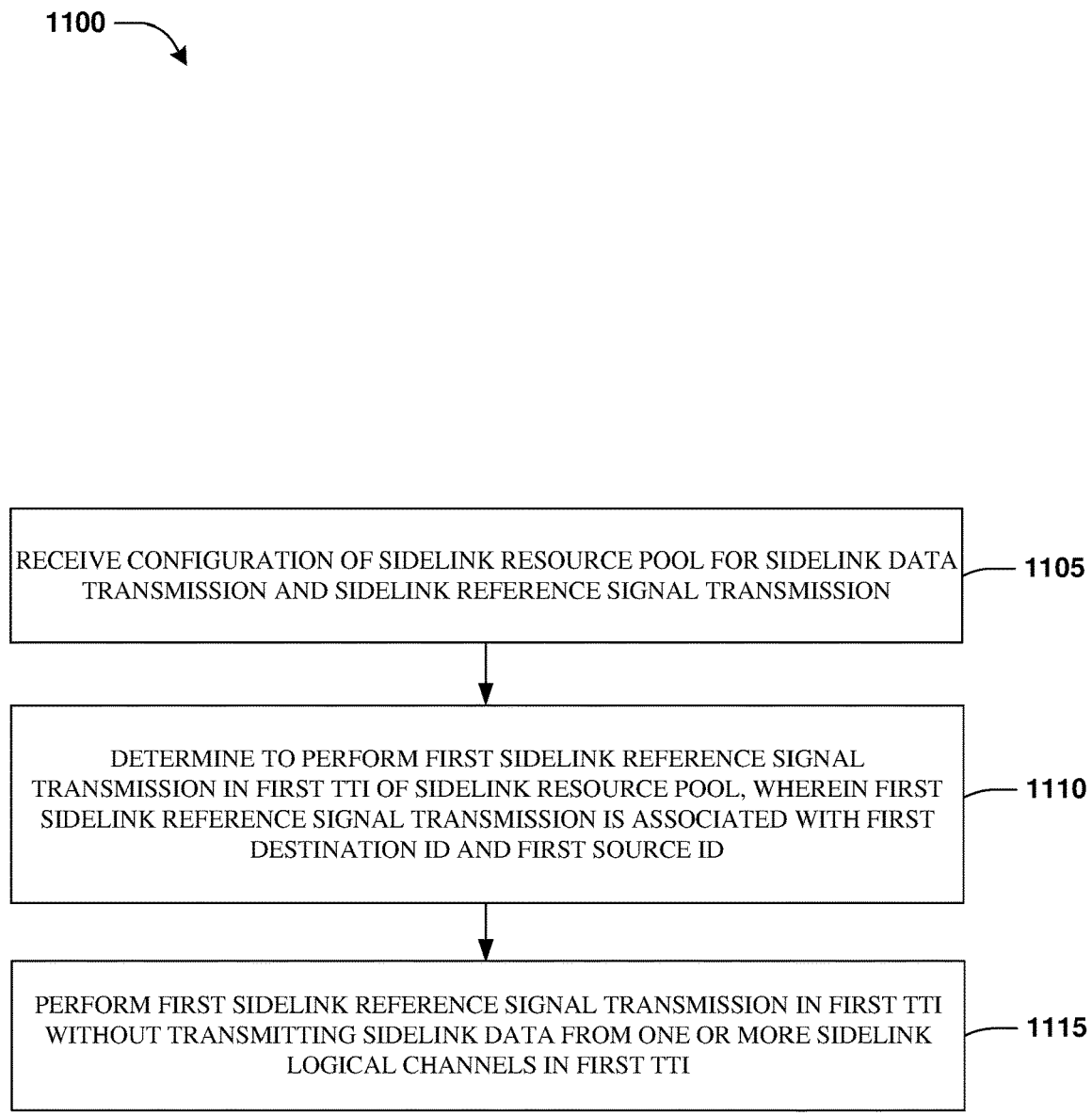
FIG. 11 is a flow chart according to one exemplary embodiment.

FIG. 11 is a flow chart 1100 according to one exemplary embodiment from the perspective of a first device. In step 1105, the first device receives a configuration of a sidelink resource pool for sidelink data transmission and sidelink reference signal transmission. The sidelink resource pool may be used for communication (e.g., transmission and/or reception) of sidelink data and/or transmission and/or reception of one or more sidelink reference signals. In step 1110, the first device determines to perform a first sidelink reference signal transmission in a first TTI of the sidelink resource pool, wherein the first sidelink reference signal transmission is associated with a first destination ID and a first source ID (e.g., a first layer-2 destination ID and a first layer-2 source ID). In step 1115, the first device performs the first sidelink reference signal transmission in the first TTI without transmitting sidelink data from one or more sidelink logical channels in the first TTI. For example, the first device may perform the first sidelink reference signal transmission in the first TTI without transmitting any sidelink data, from any sidelink logical channel(s), in the first TTI.

In one embodiment, the first device generates a sidelink data packet to include the sidelink data from the one or more sidelink logical channels. The one or more sidelink logical channels may be associated with pending sidelink data. For example, the sidelink data included in the sidelink data packet may comprise at least some of the pending sidelink data from the one or more sidelink logical channels. In some examples, the pending sidelink data may correspond to data (of the one or more sidelink logical channels) that is pending for transmission and/or available for transmission. In some examples, the first device includes the pending sidelink data in a queue of pending sets of data (e.g., sets of sidelink data which are pending transmission and/or available for transmission) in response to the pending sidelink data becoming available for transmission. In some examples, the sidelink data packet may comprise sidelink data from a single sidelink logical channel or multiple sidelink logical channels.

In some examples, the first device determines to perform the first sidelink reference signal transmission in response to a first priority associated with the first sidelink reference signal being higher than one or more priorities associated with one or more pending sidelink reference signals and/or one or more priorities associated with one or more sidelink logical channels with pending sidelink data.

In one embodiment, the first device does not transmit the sidelink data (and/or does not transmit the sidelink data packet) in the first TTI based on the sidelink data (packet) being associated with a second destination ID different than the first destination ID and/or a second source ID different than the first source ID. Alternatively and/or additionally, the first device may not transmit the sidelink data (and/or may not transmit the sidelink data packet) in the first TTI based on the sidelink data (and/or the sidelink data packet) not meeting a first condition that the sidelink data packet (to be transmitted in the first TTI, for example) is associated with (i) the first destination ID associated with the first sidelink reference signal transmission and (ii) the first source ID associated with the first sidelink reference signal transmission. For example, the first device may not transmit the sidelink data (and/or may not transmit the sidelink data packet) in the first TTI based on the sidelink data (and/or the sidelink data packet) not being associated with the first destination ID and/or not being associated with the first source ID.

In some examples, the first device may determine not to perform a sidelink data transmission of the sidelink data (e.g., and/or may determine not to perform any sidelink data transmission of any sidelink data) in the first TTI based on a determination that there is no pending sidelink data (and/or no pending sidelink data packet) that meets the first condition.

In one embodiment, the first sidelink reference signal may comprise and/or mean a first sidelink positioning reference signal. Sidelink reference signal may comprise and/or mean sidelink positioning reference signal.

In one embodiment, the first TTI corresponds to a first slot.

In one embodiment, the sidelink resource pool supports (e.g., is configured for and/or enables) (i) transmission of sidelink data transmission(s), (ii) reception of sidelink data transmission(s), (iii) transmission of sidelink reference signal(s), and/or (iv) reception of sidelink reference signal(s).

In one embodiment, the sidelink resource pool corresponds to a shared sidelink resource pool for (i) transmission of sidelink data transmission(s), (ii) reception of sidelink data transmission(s), (iii) transmission of sidelink reference signal(s), and/or (iv) reception of sidelink reference signal(s).

In one embodiment, the sidelink resource pool comprises (i) resources for transmission of sidelink data transmission(s), and/or (ii) resources for sidelink reference signals transmission(s).

Referring back to FIGS. 3 and 4, in one exemplary embodiment of a first device, the device 300 includes a program code 312 stored in the memory 310. The CPU 308 may execute program code 312 to enable the first device (i) to receive a configuration of a sidelink resource pool for sidelink data transmission and sidelink reference signal transmission, (ii) to determine to perform a first sidelink reference signal transmission in a first TTI of the sidelink resource pool, wherein the first sidelink reference signal transmission is associated with a first destination ID and a first source ID, and (iii) to perform the first sidelink reference signal transmission in the first TTI without transmitting sidelink data from one or more sidelink logical channels in the first TTI. Furthermore, the CPU 308 can execute the program code 312 to perform one, some and/or all of the above-described actions and steps and/or others described herein.

In some embodiments of the present disclosure, a transmission (e.g., a sidelink reference signal transmission, a sidelink data transmission of a sidelink data packet, etc.) may be considered to be "associated with" a first destination ID when (i) a destination ID field associated with the transmission is set to the first destination ID and/or (ii) an intended recipient of the transmission corresponds to a first destination and/or first UE(s)/device(s) identified by the first destination ID.

In some embodiments of the present disclosure, a transmission (e.g., a sidelink reference signal transmission, a sidelink data transmission of a sidelink data packet, etc.) may be considered to be "associated with" a first source ID when (i) a source ID field associated with the transmission is set to the first source ID and/or (ii) a transmitter (e.g., the first device) of the transmission corresponds to a first source and/or a UE/device (e.g., the transmitter UE/device) identified by the first source ID.

In some embodiments of the present disclosure, a sidelink data packet may be considered to be "associated with" a first destination ID when (i) the sidelink data packet is from a first sidelink logical channel with a configuration (and/or a setting) corresponding to the first destination ID and/or (ii) an intended recipient of the sidelink data packet corresponds to a first destination and/or first UE(s)/device(s) identified by the first destination ID.

In some embodiments of the present disclosure, a sidelink data packet may be considered to be "associated with" a first source ID when (i) the sidelink data packet is from a first sidelink logical channel with a configuration (and/or a setting) corresponding to the first source ID and/or (ii) a transmitter (e.g., the first device) of the sidelink data packet corresponds to a first source and/or a UE/device (e.g., the transmitter UE/device) identified by the first source ID.

In some embodiments of the present disclosure, a sidelink logical channel may be considered to be "associated with" a first destination ID when (i) a destination ID field/configuration of the sidelink logical channel is set to the first destination ID and/or (ii) an intended recipient of pending sidelink data from the sidelink logical channel corresponds to a first destination and/or first UE(s)/device(s) identified by the first destination ID.

In some embodiments of the present disclosure, a sidelink logical channel may be considered to be "associated with" a first source ID when (i) a source ID field/configuration of the sidelink logical channel is set to the first source ID and/or (ii) a transmitter (e.g., the first device) of pending sidelink data from the sidelink logical channel corresponds to a first source and/or a UE/device (e.g., the transmitter UE/device) identified by the first source ID.

In some embodiments of the present disclosure, a sidelink reference signal may be considered to be "associated with" a first destination ID when (i) a configuration (and/or setting and/or triggering) of the sidelink reference signal is set to the first destination ID and/or (ii) an intended recipient of the sidelink reference signal corresponds to a first destination and/or first UE(s)/device(s) identified by the first destination ID.

In some embodiments of the present disclosure, a sidelink reference signal may be considered to be "associated with" a first source ID when (i) a configuration (and/or setting and/or triggering) of the sidelink reference signal is set to the first source ID and/or (ii) a transmitter (e.g., the first device) of the sidelink reference signal corresponds to a first source and/or a UE/device (e.g., the transmitter UE/device) identified by the first source ID.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 7-11. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 7-11, and/or one, some and/or all of the above-described actions and steps and/or others described herein.

It may be appreciated that applying one or more of the techniques presented herein may result in one or more benefits including, but not limited to, increased efficiency of communication between devices (e.g., sidelink devices, such as UEs communicating in sidelink), such as where a first device of the devices uses a shared sidelink resource pool with communication and/or positioning. The increased efficiency may be due, at least in part, to one or more of the techniques provided herein with respect to transmission of sidelink control information and/or handling of backward compatible with legacy UEs and/or devices.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a first device, the method comprising:
   receiving a configuration of a sidelink resource pool for sidelink data transmission and sidelink reference signal transmission;
   determining to perform a first sidelink reference signal transmission in a first Transmission Time Interval (TTI) of the sidelink resource pool, wherein the first sidelink reference signal transmission is associated with a first destination identity (ID) and a first source ID, and wherein the first sidelink reference signal transmission has the highest priority among one or more pending sidelink reference signals and one or more sidelink logical channels with pending sidelink data;
   generating a first sidelink data packet based on a first sidelink logical channel with first pending sidelink data, wherein the first sidelink data packet is associated with the first destination ID and the first source ID; and
   performing, in the first TTI, the first sidelink reference signal transmission and a first sidelink data transmission for transmitting the first sidelink data packet.

2. The method of claim 1, wherein at least one of:
   the first sidelink logical channel is among the one or more sidelink logical channels; or
   generating the first sidelink data packet comprises at least one of:
      including at least some of the first pending sidelink data of the first sidelink logical channel in the first sidelink data packet based on the first sidelink logical channel being associated with the first destination ID and the first source ID; or
      excluding, from inclusion in the first sidelink data packet, pending sidelink data of a second sidelink logical channel based on the second sidelink logical channel being associated with at least one of:
         a second destination ID different than the first destination ID; or
         a second source ID different than the first source ID.

3. The method of claim 1, wherein:
   the first sidelink reference signal transmission and the first sidelink data transmission are performed in the first TTI based on both the first sidelink reference signal transmission and the first sidelink data transmission being associated with the first destination ID and the first source ID.

4. The method of claim 1, comprising:
   determining not to perform both of the first sidelink reference signal transmission and a second sidelink data transmission in the first TTI based on:
      the second sidelink data transmission being associated with at least one of:
         a second destination ID different than the first destination ID; and
         a second source ID different than the first source ID.

5. The method of claim 1, comprising:
   transmitting a first sidelink control information (SCI) for scheduling the first sidelink reference signal transmission and the first sidelink data transmission, wherein the first SCI is indicative of:
      at least a portion of the first destination ID; and
      at least a portion of the first source ID.

6. The method of claim 5, wherein at least one of:
   the first SCI at least one of comprises or corresponds to SCI format 2-D;
   the method comprises performing transmission of a 1st stage SCI in the first TTI, wherein the 1st stage SCI comprises a field of a 2nd stage SCI format, and wherein the field is indicative of the SCI format 2-D; or
   the field in the 1st stage SCI in the first TTI is not indicative of any of SCI format 2-A, SCI format 2-B, or SCI format 2-C, wherein each of the SCI format 2-A, the SCI format 2-B, and the SCI format 2-C is (i) associated with scheduling sidelink data transmission and (ii) not associated with scheduling sidelink reference signal transmission.

7. The method of claim 1, wherein at least one of:
   the first sidelink reference signal transmission comprises transmission of a sidelink positioning reference signal;
   the sidelink data transmission is a Physical Sidelink Shared Channel (PSSCH) transmission;
   the first TTI corresponds to a first slot;
   the first sidelink reference signal transmission does not overlap in time domain with the first sidelink data transmission in the first TTI;
   the first sidelink reference signal transmission and the first sidelink data transmission are associated with a same cast type; or
   the same cast type is one of unicast, groupcast or broadcast.

8. The method of claim 1, wherein at least one of:
   the sidelink resource pool supports:
      transmission of one or more sidelink data transmissions;
      reception of one or more sidelink data transmissions;
      transmission of one or more sidelink reference signals; and
      reception of one or more sidelink reference signals;
   the sidelink resource pool corresponds to a shared sidelink resource pool for:
      transmission of one or more sidelink data transmissions;
      reception of one or more sidelink data transmissions;
      transmission of one or more sidelink reference signals; and
      reception of one or more sidelink reference signals; or
   the sidelink resource pool comprises:
      resources for one or more sidelink data transmissions; and
      resources for one or more sidelink reference signal transmissions.

9. A method of a first device, the method comprising:
   receiving a configuration of a sidelink resource pool for sidelink data transmission and sidelink reference signal transmission;
   generating, based on a first sidelink logical channel with first pending sidelink data, a first sidelink data packet for transmission in a first Transmission Time Interval (TTI) of the sidelink resource pool, wherein the first sidelink data packet is associated with a first destination identity (ID) and a first source ID, and wherein the first sidelink logical channel has the highest priority among one or more pending sidelink reference signals and one or more sidelink logical channels with pending sidelink data;
   determining to perform a first sidelink reference signal transmission in the first TTI, wherein the first sidelink reference signal transmission is associated with the first destination ID and the first source ID; and
   performing, in the first TTI, the first sidelink reference signal transmission and a first sidelink data transmission for transmitting the first sidelink data packet.

10. The method of claim 9, wherein at least one of:
the first sidelink reference signal transmission is among the one or more pending sidelink reference signals; determining to perform the first sidelink reference signal transmission in the first TTI is based on the first sidelink reference signal transmission being associated with the first destination ID and the first source ID; or
the method comprises determining not to perform a second sidelink reference signal transmission in the first TTI based on the second sidelink reference signal transmission being associated with at least one of:
 a second destination ID different than the first destination ID; or
 a second source ID different than the first source ID.

11. The method of claim 9, wherein:
the first sidelink reference signal transmission and the first sidelink data transmission are performed in the first TTI based on both the first sidelink reference signal transmission and the first sidelink data transmission being associated with the first destination ID and the first source ID.

12. The method of claim 9, comprising:
determining not to perform both of a second sidelink reference signal transmission and the first sidelink data transmission in the first TTI based on the second sidelink reference signal transmission being associated with at least one of:
 a second destination ID different than the first destination ID; and
 a second source ID different than the first source ID.

13. The method of claim 9, comprising:
transmitting a first sidelink control information (SCI) for scheduling the first sidelink reference signal transmission and the first sidelink data transmission, wherein the first SCI is indicative of:
 at least a portion of the first destination ID; and
 at least a portion of the first source ID.

14. The method of claim 13, wherein at least one of:
the SCI at least one of comprises or corresponds to SCI format 2-D;
the method comprises performing transmission of a 1st stage SCI in the first TTI, wherein the 1st stage SCI comprises a field of a 2nd stage SCI format, and wherein the field is indicative of the SCI format 2-D; or
the field in the 1st stage SCI in the first TTI is not indicative of any of SCI format 2-A, SCI format 2-B, or SCI format 2-C, wherein each of the SCI format 2-A, the SCI format 2-B, and the SCI format 2-C is (i) associated with scheduling sidelink data transmission and (ii) not used for scheduling sidelink reference signal transmission.

15. The method of claim 9, wherein at least one of:
the sidelink reference signal transmission comprises transmission of a sidelink positioning reference signal;
the sidelink data transmission is a Physical Sidelink Shared Channel (PSSCH) transmission;
the first TTI corresponds to a first slot;
the first sidelink reference signal transmission does not overlap in time domain with the first sidelink data transmission in the first TTI;
the first sidelink reference signal transmission and the first sidelink data transmission are associated with a same cast type; or
the same cast type is one of unicast, groupcast or broadcast.

16. The method of claim 9, wherein at least one of:
the sidelink resource pool supports:
 transmission of one or more sidelink data transmissions;
 reception of one or more sidelink data transmissions;
 transmission of one or more sidelink reference signals; and
 reception of one or more sidelink reference signals;
the sidelink resource pool corresponds to a shared sidelink resource pool for:
 transmission of one or more sidelink data transmissions;
 reception of one or more sidelink data transmissions;
 transmission of one or more sidelink reference signals; and
 reception of one or more sidelink reference signals; or
the sidelink resource pool comprises:
 resources for one or more sidelink data transmissions; and
 resources for one or more sidelink reference signal transmissions.

17. A first device, comprising:
a control circuit;
a processor installed in the control circuit; and
a memory installed in the control circuit and operatively coupled to the processor;
wherein the processor is configured to execute a program code stored in the memory to:
 receive a configuration of a sidelink resource pool for sidelink data transmission and sidelink reference signal transmission;
 determine to perform a first sidelink reference signal transmission in a first Transmission Time Interval (TTI) of the sidelink resource pool, wherein the first sidelink reference signal transmission is associated with a first destination identity (ID) and a first source ID, and wherein the first sidelink reference signal transmission has the highest priority among one or more pending sidelink reference signals and one or more sidelink logical channels with pending sidelink data;
 generate a first sidelink data packet based on a first sidelink logical channel with first pending sidelink data, wherein the first sidelink data packet is associated with the first destination ID and the first source ID; and
 perform, in the first TTI, the first sidelink reference signal transmission and a first sidelink data transmission for transmitting the first sidelink data packet.

18. The first device of claim 17, wherein at least one of:
the first sidelink logical channel is among the one or more sidelink logical channels; or
generating the first sidelink data packet comprises at least one of:
 including at least some of the first pending sidelink data of the first sidelink logical channel in the first sidelink data packet based on the first sidelink logical channel being associated with the first destination ID and the first source ID; or
 excluding, from inclusion in the first sidelink data packet, pending sidelink data of a second sidelink logical channel based on the second sidelink logical channel being associated with at least one of:
  a second destination ID different than the first destination ID; or
  a second source ID different than the first source ID.

19. The first device of claim 17, wherein:
the first sidelink reference signal transmission and the first sidelink data transmission are performed in the first TTI based on both the first sidelink reference signal transmission and the first sidelink data transmission being associated with the first destination ID and the first source ID.

20. The first device of claim 17, wherein the processor is configured to execute a program code stored in the memory to:
  determine not to perform both of the first sidelink reference signal transmission and a second sidelink data transmission in the first TTI based on:
    the second sidelink data transmission being associated with at least one of:
      a second destination ID different than the first destination ID; and
      a second source ID different than the first source ID.

* * * * *